US012090673B2

(12) United States Patent
Okawa et al.

(10) Patent No.: US 12,090,673 B2
(45) Date of Patent: Sep. 17, 2024

(54) CONTROL APPARATUS, CONTROL METHOD, AND COMPUTER-READABLE STORAGE MEDIUM STORING A CONTROL PROGRAM

(71) Applicant: OMRON Corporation, Kyoto (JP)

(72) Inventors: Yohei Okawa, Kyoto (JP); Kennosuke Hayashi, Kyoto (JP); Yoshiya Shibata, Kyoto (JP)

(73) Assignee: OMRON Corporation, Kyoto (JP)

( * ) Notice: Subject to any disclaimer, the term of this patent is extended or adjusted under 35 U.S.C. 154(b) by 260 days.

(21) Appl. No.: 17/628,271

(22) PCT Filed: Jul. 17, 2020

(86) PCT No.: PCT/JP2020/027954
§ 371 (c)(1),
(2) Date: Jan. 19, 2022

(87) PCT Pub. No.: WO2021/033472
PCT Pub. Date: Feb. 25, 2021

(65) Prior Publication Data
US 2022/0274255 A1   Sep. 1, 2022

(30) Foreign Application Priority Data

Aug. 22, 2019   (JP) .................................. 2019-152394
Sep. 4, 2019   (JP) .................................. 2019-161195

(51) Int. Cl.
B25J 13/00   (2006.01)
B25J 9/16   (2006.01)
B25J 13/08   (2006.01)

(52) U.S. Cl.
CPC ........... *B25J 9/1697* (2013.01); *B25J 9/1612* (2013.01)

(58) Field of Classification Search
CPC ...... B25J 9/1697; B25J 9/1612; B25J 9/1664; B25J 9/161; B25J 13/00; B25J 13/08; G05B 2219/40499
See application file for complete search history.

(56) References Cited

U.S. PATENT DOCUMENTS

2009/0187276 A1*   7/2009   Nagatsuka ......... G05B 19/4083
                                                    901/47
2010/0168915 A1   7/2010   Kagawa et al.
(Continued)

FOREIGN PATENT DOCUMENTS

CN   102785253 A   11/2012
CN   108621125 A   10/2018
(Continued)

OTHER PUBLICATIONS

Office Action (CNOA) issued on Jan. 10, 2024 in a counterpart Chinese patent application.
(Continued)

*Primary Examiner* — Adam R Mott
*Assistant Examiner* — Heather J Keniry
(74) *Attorney, Agent, or Firm* — METROLEX IP LAW GROUP, PLLC; Robert L. Scott, Esq.

(57) ABSTRACT

A control apparatus according to one or more embodiments may calculate a first estimate value of the coordinates of an endpoint of a manipulator based on first sensing data obtained from a first sensor system, calculates a second estimate value of the coordinates of the endpoint of the manipulator based on second sensing data obtained from a second sensor system, and adjust a parameter value for at least one of a first estimation model or a second estimation model to reduce an error between the first estimate value and the second estimate value based on a gradient of the error.

18 Claims, 16 Drawing Sheets

(56) References Cited

U.S. PATENT DOCUMENTS

| | | |
|---|---|---|
| 2012/0259464 A1 | 10/2012 | Morioka et al. |
| 2015/0057677 A1 | 2/2015 | Diolaiti et al. |
| 2015/0258684 A1 | 9/2015 | Harada et al. |
| 2018/0222049 A1 | 8/2018 | Suzuki et al. |
| 2018/0272535 A1 | 9/2018 | Ogawa et al. |
| 2018/0290305 A1 | 10/2018 | Reekmans et al. |
| 2019/0091869 A1* | 3/2019 | Yamazaki ............... B25J 15/08 |
| 2019/0134821 A1* | 5/2019 | Patrick .................. B25J 9/1697 |
| 2020/0130192 A1 | 4/2020 | Ogawa et al. |
| 2020/0338723 A1* | 10/2020 | Sefati .................... A61B 34/74 |

FOREIGN PATENT DOCUMENTS

| | | |
|---|---|---|
| JP | H7-68480 A | 3/1995 |
| JP | 2010-142901 A | 7/2010 |
| JP | 2012-61558 A | 3/2012 |
| JP | 2012-101306 A | 5/2012 |
| JP | 2015-85491 A | 5/2015 |
| JP | 2015-174172 A | 10/2015 |
| WO | 2013/176212 A1 | 11/2013 |

OTHER PUBLICATIONS

English translation of the International Search Report ("ISR") of PCT/JP2020/027954 mailed on Sep. 1, 2020.

Written Opinion("WO") of PCT/JP2020/027954 mailed on Sep. 1, 2020.

Kumar S et al, "Kinematic control of a redundant manipulator using an inverse-forward adaptive scheme with a KSOM based hint generator", Robotics and Autonomous Systems, Elsevier BV, Amsterdam, NL, vol. 58, No. 5, May 31, 2010, pp. 622-633, XP026989425, ISSN: 0921-8890; Relevance is indicated in the EESR mailed on Nov. 9, 2022.

Yue Chen et al: "Modal-based Kinematics 1-6 and Contact Detection of Soft Robots", arxiv.org, Cornell University Library, 201 Olin Library Cornell University Ithaca, NY 14853, Jun. 27, 2019, XP081385011; Relevance is indicated in the EESR mailed on Nov. 9, 2022.

Wijesinghe Lakshitha P. et al, "Robot End 1-6 Effector Tracking Using Predictive Multisensory Integration", Frontiers in Neurorobotics, vol. 12, Oct. 16, 2018, XP055975789; Relevance is indicated in the EESR mailed on Nov. 9, 2022.

Extended European search report (EESR) issued on Nov. 9, 2022 in a counterpart European patent application.

* cited by examiner

CONTROL APPARATUS, CONTROL METHOD, AND COMPUTER-READABLE STORAGE MEDIUM STORING A CONTROL PROGRAM

FIELD

The disclosure relates to a control apparatus, a control method, and a control program.

BACKGROUND

A production line for products includes a variety of manipulators. Such manipulators can have varying mechanisms and end-effectors and handle varying workpieces in accordance with, for example, tasks to be performed. Manually creating operation sequences for such varying components and teaching the manipulators to perform target tasks can be difficult. With a known technique, components including a manipulator mechanism, an end-effector, and workpieces are first categorized, and then the manipulator is manually operated to perform a series of operations for a task to be performed while the orientations of the manipulator are being recorded. In this manner, the technique directly teaches the manipulator to perform tasks.

However, this technique involves teaching a manipulator to perform a task for every change in the components including a manipulator mechanism, an end-effector, and workpieces. Teaching a manipulator to perform a task is costly with this technique. Methods for more efficiently teaching a manipulator to perform a task have thus been studied. For example, Patent Literature 1 describes a control method for determining the movement speed of a hand gripping a flexible object such as a seal based on the movement speed of the hand relative to the flexible object. This control method at least partially automates the work of either creating or teaching a moving operation of the hand and thus reduces the cost for creating or teaching a manipulator operation.

CITATION LIST

Patent Literature

Patent Literature 1: Japanese Unexamined Patent Application Publication No. 2015-174172

SUMMARY

The inventors have noticed issues associated with the above known control method for the manipulator. With the known control method, the endpoint of the manipulator is first observed with a sensor, and the coordinates of the endpoint of the manipulator are then estimated using sensing data obtained with the sensor. The coordinates of the endpoint of the manipulator are controlled based on the estimation results.

Forward kinematics calculation is an example method for estimating the coordinates of the endpoint of the manipulator. This method uses, as a sensor, an encoder that measures the angle of each joint. The angle of each joint measured with the encoder is used to analytically calculate an estimate value of the coordinates of the endpoint of the manipulator.

Another method for estimating the coordinates may be image analysis. This method uses, as a sensor, a camera that captures an image of an environment for the task including the endpoint of the manipulator. The image data obtained with the camera is then analyzed to estimate the coordinates of the endpoint of the manipulator. The image analysis may be performed with a known method such as pattern matching.

With either of these methods, the coordinates of the endpoint of the manipulator may be estimated based on the sensing data obtained with the sensor. However, the sensing data obtained with the sensor may contain noise. During the analysis process, the data may contain noise from, for example, an allowable error that may be involved in pattern matching. Such environmental noise may increase an error between the estimate value and the true value representing the coordinates of the endpoint of the manipulator, possibly degrading the accuracy in controlling the coordinates of the endpoint of the manipulator.

One or more embodiments may be directed to a technique for improving the accuracy in controlling the coordinates of an endpoint of a manipulator.

Solution to Problem

The control apparatus, method, and program according to one or more embodiments may have the structure described below.

A control apparatus according to one or more embodiments is a control apparatus for controlling an operation of a manipulator. The apparatus may include a first data obtainer that obtains first sensing data from a first sensor system to observe an endpoint of the manipulator, a first estimator that calculates a first estimate value of current coordinates of the endpoint in an observation space based on the obtained first sensing data using a first estimation model, a second data obtainer that obtains second sensing data from a second sensor system to observe the endpoint of the manipulator, a second estimator that calculates a second estimate value of current coordinates of the endpoint in the observation space based on the obtained second sensing data using a second estimation model, an adjuster that calculates a gradient of an error between the first estimate value and the second estimate value, and adjusts a parameter value for at least one of the first estimation model or the second estimation model to reduce the error based on the calculated gradient, a command determiner that determines a control command for the manipulator to cause coordinates of the endpoint to be closer to a goal value based on at least one of the first estimate value or the second estimate value, and a driver that provides the determined control command to the manipulator to drive the manipulator.

The control apparatus with this structure may estimate the coordinates of the endpoint of the manipulator for two paths that are the first sensor system and the second sensor system. More specifically, the control apparatus with this structure calculates the first estimate value of the coordinates of the endpoint of the manipulator based on the first sensing data obtained with the first sensor system using the first estimation model. The control apparatus with this structure also may calculate the second estimate value of the coordinates of the endpoint of the manipulator based on the second sensing data obtained with the second sensor system using the second estimation model.

The coordinates of the endpoint of the manipulator have a single true value. The calculation with no noise from each sensor system may yield the first estimate value and the second estimate value agreeing with each other. The first estimate value and the second estimate value may differ from each other when the calculation is affected by noise from each sensor system. The gradient of the error between the calculated first and second estimate values is calculated, and the parameter value for at least one of the first estimation model or the second estimation model is adjusted to reduce the error based on the calculated gradient. Through this adjustment, the estimation results (estimate values) converge to a single value to improve the accuracy in estimating the coordinates of the endpoint calculated with each estimation model.

The adjusted estimate value for each estimation model may be evaluated as appropriate to determine its closeness to the true value. In one example, noise possibly contained in the sensing data obtained with each sensor system may be white noise. The sensing data is obtained for a predetermined time and is averaged to remove or reduce such noise contained in the sensing data. The closeness of the estimate value obtained with each estimation model to the true value may be evaluated by determining whether the averaged sensing data contains elements associated with the estimate value obtained with each estimation model. The above structure thus improves the accuracy in estimating the coordinates of the endpoint with each estimation model and thus improves the accuracy in controlling the coordinates of the endpoint of the manipulator.

The manipulator may be of any type selected as appropriate in each embodiment. The manipulator may be, for example, a vertically articulated robot, a SCARA robot, a parallel link robot, a Cartesian coordinate robot, or a cooperative robot. Each sensor system may be any sensor system that includes one or more sensors and monitors the endpoint of the manipulator and may be selected as appropriate in each embodiment. Each sensor system may be, for example, a camera, an encoder, a touch sensor, a force sensor, a proximity sensor, a torque sensor, or a pressure sensor. Each estimation model includes parameters for calculating the coordinates of the endpoint using sensing data. Each estimation model may be of any type selected as appropriate in each embodiment. Each estimation model may include a functional expression or a data table. Each estimation model being a functional expression may include a machine learning model such as a neural network, a support vector machine, a regression model, or a decision tree.

In a control apparatus according to one or more embodiments, the adjuster may further obtain, in response to a contact of the endpoint of the manipulator with an object, a boundary value of the coordinates of the endpoint on a boundary surface of the contact with the object, calculate a gradient of a first error between the first estimate value estimated at the contact and the obtained boundary value, adjust the parameter value for the first estimation model to reduce the first error based on the calculated gradient of the first error, calculate a gradient of a second error between the second estimate value estimated at the contact and the obtained boundary value, and adjust the parameter value for the second estimation model to reduce the second error based on the calculated gradient of the second error.

A boundary value on the boundary surface of the contact with the object may be a highly accurate true value for the coordinates of the endpoint of the manipulator resulting from the physical constraints in the contact with the object. The structure uses this highly accurate value to adjust the parameter value for each estimation model and thus increases the accuracy in estimating the coordinates of the endpoint with each estimation model. The structure according to one or more embodiments may improve the accuracy in controlling the coordinates of the endpoint of the manipulator.

In a control apparatus according to one or more embodiments, the manipulator may include one or more joints. The first sensor system may include an encoder that measures an angle of each of the one or more joints. The second sensor system may include a camera. This structure improves the accuracy in controlling the coordinates of the endpoint of the manipulator in situations in which the endpoint of the manipulator is observed with an encoder or with a camera.

In the control apparatus according to the above aspect, the manipulator may further include an end-effector that holds a workpiece. A target point of the endpoint of the manipulator may be set to the end-effector when the end-effector is not holding the workpiece. The target point of the endpoint of the manipulator may be set to the workpiece when the end-effector is holding the workpiece. The first sensor system may further include a touch sensor that estimates a positional relationship of the workpiece held with the end-effector.

This structure may improve the accuracy in controlling the coordinates of the endpoint of the manipulator in situations in which the endpoint of the manipulator is to be changed depending on whether the end-effector is holding the workpiece. Setting the endpoint of the manipulator in this manner may allow the movement of the endpoint of the manipulator to be processed as the same task when the end-effector is not holding the workpiece and when the end-effector is holding the workpiece. This simplifies the control over the manipulator and reduces the cost for creating or teaching the operation of the manipulator.

The end-effector and the workpieces may be of any types that may be selected as appropriate for each task, for example. The task may be any task that involves movement of the endpoint of the manipulator as part of its process and may be selected as appropriate in each embodiment. The task to be performed by the manipulator may be, for example, to hold a workpiece with the end-effector and join the workpiece being held to another workpiece. The end-effector may be, for example, a gripper, a suction device, or a screwdriver. The workpiece may be, for example, a connector or a peg. The other workpiece may be, for example, a socket or a hole. The task may be performed in a real space or in a virtual space.

Another implementation of the control apparatus according to one or more embodiments may be an information processing method, a program, or a storage medium storing the program readable by a computer for implementing the components of the control apparatus. The computer-readable storage medium includes a medium storing a program or other information in an electrical, magnetic, optical, mechanical, or chemical manner.

A control method according to one or more embodiments is an information processing method for controlling an operation of a manipulator. The method is implementable by a computer. The method includes obtaining first sensing data from a first sensor system to observe an endpoint of the manipulator, calculating a first estimate value of current coordinates of the endpoint in an observation space based on the obtained first sensing data using a first estimation model, obtaining second sensing data from a second sensor system to observe the endpoint of the manipulator, calculating a second estimate value of the current coordinates of the endpoint in the observation space based on the obtained second sensing data using a second estimation model, calculating a gradient of an error between the first estimate value and the second estimate value, adjusting a parameter value for at least one of the first estimation model or the second estimation model to reduce the error based on the calculated gradient, determining a control command for the manipulator to cause coordinates of the endpoint to be closer to a goal value based on at least one of the first estimate value or the second estimate value, and providing the determined control command to the manipulator to drive the manipulator.

A control program according to one or more embodiments is a control program for controlling an operation of a manipulator. The program causes a computer to perform operations including obtaining first sensing data from a first sensor system to observe an endpoint of the manipulator, calculating a first estimate value of current coordinates of the endpoint in an observation space based on the obtained first sensing data using a first estimation model, obtaining second sensing data from a second sensor system to observe the endpoint of the manipulator, calculating a second estimate value of the current coordinates of the endpoint in the observation space based on the obtained second sensing data using a second estimation model, calculating a gradient of an error between the first estimate value and the second estimate value, adjusting a parameter value for at least one of the first estimation model or the second estimation model to reduce the error based on the calculated gradient, determining a control command for the manipulator to cause coordinates of the endpoint to be closer to a goal value based on at least one of the first estimate value or the second estimate value, and providing the determined control command to the manipulator to drive the manipulator.

The structure according to one or more embodiments may improve the accuracy in controlling the coordinates of the endpoint of the manipulator.

DETAILED DESCRIPTION

Embodiments according to an aspect of the present invention (hereafter, may be referred to as the present embodiment) will now be described with reference to the drawings. The embodiments described below are mere examples of the present invention in any aspect. The embodiments may be variously modified or altered without departing from the scope of the present invention. More specifically, the present invention may be implemented as appropriate using the structure specific to each embodiment. Although data used in the present embodiments is described in a natural language, such data may be specifically defined using any computer-readable language, such as a pseudo language, commands, parameters, or a machine language.

1. Example Use

Figure 1:
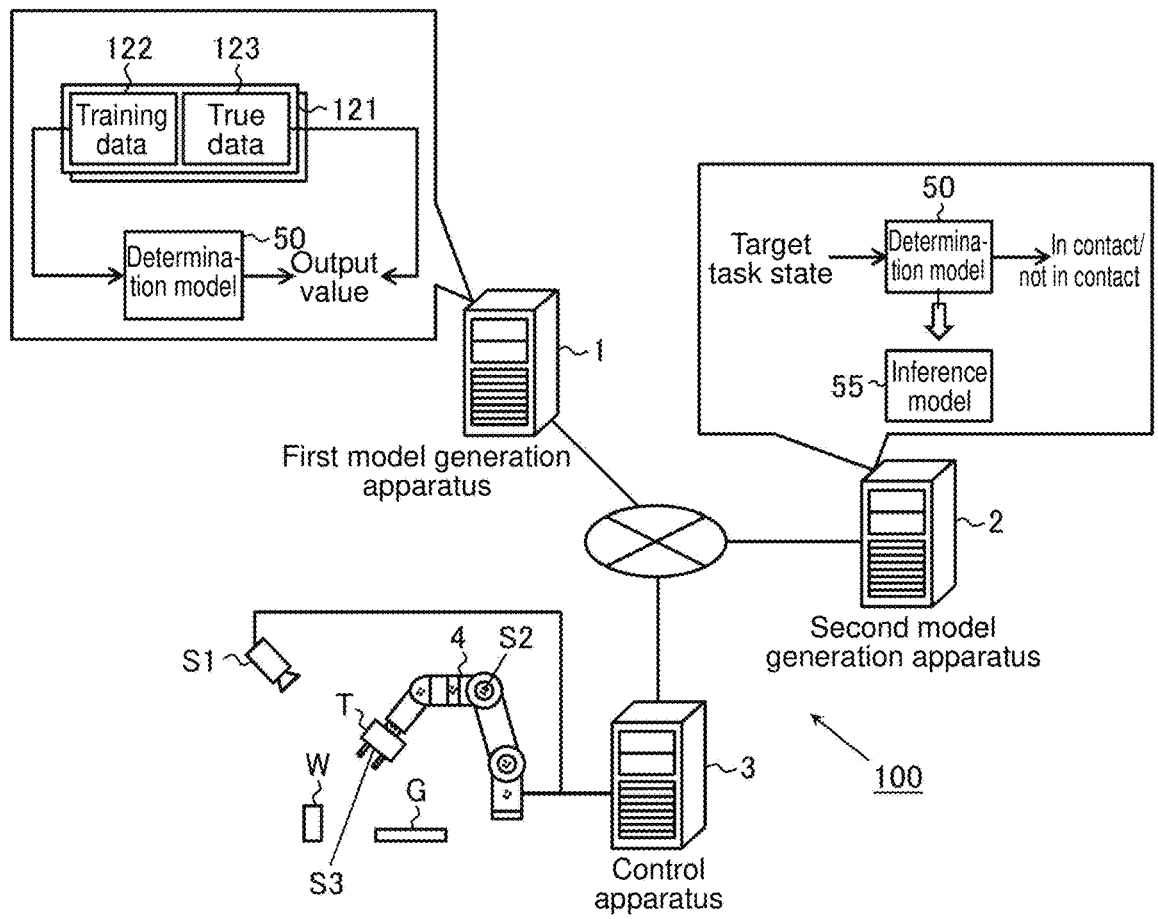
FIG. 1 is a schematic diagram illustrating a system according to one or more embodiments in an example use.

One or more embodiments will now be described with reference to FIG. 1. FIG. 1 is a schematic diagram illustrating a system according to one or more embodiments in an example use. As shown in FIG. 1, a control system 100 according to the present embodiment includes a first model generation apparatus 1, a second model generation apparatus 2, and a control apparatus 3. The first model generation apparatus 1, the second model generation apparatus 2, and the control apparatus 3 may be connected to one another with a network. The network may be selected as appropriate from, for example, the Internet, a wireless communication network, a movable communication network, a telephone network, and a dedicated network.

First Model Generation Apparatus

The first model generation apparatus 1 according to the present embodiment is a computer that generates a determination model 50 for determining whether two objects come in contact with each other in a target positional relationship. More specifically, the first model generation apparatus 1 according to the present embodiment obtains multiple learning datasets 121 each including a combination of training data 122 and true data 123. The training data 122 indicates a positional relationship between two objects. The true data 123 indicates whether the two objects come in contact with each other in the positional relationship.

In the present embodiment, the positional relationship between two objects is expressed using their relative coordinates. The relative coordinates refer to the coordinates of an object viewed from a reference object. Either of the two objects may be selected as a reference for the relative coordinates. The coordinates may represent at least one of position or orientation. In a three-dimensional (3D) space, the position may be defined by a longitudinal axis, a transverse axis, and a vertical axis, and the orientation may be defined by rotations about the axes (roll, pitch, and yaw). In the present embodiment, the relative coordinates may be represented in six dimensions (6D), or more specifically, using a relative position in 3D and a relative orientation in 3D. The relative coordinates may be defined in fewer dimensions than 6D as appropriate.

The first model generation apparatus 1 according to the present embodiment uses the obtained multiple learning datasets 121 to train the determination model 50 through machine learning. Such machine learning includes training the determination model 50 to output, in response to an input of the training data 122 included in each learning dataset 121, an output value that fits the true data 123 included in the corresponding learning dataset 121. The determination model 50 trained through machine learning is built to be capable of determining whether two objects in a target positional relationship come in contact with each other.

In the present embodiment, the trained determination model 50 is used in a space including a manipulator 4 with an end-effector T, a workpiece W, and another workpiece G, to determine whether the workpiece W and the end-effector T come in contact with each other and whether the workpiece W and the other workpiece G come in contact with each other. The end-effector T, the workpiece W, and the other workpiece G are examples of objects. The end-effector T, the workpiece W, and the other workpiece G may be of any types that may be selected as appropriate for the task. The end-effector T may be, for example, a gripper, a suction device, or a screwdriver. The workpiece W may be, for example, a connector or a peg. The other workpiece G may be, for example, a socket or a hole. The other workpiece G is an example of an object to which the workpiece W is to be joined. The end-effector T holding the workpiece W may be, for example, a gripper gripping a workpiece, a suction device attracting a workpiece, or a screwdriver holding a workpiece at its distal end.

More specifically, for example, the manipulator 4 in the present embodiment holds the workpiece W with the end-effector T and performs a task of joining the workpiece W being held to the other workpiece G. This task may include two tasks, or more specifically, a first task of holding the workpiece W with the end-effector T and a second task of transporting the workpiece W being held toward the other workpiece G. The trained determination model 50 is used to determine whether the end-effector T and the workpiece W unintendedly come in contact with each other when the first task is performed, or in other words, when the end-effector T is moved to hold the workpiece W. The trained determination model 50 is also used to determine whether the workpiece W and the other workpiece G unintendedly come in contact with each other when the second task is performed, or in other words, when the end-effector T holding the workpiece W is moved to transport the workpiece W toward the other workpiece G.

In the present embodiment, the trained determination model 50 determines whether two objects come in contact with each other. At least one of the two objects is to be moved by the operation of the manipulator 4. One or both of the two objects may include an object to be moved by the operation of the manipulator 4. The first model generation apparatus 1 may be used in examples other than the above example. The first model generation apparatus 1 is usable in any situation for determining whether two objects come in contact with each other.

For multiple objects to be determined for contact between them as described above, multiple trained determination models 50 may be prepared to determine whether any contact occurs between different objects. In some embodiments, the trained determination model 50 may receive an input of information indicating a condition for an object, such as an object type or an object identifier, and may determine whether any contact occurs between two objects satisfying the input condition. Any of these methods may be used. For ease of explanation, the trained determination model 50 will be described for any objects in the examples below.

Second Model Generation Apparatus

The second model generation apparatus 2 according to the present embodiment is a computer that generates an inference model 55 for determining a goal task state to be provided to the manipulator 4 for controlling the operation of the manipulator 4. The manipulator 4 in the present embodiment can perform a task of moving a first object relative to a second object in an environment including the first object and the second object. The first task and the second task are examples of the task of moving the first object relative to the second object. For the first task, the end-effector T is an example of the first object, and the workpiece W is an example of the second object. For the second task, the workpiece W is an example of the first object, and the other workpiece G is an example of the second object. In the present embodiment, the task state is defined by the positional relationship between the first object and the second object (or the two objects).

Figure 2A:
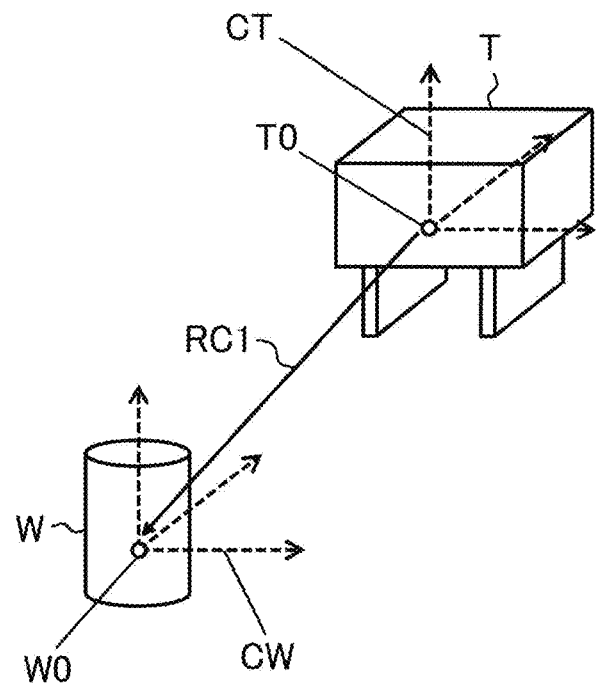
FIG. 2A is a schematic diagram illustrating two objects in an embodiment or embodiments showing an example positional relationship.
Figure 2B:
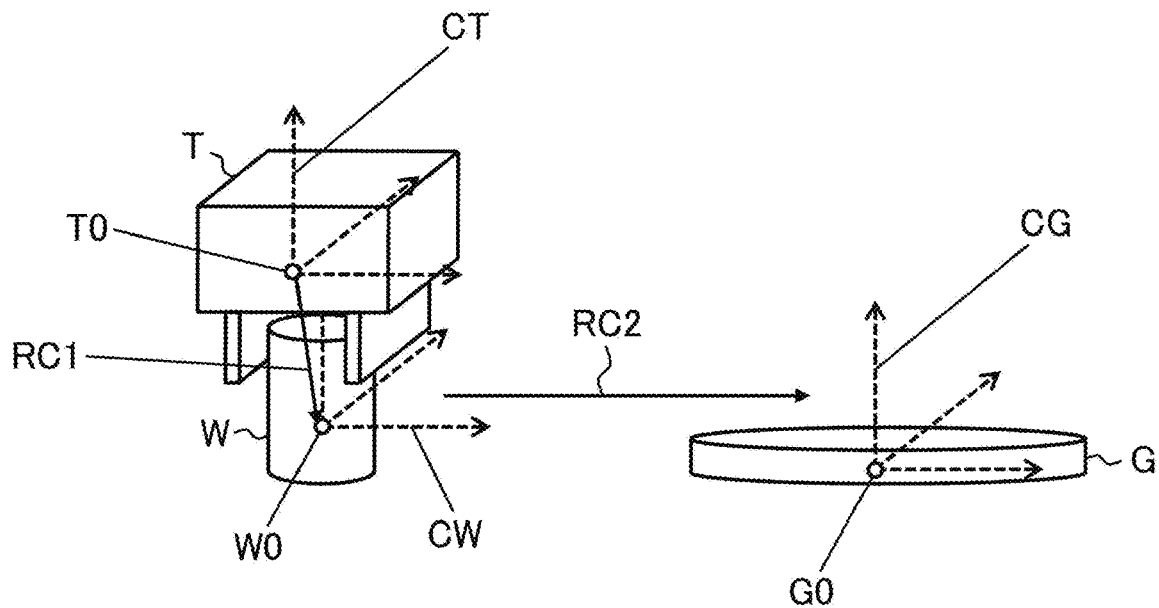
FIG. 2B is a schematic diagram illustrating two objects in an embodiment or embodiments showing an example positional relationship.

Defining the task state using the positional relationship between the first object and the second object will now be described with reference to FIGS. 2A and 2B. FIG. 2A is a schematic diagram of the end-effector T and the workpiece W for performing the first task, showing their example positional relationship. FIG. 2B is a schematic diagram of the workpiece W and the other workpiece G for performing the second task, showing their example positional relationship. In the present embodiment, the positional relationship between two objects is expressed using their relative coordinates as described above.

In the present embodiment, as shown in FIG. 2A, a target point T0 on the end-effector T is the endpoint of the manipulator 4 when the end-effector T is not holding the workpiece W, such as when the first task is performed. In the first task, the workpiece W is the destination object to which the end-effector T is to be moved. The positional relationship between the end-effector T and the workpiece W is expressed using relative coordinates RC1 of the workpiece W relative to the end-effector T. The relative coordinates RC1 are defined in a local coordinate system CW having the origin at a target point W0 on the workpiece W as viewed from a local coordinate system CT having the origin at the target point T0 on the end-effector T. In the present embodiment, the task state of the manipulator 4 is defined by the relative coordinates RC1 when the first task is performed.

As shown in FIG. 2B, the target point W0 on the workpiece W is the endpoint of the manipulator 4 when the end-effector T is holding the workpiece W, such as when the second task is performed. In the second task, the other workpiece G is the destination object to which the end-effector T is to be moved. The other workpiece G is an example of an object to which the workpiece W is to be joined. The positional relationship between the workpiece W and the other workpiece G is expressed using relative coordinates RC2 of the other workpiece G relative to the workpiece W. The relative coordinates RC2 are defined in a local coordinate system CG having the origin at a target point G0 on the other workpiece G as viewed from the local coordinate system CW having the origin at the target point W0 on the workpiece W. In the present embodiment, the task state of the manipulator 4 is defined by the relative coordinates RC2 when the second task is performed.

In other words, in the present embodiment, the task state is defined by the positional relationship (relative coordinates in the present embodiment) between the endpoint of the manipulator 4 and the destination object in both the situations in which the first task is performed and the second task is performed. The endpoint of the manipulator 4 corresponds to the first object, and the destination object corresponds to the second object. Each of the first task and the second task can be a task of moving the endpoint of the manipulator 4 relative to the destination object. The structure according to the present embodiment can simplify the control over the manipulator 4 and thus reduce the cost for creating or teaching the operation of the manipulator 4.

The target points (T0, W0, G0) may be set as appropriate. The relative coordinates may be defined in any manner as appropriate in each embodiment. For example, the relative coordinates RC1 and RC2 may be interchanged. More specifically, the relative coordinates RC1 may be in the local coordinate system CT having the origin at the target point T0 on the end-effector T as viewed from the local coordinate system CW having the origin at the target point W0 on the workpiece W. Moving the endpoint is not limited to moving the endpoint toward the destination object and may be determined as appropriate in each embodiment. For example, moving the endpoint may include moving the endpoint away from the destination object or to a predetermined position with reference to the destination object.

The second model generation apparatus 2 according to the present embodiment provides, to the trained determination model 50, information indicating a target task state of the first object and the second object to determine whether the first object and the second object come in contact with each other in the target task state. The second model generation apparatus 2 according to the present embodiment uses the determination result obtained by the trained determination model 50 to generate the inference model 55 that determines the goal task state to be achieved subsequently while avoiding contact of the first object with the second object.

Control Apparatus

The control apparatus 3 according to the present embodiment is a computer that controls the operation of the manipulator 4. More specifically, the control apparatus 3 according to the present embodiment obtains first sensing data from a first sensor system for observing the endpoint of the manipulator 4. The control apparatus 3 according to the present embodiment then calculates a first estimate value of the current coordinates of the endpoint in an observation space based on the obtained first sensing data using a first estimation model. The control apparatus 3 according to the present embodiment also obtains second sensing data from a second sensor system for observing the endpoint of the manipulator 4. The control apparatus 3 according to the present embodiment then calculates a second estimate value of the current coordinates of the endpoint in the observation space based on the obtained second sensing data using a second estimation model. Calculating the estimate values of the current coordinates of the endpoint corresponds to estimating the current value of the coordinates of the endpoint (hereafter also referred to as endpoint coordinates).

Each of the sensor systems includes one or more sensors for observing the endpoint of the manipulator 4. In the present embodiment, the first sensor system includes an encoder S2 for measuring the angle of each joint and a touch sensor S3 for measuring the force acting on the end-effector T. The measurement data (angle data and pressure distribution data) obtained with the encoder S2 and the touch sensor S3 is an example of the first sensing data. The second sensor system includes a camera S1. The image data obtained with the camera S1 is an example of the second sensing data. The control apparatus 3 according to the present embodiment calculates estimate values of the current endpoint coordinates based on the sensing data obtained from the sensor systems using the estimation models.

The endpoint coordinates of the manipulator 4 have a single true value. The calculation with no noise from each sensor system with the estimation models with appropriate parameters can yield the first estimate value and the second estimate value agreeing with each other. The first estimate value and the second estimate value can differ from each other when the calculation is affected by noise from each sensor system. The control apparatus 3 according to the present embodiment calculates the gradient of an error between the first estimate value and the second estimate value and adjusts parameter values for at least one of the first estimation model or the second estimation model to reduce the error based on the calculated gradient. The calculated estimate values are expected to approach the true value.

The control apparatus 3 according to the present embodiment determines a control command for the manipulator 4 to cause the endpoint coordinates to be closer to a goal value based on at least one of the first estimate value or the second estimate value. The control apparatus 3 according to the present embodiment provides the determined control command to the manipulator 4 to drive the manipulator 4. The control apparatus 3 according to the present embodiment thus controls the operation of the manipulator 4.

The method for determining the goal value of the endpoint coordinates may be generated with any method selected as appropriate in each embodiment. In the present embodiment, the above inference model 55 can be used to determine the goal value of the coordinates of the endpoint. The control apparatus 3 according to the present embodiment obtains the current task state of the manipulator 4. As described above, the task state is defined by the positional relationship between the endpoint of the manipulator 4 and the destination object. The control apparatus 3 according to the present embodiment then determines a goal task state to be achieved subsequently to the obtained current task state to be closer to a task state as a final goal using the above inference model 55. The control apparatus 3 according to the present embodiment then calculates the goal value of the endpoint coordinates based on the goal task state to be achieved subsequently. In the present embodiment, the goal value of the endpoint coordinates can be determined appropriately in performing the task.

Effects

As described above, the control apparatus 3 according to the present embodiment adjusts the parameters of at least one of the first estimation model or the second estimation model to allow these models to yield estimation results (estimate values) converging to a single value. Such adjustment can improve the accuracy in estimating the endpoint coordinates with each of these estimation models. The above structure thus improves the accuracy in estimating the endpoint coordinates with each estimation model and thus improves the accuracy in controlling the endpoint coordinates of the manipulator.

A known control method for the manipulator directly associates time-series control commands for the manipulator with their respective tasks. In other words, the known control method directly describes tasks being associated with the sequence of control commands. A slight change in at least either the environment in which a task is performed or an object may not be reflected in training results obtained with this method. This possibly disables the task from being performed appropriately.

In one situation, the manipulator may be taught to perform a task of holding a workpiece with its end-effector. The manipulator can hold a workpiece correctly placed at a target position with the end-effector based on the training results. However, the workpiece may be oriented or positioned differently from when training is performed. This changes the coordinates of the workpiece for the end-effector to hold and thus changes the task to be performed by the manipulator. The manipulator may fail to hold the workpiece appropriately with the end-effector with the sequence of control commands resulting from the training results.

A slight change in at least either the environment in which a task is performed or an object may not be reflected in training results obtained with the known method. To allow the manipulator to perform the task appropriately, the manipulator is to be newly trained to perform the task. To allow the manipulator to operate in versatile situations, the manipulator is to be trained using control commands for different states for each task. Teaching the manipulator to perform tasks is thus costly.

In the present embodiment, the state of the task to be performed by the manipulator 4 is represented by a relative relationship between objects, such as the end-effector T, the workpiece W, and the other workpiece G, or more specifically, using the positional relationship between the objects. Each control command for the manipulator 4 is not directly associated with the task, but is associated with the amount of change in the relative positional relationship between the objects. In other words, time-series control commands for the manipulator 4 can be generated or taught in response to a change in the relative positional relationship between the objects without being associated with the respective tasks. In the above example, a change in the coordinates of the workpiece is reflected in determining the positional relationship between the end-effector and the workpiece. The manipulator can thus appropriately hold the workpiece based on the training results. The structure according to the present embodiment can train the manipulator 4 to perform tasks in versatile situations, thus reducing the cost for teaching the manipulator 4 to perform tasks.

The first model generation apparatus 1 according to the present embodiment generates, through machine learning, the determination model 50 for determining whether two objects come in contact with each other in a target positional relationship. The trained determination model 50 generated through machine learning can determine, in response to a target positional relationship (relative coordinates in the present embodiment) provided as a set of continuous values, whether two objects in the positional relationship come in contact with each other without largely increasing the data volume for the determination model 50. The structure according to the present embodiment largely reduces the data volume for information indicating the boundary at which two objects come in contact with each other.

2. Example Configuration

Hardware Configuration
First Model Generation Apparatus

Figure 3:
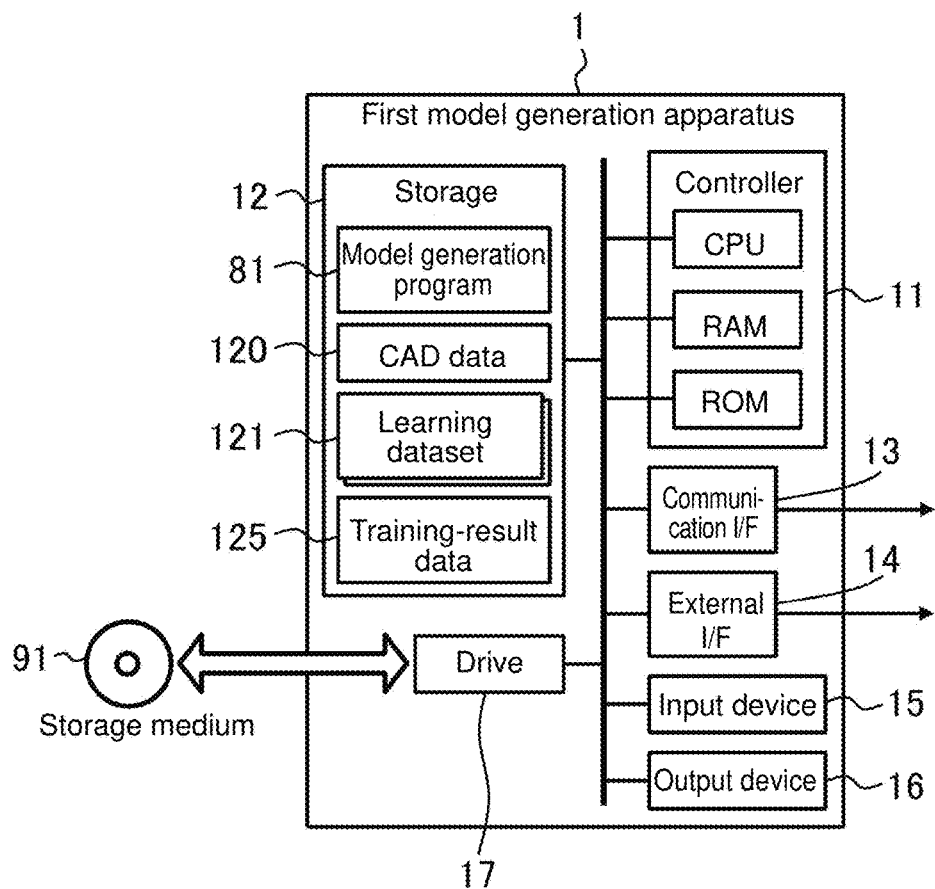
FIG. 3 is a schematic diagram illustrating a first model generation apparatus according to one or more embodiments showing an example hardware configuration.

The hardware configuration of the first model generation apparatus 1 according to the present embodiment will now be described with reference to FIG. 3. FIG. 3 is a schematic diagram of the first model generation apparatus 1 according to the present embodiment showing its example hardware configuration.

As shown in FIG. 3, the first model generation apparatus 1 according to the present embodiment is a computer including a controller 11, a storage 12, a communication interface 13, an external interface 14, an input device 15, an output device 16, and a drive 17 that are electrically connected to one another. In FIG. 3, the communication interface and the external interface are abbreviated as a communication I/F and an external I/F.

The controller 11 includes, for example, a central processing unit (CPU) as a hardware processor, a random-access memory (RAM), and a read-only memory (ROM). The controller 11 performs information processing based on programs and various sets of data. The storage 12 is an example memory and may include a hard disk drive and a solid-state drive. In the present embodiment, the storage 12 stores various types of information such as a model generation program 81, computer-aided design (CAD) data 120, multiple learning datasets 121, and training-result data 125.

The model generation program 81 causes the first model generation apparatus 1 to perform information processing described later (FIG. 10) associated with machine learning of the determination model 50. The model generation program 81 includes a series of commands for the information processing. The CAD data 120 includes structure information indicating a geometric structure, such as a model (e.g., a 3D model) for each object (the end-effector T, the workpiece W, or the other workpiece G). The CAD data 120 may be generated using known software. The multiple learning datasets 121 are used for training the determination model 50 through machine learning. The training-result data 125 represents information about the trained determination model 50 generated through machine learning. The training-result data 125 results from executing the model generation program 81. This will be described in detail later.

The communication interface 13 is, for example, a wired local area network (LAN) module or a wireless LAN module for wired or wireless communication through a network. The first model generation apparatus 1 uses the communication interface 13 to communicate data with other information processing apparatuses (e.g., the second model generation apparatus 2 and the control apparatus 3) with a network.

The external interface 14 is an interface for connection with an external device and may be, for example, a universal serial bus (USB) port or a dedicated port. The type and the number of external interfaces 14 may be selected as appropriate for the type and the number of external devices to be connected. The first model generation apparatus 1 may be connected to the manipulator 4 and the camera S1 through the external interface 14 to determine whether objects come in contact with each other in a real space.

The input device 15 is, for example, a mouse or a keyboard. The output device 16 is, for example, a display or a speaker. An operator may operate the first model generation apparatus 1 using the input device 15 and the output device 16.

The drive 17 is, for example, a compact disc (CD) drive or a digital versatile disc (DVD) drive for reading a program stored in a storage medium 91. The type of drive 17 may be selected as appropriate for the type of storage medium 91. At least one of the model generation program 81, the CAD data 120, or the multiple learning datasets 121 may be stored in the storage medium 91.

The storage medium 91 stores programs or other information in an electrical, magnetic, optical, mechanical, or chemical manner to allow a computer or another device or machine to read the recorded programs or other information. The first model generation apparatus 1 may obtain at least one of the model generation program 81, the CAD data 120, or the multiple learning datasets 121 from the storage medium 91.

In FIG. 3, the storage medium 91 is a disc storage medium, such as a CD or a DVD. However, the storage medium 91 is not limited to a disc. One example of the storage medium other than a disc is a semiconductor memory such as a flash memory.

For the specific hardware configuration of the first model generation apparatus 1, components may be eliminated, substituted, or added as appropriate in each embodiment. For example, the controller 11 may include multiple hardware processors. The hardware processors may include a microprocessor, a field-programmable gate array (FPGA), a digital signal processor (DSP), and other processors. The storage 12 may be the RAM and the ROM included in the controller 11. At least one of the communication interface 13, the external interface 14, the input device 15, the output device 16, or the drive 17 may be eliminated. The first model generation apparatus 1 may include multiple computers. In this case, each computer may have the same or a different hardware configuration. The first model generation apparatus 1 may also be an information processor dedicated to a relevant service, or may be a general-purpose server or a general-purpose personal computer (PC).

Second Model Generation Apparatus

Figure 4:
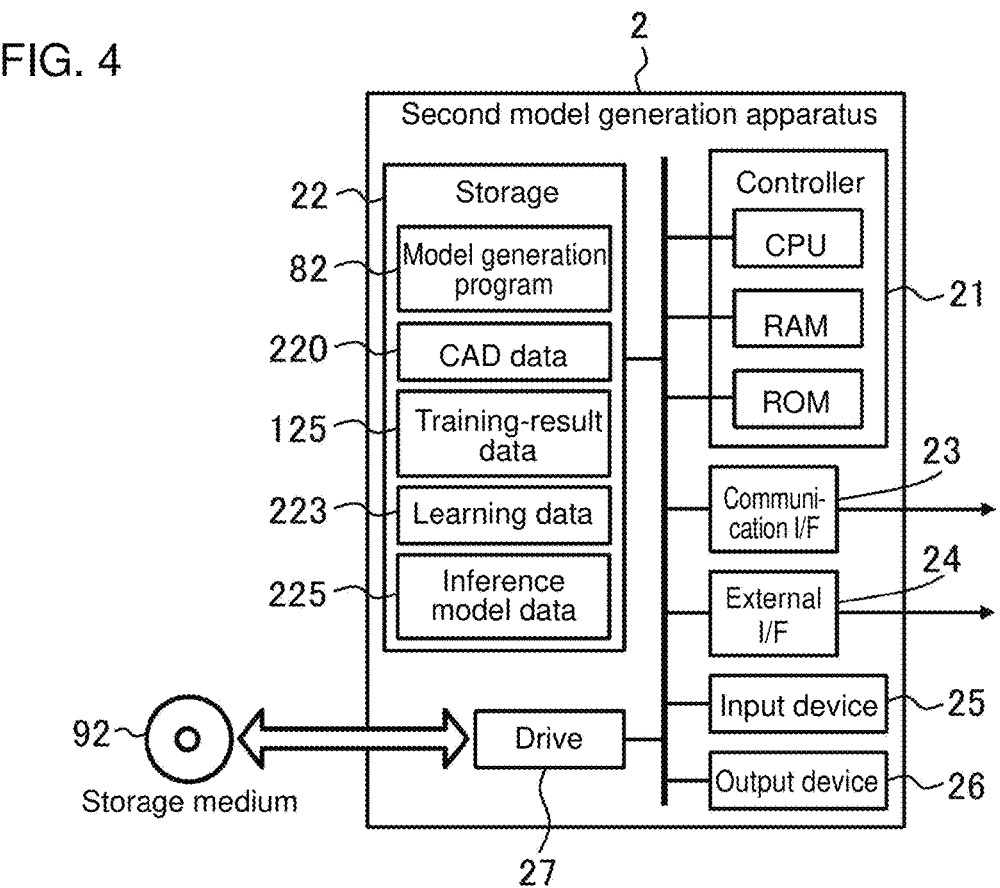
FIG. 4 is a schematic diagram illustrating a second model generation apparatus according to one or more embodiments showing an example hardware configuration.

The hardware configuration of the second model generation apparatus 2 according to the present embodiment will now be described with reference to FIG. 4. FIG. 4 is a schematic diagram of the second model generation apparatus 2 according to the present embodiment showing its example hardware configuration.

As shown in FIG. 4, the second model generation apparatus 2 according to the present embodiment is a computer including a controller 21, a storage 22, a communication interface 23, an external interface 24, an input device 25, an output device 26, and a drive 27 that are electrically connected to one another. In FIG. 4, the communication interface and the external interface are abbreviated as a communication I/F and an external I/F as in FIG. 3.

The components of the second model generation apparatus 2 from the controller 21 to the drive 27 may have the same structure as the corresponding components, or from the controller 11 to the drive 17, in the above first model generation apparatus 1. More specifically, the controller 21 includes, for example, a CPU as a hardware processor, a RAM, and a ROM, and performs various information processing operations based on programs and data. The storage 22 includes, for example, a hard disk drive and a solid-state drive. The storage 22 stores various types of information such as a model generation program 82, CAD data 220, the training-result data 125, learning data 223, and inference model data 225.

The model generation program 82 causes the second model generation apparatus 2 to perform information processing described later (FIG. 11) associated with generating the inference model 55 for inferring the goal task state. The model generation program 82 includes a series of commands for the information processing. Similarly to the CAD data 120, the CAD data 220 includes structure information indicating a geometric structure, such as a model for each object (the end-effector T, the workpiece W, or the other workpiece G). The training-result data 125 is used for defining the trained determination model 50. The learning data 223 is used for generating the inference model 55. The inference model data 225 represents information about the generated inference model 55. The inference model data 225 results from executing the model generation program 82. This will be described in detail later.

The communication interface 23 is an interface for wired or wireless communication through a network, and may be a wired LAN module or a wireless LAN module. The second model generation apparatus 2 uses the communication interface 23 to communicate data with other information processing apparatuses (e.g., the first model generation apparatus 1 and the control apparatus 3) with a network.

The external interface 24 is an interface for connection with external devices and may be, for example, a USB port or a dedicated port. The type and the number of external interfaces 24 may be selected as appropriate for the type and the number of external devices to be connected. The second model generation apparatus 2 may be connected to the manipulator 4 and the camera S1 through the external interface 24 to reconstruct the task state in a real space.

The input device 25 is, for example, a mouse or a keyboard. The output device 26 is, for example, a display or a speaker. An operator may operate the second model generation apparatus 2 using the input device 25 and the output device 26.

The drive 27 is, for example, a CD drive or a DVD drive for reading a program stored in a storage medium 92. Similarly to the storage medium 91, the storage medium 92 may be a disc storage medium or may be a storage medium other than a disc. At least one of the model generation program 82, the CAD data 220, the training-result data 125, or the learning data 223 may be stored in the storage medium 92. The second model generation apparatus 2 may obtain at least one of the model generation program 82, the CAD data 220, the training-result data 125, or the learning data 223 from the storage medium 92.

For the specific hardware configuration of the second model generation apparatus 2, components may be eliminated, substituted, or added as appropriate in each embodiment. For example, the controller 21 may include multiple hardware processors. Each hardware processor may include a microprocessor, an FPGA, a DSP, or other processors. The storage 22 may be the RAM and the ROM included in the controller 21. At least one of the communication interface 23, the external interface 24, the input device 25, the output device 26, or the drive 27 may be eliminated. The second model generation apparatus 2 may include multiple computers. In this case, each computer may have the same or a different hardware configuration. The second model generation apparatus 2 may be an information processing apparatus dedicated to a relevant service, or may be a general-purpose server or a general-purpose PC.

Control Apparatus

Figure 5:
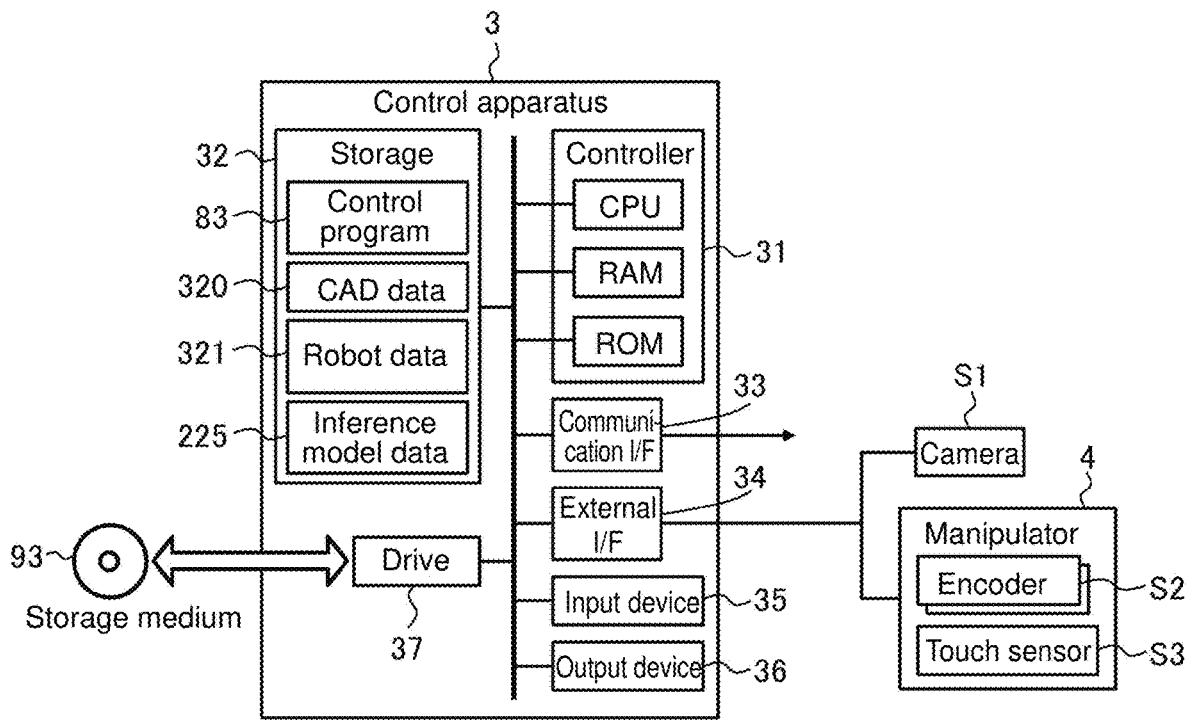
FIG. 5 is a schematic diagram illustrating a control apparatus according to one or more embodiments showing an example hardware configuration.

The hardware configuration of the control apparatus 3 according to the present embodiment will now be described with reference to FIG. 5. FIG. 5 is a schematic diagram of the control apparatus 3 according to the present embodiment showing its example hardware configuration.

As shown in FIG. 5, the control apparatus 3 according to the present embodiment is a computer including a controller 31, a storage 32, a communication interface 33, an external interface 34, an input device 35, an output device 36, and a drive 37 that are electrically connected to one another. In FIG. 5, the communication interface and the external interface are abbreviated as a communication I/F and an external I/F as in FIGS. 3 and 4.

The components of the control apparatus 3 from the controller 31 to the drive 37 may have the same structure as the corresponding components, or from the controller 11 to the drive 17, in the above first model generation apparatus 1. More specifically, the controller 31 includes, for example, a CPU as a hardware processor, a RAM, and a ROM, and performs various information processing operations based on programs and data. The storage 32 includes, for example, a hard disk drive and a solid-state drive. The storage 32 stores various types of information such as a control program 83, CAD data 320, robot data 321, and the inference model data 225.

The control program 83 causes the control apparatus 3 to perform information processing described later (FIGS. 16A, 16B, 20, and 21) for the control over the operation of the manipulator 4. The control program 83 includes a series of commands for the information processing. Similarly to the CAD data 120, the CAD data 320 includes structure information indicating a geometric structure, such as a model for each object (the end-effector T, the workpiece W, or the other workpiece G). The robot data 321 includes structure information indicating the structure of the manipulator 4, such as parameters for the joints. The inference model data 225 is used for defining the generated inference model 55. This will be described in detail later.

The communication interface 33 is an interface for wired or wireless communication through a network, and may be a wired LAN module or a wireless LAN module. The control apparatus 3 uses the communication interface 33 to communicate data with other information processing apparatuses (e.g., the first model generation apparatus 1 and the second model generation apparatus 2) with a network.

The external interface 34 is an interface for connection with external devices and may be, for example, a USB port or a dedicated port. The type and the number of external interfaces 34 may be selected as appropriate for the type and the number of external devices to be connected. The control apparatus 3 may be connected to the camera S1 and the manipulator 4 through the external interface 34. In the present embodiment, the manipulator 4 includes the encoder S2 for measuring the angle of each joint and the touch sensor S3 for measuring the force acting on the end-effector T.

The camera S1, the encoder S2, and the touch sensor S3 may be of any type selected as appropriate in each embodiment. The camera S1 may be, for example, a typical digital camera for obtaining RGB images, a depth camera for obtaining depth images, or an infrared camera for imaging the amount of infrared radiation. The touch sensor S3 may be, for example, a tactile sensor.

The control apparatus 3 can obtain sensing data from the sensors (the camera S1, each encoder S2, and the touch sensor S3) through the external interface 34. The control apparatus 3 may be connected to the camera S1 and the manipulator 4 in any manner. For example, when the camera S1 and the manipulator 4 include communication interfaces, the control apparatus 3 may be connected to the camera S1 and the manipulator 4 through the communication interface 33.

The input device 35 is, for example, a mouse or a keyboard. The output device 36 is, for example, a display or a speaker. An operator may operate the control apparatus 3 using the input device 35 and the output device 36.

The drive 37 is, for example, a CD drive or a DVD drive for reading a program stored in a storage medium 93. Similarly to the storage medium 91, the storage medium 93 may be a disc storage medium or may be a storage medium other than a disc. At least one of the control program 83, the CAD data 320, the robot data 321, or the inference model data 225 may be stored in the storage medium 93. The control apparatus 3 may obtain at least one of the control program 83, the CAD data 320, the robot data 321, or the inference model data 225 from the storage medium 93.

For the specific hardware configuration of the control apparatus 3, components may be eliminated, substituted, or added as appropriate in each embodiment. For example, the controller 31 may include multiple hardware processors. The hardware processors may include a microprocessor, an FPGA, a DSP, and other processors. The storage 32 may be the RAM and the ROM included in the controller 31. At least one of the communication interface 33, the external interface 34, the input device 35, the output device 36, or the drive 37 may be eliminated. The control apparatus 3 may include multiple computers. In this case, each computer may have the same or a different hardware configuration. The control apparatus 3 may also be an information processor dedicated to a relevant service, or may be a general-purpose server, a general-purpose PC, or a programmable logic controller (PLC).

Manipulator

Figure 6:
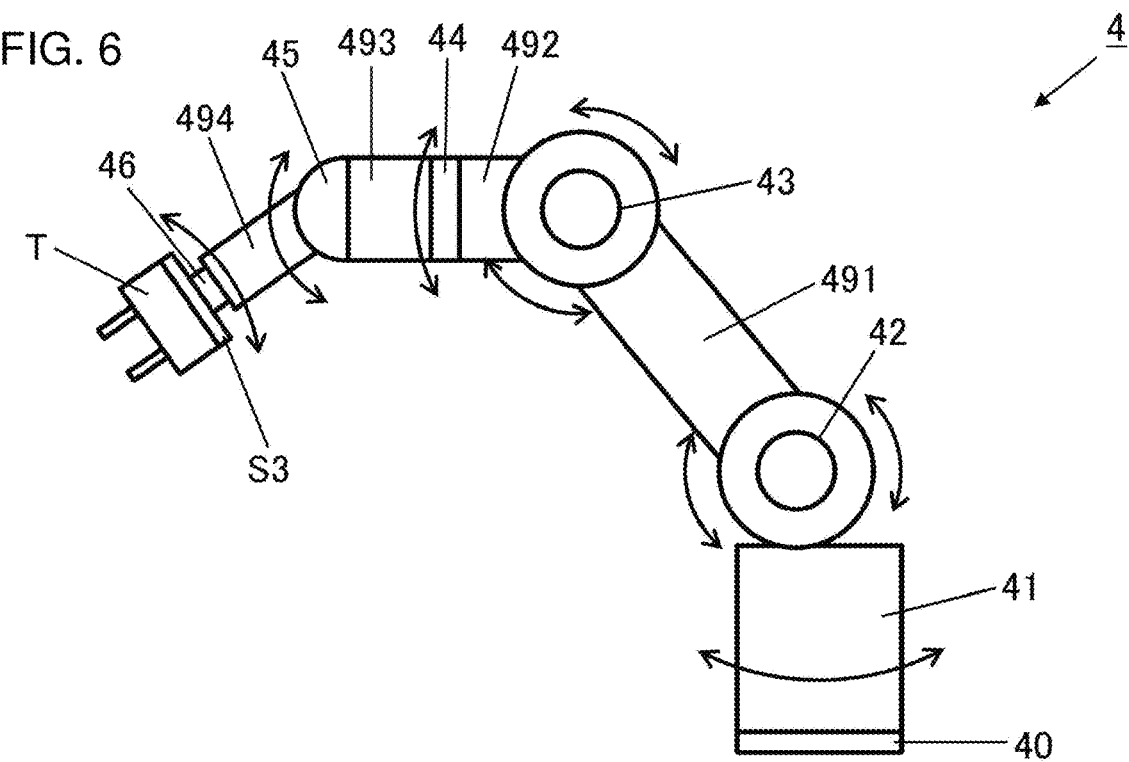
FIG. 6 is a schematic diagram illustrating an example manipulator in one or more embodiments.

The hardware configuration of the manipulator 4 in the present embodiment will now be described with reference to FIG. 6. FIG. 6 is a schematic diagram of the manipulator 4 in the present embodiment showing its example hardware configuration.

The manipulator 4 in the present embodiment is a vertically articulated six-axis industrial robot with a base 40 and six joints 41 to 46. Each of the joints 41 to 46 incorporates a servomotor (not shown) and is rotatable about its axis. The first joint 41 is connected to the base 40 and has its distal end rotating about the axis of the base. The second joint 42 is connected to the first joint 41 and has its distal end rotating in the back-and-forth direction. The third joint 43 is connected to the second joint 42 with a link 491 and has its distal end rotating vertically. The fourth joint 44 is connected to the third joint 43 with a link 492 and has its distal end rotating about the axis of the link 492. The fifth joint 45 is connected to the fourth joint 44 with a link 493 and has its distal end rotating vertically. The sixth joint 46 is connected to the fifth joint 45 with a link 494 and has its distal end rotating about the axis of the link 494. The sixth joint 46 has its distal end receiving the touch sensor S3 and the end-effector T.

Each of the joints 41 to 46 further incorporates the encoder S2. Each encoder S2 measures the angle (control amount) of the corresponding one of the joints 41 to 46. The measurement data (angle data) for each encoder S2 can be used to control the angle of the corresponding one of the joints 41 to 46. The touch sensor S3 detects the force acting on the end-effector T. The measurement data (pressure distribution data) from the touch sensor S3 may be used to estimate the position and the orientation of the workpiece W held by the end-effector T, or to detect any abnormal force acting on the end-effector T.

The manipulator 4 may have any other hardware configuration. For the specific hardware configuration of the manipulator 4, components may be eliminated, substituted, or added as appropriate in each embodiment. For example, the manipulator 4 may include a sensor other than the encoder S2 and the touch sensor S3 to observe the control amount or other attributes. For example, the manipulator 4 may further include a torque sensor. In this case, the manipulator 4 may measure the force acting on the end-effector T with the torque sensor and may be controlled to avoid the end-effector T receiving an excessive force based on the measurement value of the torque sensor. The manipulator 4 may have any number of axes other than six axes. The manipulator 4 may be a known industrial robot.

Software Configuration

First Model Generation Apparatus

Figure 7:
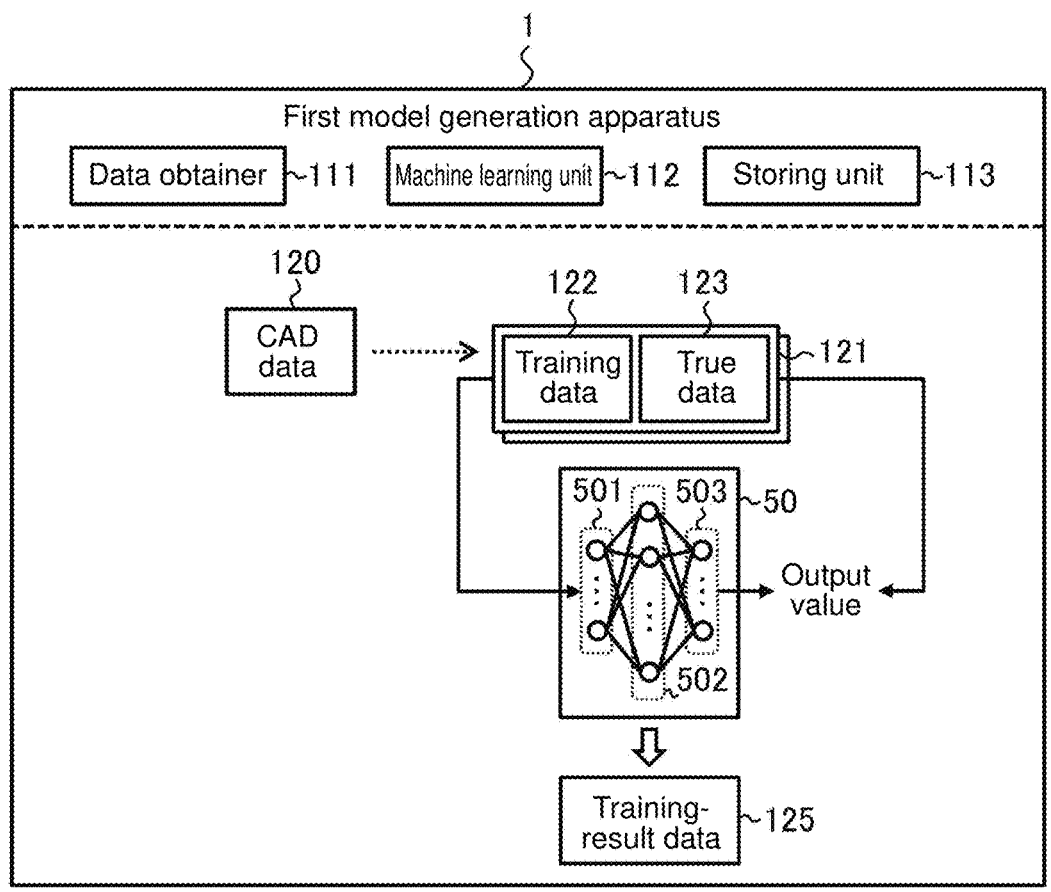
FIG. 7 is a schematic diagram illustrating a first model generation apparatus according to one or more embodiments showing an example software configuration.

The software configuration of the first model generation apparatus 1 according to the present embodiment will now be described with reference to FIG. 7. FIG. 7 is a schematic diagram of the first model generation apparatus 1 according to the present embodiment showing its example software configuration.

The controller 11 in the first model generation apparatus 1 loads the model generation program 81 stored in the storage 12 into the RAM. The CPU in the controller 11 then interprets and executes a command included in the model generation program 81 loaded in the RAM to control each unit. The first model generation apparatus 1 according to the present embodiment thus operates as a computer including a data obtainer 111, a machine learning unit 112, and a storing unit 113 as software modules as shown in FIG. 7. In other words, in the present embodiment, each software module in the first model generation apparatus 1 is implemented by the controller 11 (CPU).

The data obtainer 111 obtains multiple learning datasets 121. Each learning dataset 121 includes a combination of the training data 122 and the true data 123. The training data 122 indicates the positional relationship between two objects. The true data 123 indicates whether two objects come in contact with each other in the positional relationship. The training data 122 is used as input data for machine learning. The true data 123 is used as a supervisory signal (label) for machine learning. The training data 122 and the true data 123 may be in any format selected as appropriate in each embodiment. For example, the training data 122 may represent the relative coordinates between two objects, or may represent values resulting from conversion of the relative coordinates into a feature quantity. The CAD data 120 can be used to determine whether target two objects come in contact with each other in a target positional relationship. The CAD data 120 can thus be used to generate each learning dataset 121.

The machine learning unit 112 trains the determination model 50 through machine learning using the obtained multiple learning datasets 121. Such machine learning includes training the determination model 50 to output, in response to an input of the training data 122 included in each learning dataset 121, an output value that fits the true data 123 included in the corresponding learning dataset 121. The trained determination model 50 trained through machine learning is built to be capable of determining whether two objects come in contact with each other. The storing unit 113 generates information about the built trained determination model 50 as the training-result data 125 and stores the generated training-result data 125 into a predetermined storage area.

Configuration of Determination Model

The determination model 50 in one example will now be described. The determination model 50 in the present embodiment includes a multilayered neural network for deep learning. In the example shown in FIG. 7, the determination model 50 includes a three-layered fully coupled neural network. The determination model 50 includes an input layer 501, an intermediate (hidden) layer 502, and an output layer 503. However, the configuration of the determination model 50 is not limited to the above example and may be selected as appropriate in each embodiment. For example, the determination model 50 may include two or more intermediate layers. The intermediate layer 502 may be eliminated.

Each of the layers 501 to 503 may include any number of neurons (nodes) that may be selected as appropriate in each embodiment. For example, the number of neurons in the input layer 501 may be determined in accordance with the number of dimensions of the relative coordinates expressing the positional relationship between two objects. The number of neurons in the output layer 503 may be determined in accordance with the manner of expressing whether two objects come in contact with each other. To express whether two objects come in contact with each other using one numerical value (e.g., a numerical value of 0 to 1), for example, the output layer 503 may include one neuron. To express whether two objects come in contact with each other using two numerical values, or more specifically, a first numerical value indicating the probability of contact and a second numerical value indicating the probability of no contact, for example, the output layer 503 may include two neurons.

Neurons in neighboring layers are coupled to each other as appropriate. In the present embodiment, each neuron is coupled to all neurons in its adjacent layers. The neurons may be coupled in a manner other than in this example and may be determined as appropriate in each embodiment. Each coupling has a preset weight (coupling weight). Each neuron has a preset threshold. An output of each neuron is determined basically depending on whether the sum of the product of each input and the corresponding weight exceeds the threshold. The threshold may be expressed using an activation function. The sum of the product of each input and the corresponding weight may be input into the activation function for computation to determine the output of each neuron. The activation function may be of any type selected as appropriate in each embodiment. The coupling weight between neurons included in each of the layers 501 to 503 and the threshold of each neuron are examples of the computational parameters of the determination model 50.

The machine learning unit 112 in the present embodiment trains, through machine learning, the determination model 50 including the neural network using multiple learning datasets 121. More specifically, the machine learning unit 112 adjusts, for each learning dataset 121, the value of each computational parameter of the determination model 50 to output an output value that fits the true data 123 from the output layer 503 in response to an input of the training data 122 into the input layer 501. The trained determination model 50 is thus generated to be capable of determining whether two objects come in contact with each other.

The storing unit 113 generates information indicating the configuration of the built trained determination model 50 and indicating the computational parameters as the training-result data 125. The storing unit 113 stores the generated training-result data 125 into a predetermined storage area. The details of the training-result data 125 are not limited to the above example and may be modified to regenerate the trained determination model 50. For the apparatuses using the determination models 50 having the same configuration, for example, the training-result data 125 may not include information indicating the configuration of the determination model 50.

Second Model Generation Apparatus

Figure 8:
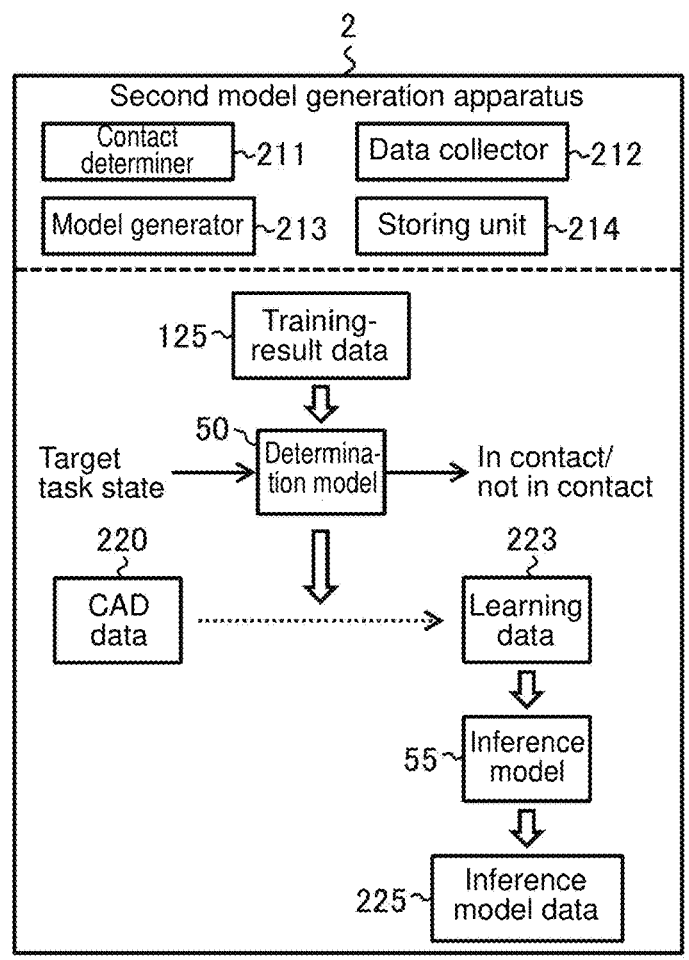
FIG. 8 is a schematic diagram illustrating a second model generation apparatus according to one or more embodiments showing an example software configuration.

The software configuration of the second model generation apparatus 2 according to the present embodiment will now be described with reference to FIG. 8. FIG. 8 is a schematic diagram of the second model generation apparatus 2 according to the present embodiment showing its example software configuration.

The controller 21 in the second model generation apparatus 2 loads the model generation program 82 stored in the storage 22 into the RAM. The CPU in the controller 21 then interprets and executes a command included in the model generation program 82 loaded in the RAM to control each unit. The second model generation apparatus 2 according to the present embodiment thus operates as a computer including a contact determiner 211, a data collector 212, a model generator 213, and a storing unit 214 as software modules as shown in FIG. 8. In other words, in the present embodiment, each software module in the second model generation apparatus 2 is implemented by the controller 21 (CPU) as in the first model generation apparatus 1.

The contact determiner 211 includes the trained determination model 50 stored as the training-result data 125. The contact determiner 211 refers to the training-result data 125 to define the trained determination model 50. The trained determination model 50 trained through machine learning is capable of determining whether the first object and the second object come in contact with each other. The contact determiner 211 provides, to the trained determination model 50, information indicating a target task state of the first object and the second object to determine whether the first object and the second object come in contact with each other in the target task state.

More specifically, the determination result obtained by the trained determination model 50 is used by the data collector 212 and the model generator 213 to generate the inference model 55 that determines the goal task state to be achieved subsequently based on the task state as the final goal and the current task state while avoiding contact of the first object with the second object. The data collector 212 uses the determination result obtained by the trained determination model 50 to collect the learning data 223 to be used for generating the inference model 55. The learning data 223 may be collected by further using the CAD data 220. The model generator 213 uses the collected learning data 223 to generate the inference model 55. The learning data 223 and the inference model 55 will be described in detail later. The storing unit 214 generates information about the generated inference model 55 as the inference model data 225 and stores the generated inference model data 225 into a predetermined storage area.

Control Apparatus

Figure 9:
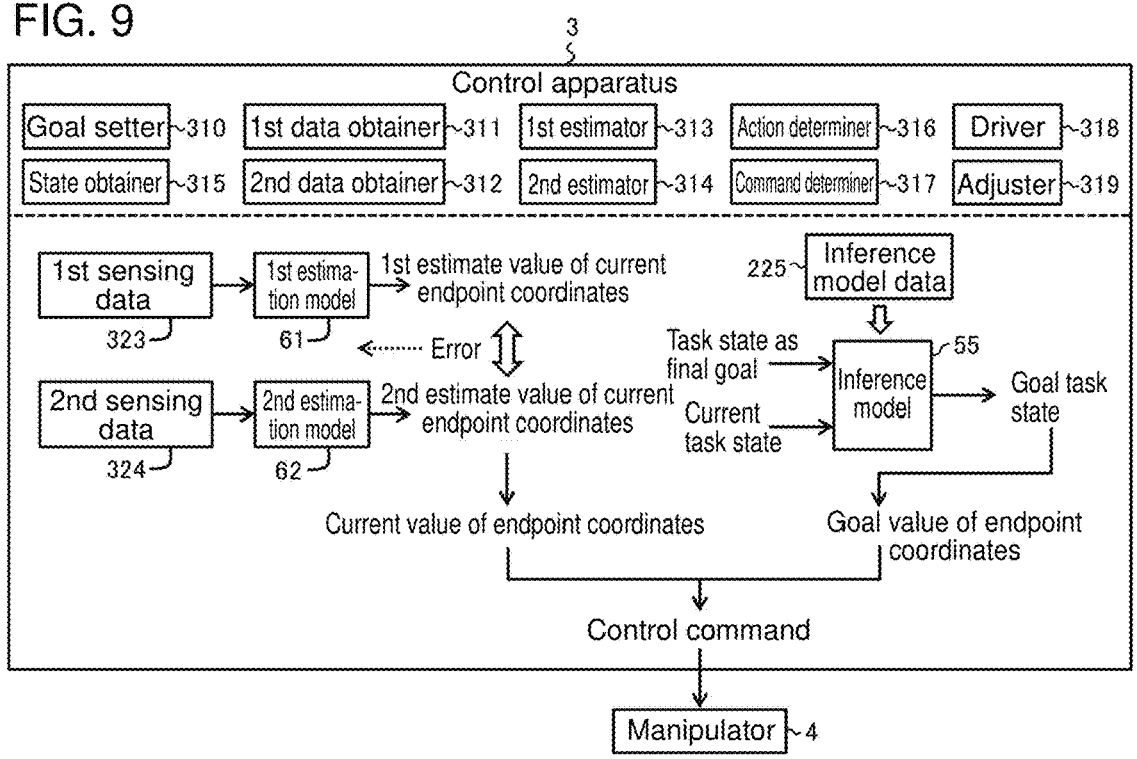
FIG. 9 is a schematic diagram illustrating a control apparatus according to one or more embodiments showing an example software configuration.

The software configuration of the control apparatus 3 according to the present embodiment will now be described with reference to FIG. 9. FIG. 9 is a schematic diagram of the control apparatus 3 according to the present embodiment showing its example software configuration.

The controller 31 in the control apparatus 3 loads the control program 83 stored in the storage 32 into the RAM. The CPU in the controller 31 then interprets and executes a command included in the control program 83 loaded in the RAM to control each unit. The control apparatus 3 according to the present embodiment thus operates as a computer including a goal setter 310, a first data obtainer 311, a second data obtainer 312, a first estimator 313, a second estimator 314, a state obtainer 315, an action determiner 316, a command determiner 317, a driver 318, and an adjuster 319 as software modules as shown in FIG. 9. In other words, in the present embodiment, each software module in the control apparatus 3 is implemented by the controller 31 (CPU) as in the first model generation apparatus 1.

The goal setter 310 sets the task state as the final goal in accordance with the task to be performed. In the present embodiment, the task state is defined by the positional relationship between the first object and the second object used in the task to be performed, or more specifically, between the endpoint of the manipulator 4 and the destination object. In the present embodiment, the positional relationship is expressed using their relative coordinates. The final goal refers to a goal point (goal) to be reached upon completion of the task.

The destination object may be selected as appropriate for the task to be performed. In one example, the destination object may be the workpiece W when the manipulator 4 (end-effector T) is not holding the workpiece W. When the manipulator 4 (end-effector T) is holding the workpiece W, the destination object may be an object to which the workpiece W is to be joined (the other workpiece G in the present embodiment).

The first data obtainer 311 obtains first sensing data 323 from the first sensor system for observing the endpoint of the manipulator 4. In the present embodiment, the first data obtainer 311 obtains measurement data from each encoder S2 and the touch sensor S3 as the first sensing data 323. The second data obtainer 312 obtains second sensing data 324 from the second sensor system for observing the endpoint of the manipulator 4. In the present embodiment, the second data obtainer 312 obtains image data from the camera S1 as the second sensing data 324.

The first estimator 313 calculates a first estimate value of the current endpoint coordinates in an observation space based on the obtained first sensing data 323 using the first estimation model 61. The second estimator 314 calculates a second estimate value of the current endpoint coordinates in the observation space based on the obtained second sensing data 324 using the second estimation model 62. The adjuster 319 calculates the gradient of the error between the first estimate value and the second estimate value and adjusts the parameter values for at least one of the first estimation model 61 or the second estimation model 62 to reduce the error based on the calculated gradient.

The state obtainer 315 obtains information indicating the current task state of the manipulator 4. Being current refers to being at a time point at which the operation of the manipulator 4 is controlled, or more specifically, being at a time point immediately before a control command for the manipulator 4 is determined.

The action determiner 316 determines the goal task state to be achieved subsequently to the current task state indicated by the obtained information to be closer to the task state as the final goal. The goal includes the final goal and may be selected as appropriate to perform the task. The number of goals to be set including the final goal may be one (the final goal alone is set in this case) or two or more. The goals other than the final goal are waypoints between the start point and the goal point of the task. The final goal may thus be simply referred to as a goal, and a goal other than the final goal may be simply referred to as a subgoal. The subgoal may also be referred to as a waypoint. The subsequent goal refers to the goal task state to be achieved subsequently to the current task state (a temporary task state for a goal other than the final goal). For example, the subsequent goal may be the goal closest to the current task state toward the final goal.

In the present embodiment, the action determiner 316 includes the generated inference model 55 stored as the inference model data 225. The action determiner 316 determines the goal task state to be achieved subsequently based on the task state as the final goal and the current task state using the generated inference model 55.

The command determiner 317 determines a control command for the manipulator 4 to cause the endpoint coordinates to be closer to a goal value based on at least one of the first estimate value or the second estimate value. The driver 318 provides the determined control command to the manipulator 4 to drive the manipulator 4.

In the present embodiment, the control command includes a command value for each joint. The command determiner 317 determines the current value of the endpoint coordinates of the manipulator 4 based on at least one of the first estimate value or the second estimate value. The command determiner 317 also calculates the goal value of the endpoint coordinates based on the determined goal task state to be achieved subsequently. The command determiner 317 calculates the amount of change in the angle of each joint based on the difference between the current value and the goal value of the endpoint coordinates. The command determiner 317 determines the command value for each joint based on the calculated amount of change in the angle of each joint. The driver 318 drives each joint in accordance with the determined command value. The control apparatus 3 according to the present embodiment controls the operation of the manipulator 4 through the above series of processing steps.

Others

Each software module in the first model generation apparatus 1, the second model generation apparatus 2, and the control apparatus 3 will be described in detail in the operation examples below. In the present embodiment, each software module in the first model generation apparatus 1, the second model generation apparatus 2, and the control apparatus 3 is implemented by a general-purpose CPU. However, some or all of the software modules may be implemented by one or more dedicated processors. For the software configurations of the first model generation apparatus 1, the second model generation apparatus 2, and the control apparatus 3, software modules may be eliminated, substituted, or added as appropriate in each embodiment.

3. Operation Example

First Model Generation Apparatus

Figure 10:
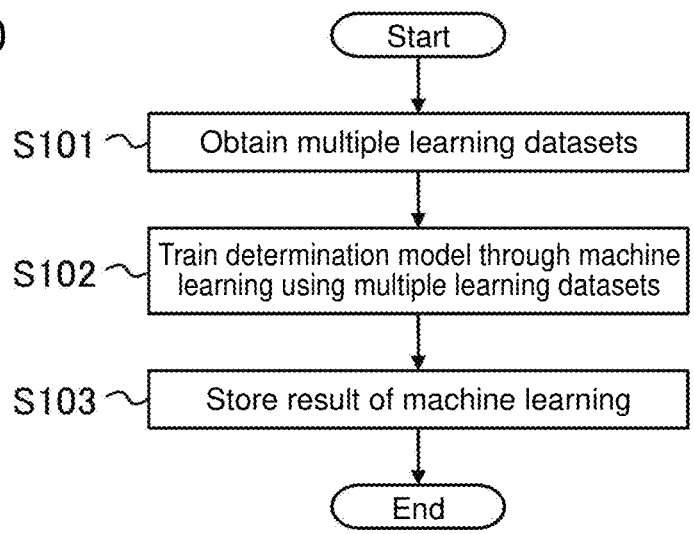
FIG. 10 is a flowchart illustrating an example procedure performed by a first model generation apparatus according to one or more embodiments.

An operation example of the first model generation apparatus 1 will now be described with reference to FIG. 10. FIG. 10 is a flowchart of an example procedure performed by the first model generation apparatus 1 according to the present embodiment for training the determination model 50 through machine learning. The procedure described below is an example of a model generation method for generating the determination model 50 in an aspect of the present invention. However, the procedure below is a mere example, and each of its steps may be modified in any possible manner. In the procedure below, steps may be eliminated, substituted, or added as appropriate in each embodiment.

Step S101

In step S101, the controller 11 operates as the data obtainer 111 and obtains multiple learning datasets 121 to be used for training the determination model 50 through machine learning. Each learning dataset 121 includes a combination of the training data 122 and the true data 123. The training data 122 indicates the positional relationship between two objects. The true data 123 indicates whether two objects come in contact with each other in the positional relationship.

Each learning dataset 121 may be generated with any method selected as appropriate in each embodiment. For example, two objects are placed in various positional relationships in a virtual space using the CAD data 120. In the present embodiment, the positional relationship between two objects is expressed using their relative coordinates. In the present embodiment, at least one of two objects is to be moved by the operation of the manipulator 4. For the first task, the end-effector T and the workpiece W are examples of the objects. For the second task, the workpiece W held by the end-effector T and the other workpiece G are examples of the objects. Of these two objects, one is the endpoint of the manipulator 4, and the other is the destination object. The positions of the objects may be specified by an operator or may be determined randomly. In some embodiments, one object may be stationary, and the other object may be moved variously under a rule to vary the positional relationship between the two objects. The rule for positioning the other object may be set as appropriate. This allows the relative coordinates in each positional relationship to be obtained as the training data 122 included in each learning dataset 121. The CAD data 120 includes a model for each object. The CAD data 120 can thus be used to determine whether target two objects come in contact with each other in a target positional relationship. The CAD data 120 is used to determine whether two objects come in contact with each other in each positional relationship. The determination result as the true data 123 is then associated with the corresponding training data 122. Each learning dataset 121 is generated in this manner, or may be generated with another method. Each learning dataset 121 may be generated using an actual object in a real space.

Each learning dataset 121 may be generated automatically through a computer operation or at least partially manually through an operation performed by an operator. Each learning dataset 121 may be generated by the first model generation apparatus 1 or by a computer other than the first model generation apparatus 1. When the first model generation apparatus 1 generates each learning dataset 121, the controller 11 may perform the series of processing steps described above automatically or in response to a manual operation performed on the input device 15 by an operator to obtain multiple learning datasets 121. When another computer generates each learning dataset 121, the controller 11 may obtain multiple learning datasets 121 generated by the other computer through, for example, a network or the storage medium 91. In this case, the first model generation apparatus 1 may not include the CAD data 120. Some of the learning datasets 121 may be generated by the first model generation apparatus 1, and the remaining other learning datasets 121 may be generated by one or more other computers.

The number of learning datasets 121 to be obtained may be selected as appropriate in each embodiment. Upon obtaining multiple learning datasets 121, the controller 11 advances the processing to subsequent step S102.

Step S102

In step S102, the controller 11 operates as the machine learning unit 112 and trains the determination model 50 through machine learning using the obtained multiple learning datasets 121. In the present embodiment, the controller 11 trains, for each learning dataset 121, the determination model 50 through machine learning to output an output value that fits the true data 123 from the output layer 503 in response to an input of the training data 122 into the input layer 501. The controller 11 thus builds the trained determination model 50 capable of determining whether two objects come in contact with each other in a target positional relationship.

The procedure for machine learning may be determined as appropriate in each embodiment. In one example, the controller 11 first prepares the determination model 50 to be processed. The configuration of the determination model 50 (e.g., the number of layers, the number of neurons in each layer, and the couplings between neurons in adjacent layers) to be prepared, the default values of the coupling weights between neurons, and the default threshold of each neuron may be preset using a template or may be input by an operator. For retraining, the controller 11 may prepare the determination model 50 based on training-result data previously obtained through past machine learning.

The controller 11 then uses the training data 122 included in each learning dataset 121 as input data and uses the true data 123 as a supervisory signal to perform a training process for training the determination model 50 (neural network). The training process may include batch gradient descent, stochastic gradient descent, and mini-batch gradient descent.

In the first step, for example, the controller 11 inputs, for each learning dataset 121, the training data 122 into the determination model 50 and performs a computational operation of the determination model 50. The controller 11 inputs the training data 122 into the input layer 501 and then determines neuronal firing in each of the layers 501 to 503 sequentially from the layer on the input end (or in other words, performs forward propagation computation). Through the computational operation, the controller 11 obtains, from the output layer 503 in the determination model 50, an output value corresponding to the result of determination as to whether two objects come in contact with each other in the positional relationship represented by the training data 122.

In the second step, the controller 11 calculates an error (loss) between the output value obtained from the output layer 503 and the true data 123 based on a loss function. A loss function is used to evaluate a difference (or in other words, the degree of mismatch) between an output from the learning model and a true result. An error calculated using the loss function is greater as a difference between the output value obtained from the output layer 503 and the true data 123 is greater. The loss function used for calculating such an error may be of any type selected as appropriate in each embodiment.

In the third step, the controller 11 calculates an error in the values of the computational parameters (e.g., the coupling weights between neurons and the threshold of each neuron) for the determination model 50 using the gradient of the calculated error in the output value by the error back propagation method. In the fourth step, the controller 11 updates the values of the computational parameters of the determination model 50 based on the calculated error. The computational parameters may be updated by the degree adjusted based on the learning rate. The learning rate may be specified by an operator or may be a preset value in the program.

Through the first to fourth steps described above performed repeatedly, the controller 11 adjusts, for each learning dataset 121, the value of each computational parameter of the determination model 50 to reduce the sum of the errors between the output values obtained from the output layer 503 and the corresponding true data 123. For example, the controller 11 may repeat the above first to fourth steps until the sum of the errors is less than or equal to a threshold. The threshold may be determined as appropriate in each embodiment. The controller 11 can thus build the trained determination model 50 trained through machine learning to output, in response to an input of the training data 122 included in each learning dataset 121 into the input layer 501, an output value that fits the true data 123 included in the corresponding learning dataset 121 from the output layer 503. Fitting herein may include an allowable difference based on, for example, a threshold between the output value from the output layer 503 and the supervisory signal (true data 123). Upon training of the determination model 50 through machine learning, the controller 11 advances the processing to subsequent step S103.

Step S103

In step S103, the controller 11 operates as the storing unit 113 and stores information about the trained determination model 50 built through machine learning into a predetermined storage area as the training-result data 125. In the present embodiment, the controller 11 generates information indicating the configuration and the computational parameters of the trained determination model 50 built in step S102 as the training-result data 125. The controller 11 stores the generated training-result data 125 into a predetermined storage area.

The predetermined storage area may be, for example, the RAM in the controller 11, the storage 12, an external storage, a storage medium, or a combination of these. The storage medium is, for example, a CD or a DVD. The controller 11 may store the training-result data 125 into the storage medium through the drive 17. The external storage may be a data server, such as a network attached storage (NAS). In this case, the controller 11 may use the communication interface 13 to store the training-result data 125 into the data server through a network. The external storage may be connected to the first model generation apparatus 1.

Upon storage of the training-result data 125, the controller 11 ends the series of processing steps for generating the trained determination model 50.

The generated training-result data 125 may be provided to the second model generation apparatus 2 at any selected time. For example, the controller 11 may transfer the training-result data 125 to the second model generation apparatus 2 in step S103 or in a step separate from step S103. The second model generation apparatus 2 may receive the transferred data to obtain the training-result data 125. In another example, the second model generation apparatus 2 may use the communication interface 23 to access the first model generation apparatus 1 or a data server through a network and obtain the training-result data 125. In still another example, the second model generation apparatus 2 may obtain the training-result data 125 through the storage medium 92. For example, the second model generation apparatus 2 may prestore the training-result data 125.

Further, the controller 11 may update or newly generate the training-result data 125 by regularly or irregularly repeating the processing in steps S101 to S103 above. During the repeated processes, at least some of multiple learning datasets 121 may undergo changes, modifications, additions, and deletions as appropriate. The controller 11 may provide the updated or newly generated training-result data 125 to the second model generation apparatus 2 through every training process to update the training-result data 125 stored in the second model generation apparatus 2.

Second Model Generation Apparatus

Figure 11:
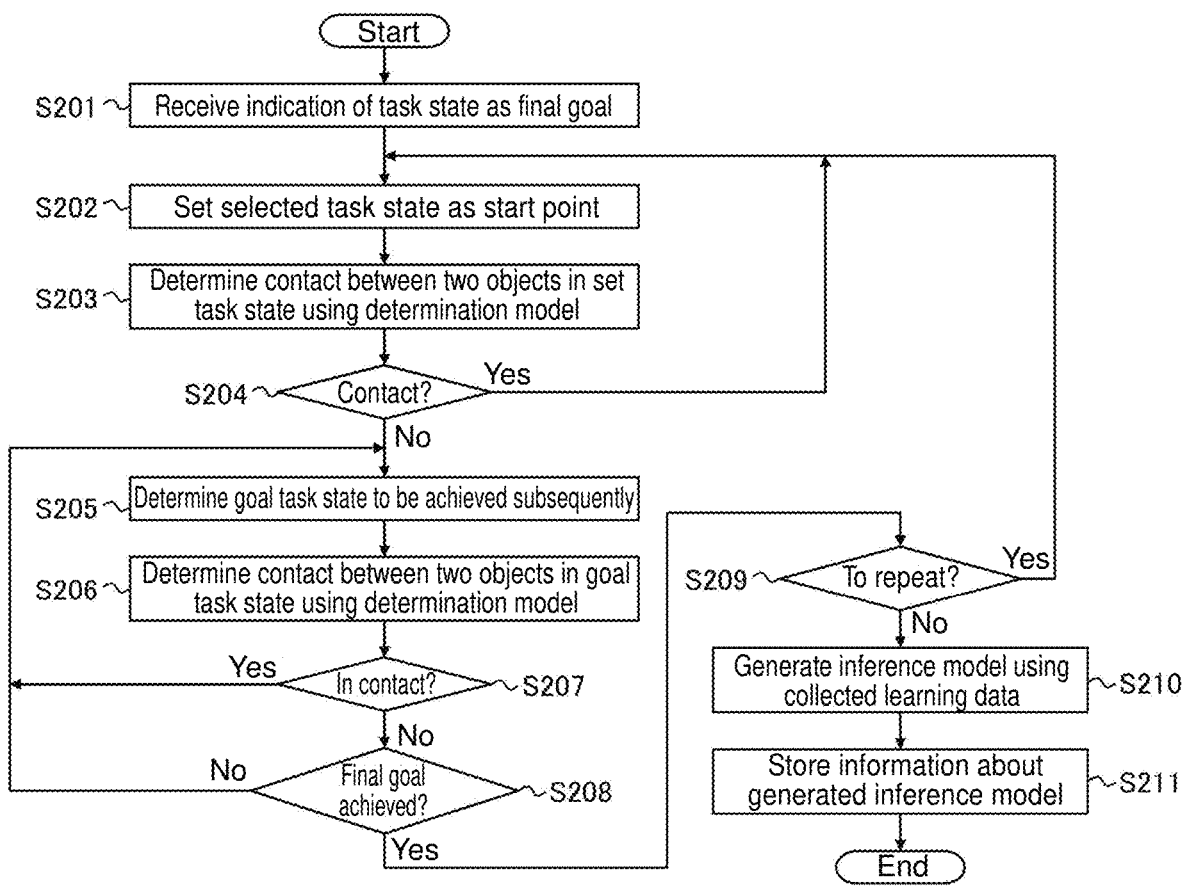
FIG. 11 is a flowchart illustrating an example procedure performed by a second model generation apparatus according to one or more embodiments.

An operation example of the second model generation apparatus 2 for generating the inference model 55 will now be described with reference to FIG. 11. FIG. 11 is a flowchart of an example procedure performed by the second model generation apparatus 2 according to the present embodiment for generating the inference model 55. The procedure below is a mere example, and each of its steps may be modified in any possible manner. In the procedure below, steps may be eliminated, substituted, or added as appropriate in each embodiment.

Step S201

In step S201, the controller 21 receives an indication of a task state as a final goal specified for the task to be performed by the manipulator 4. The task state is defined using the positional relationship between the first object and the second object, or more specifically, between the endpoint of the manipulator 4 and the destination object. In the present embodiment, the positional relationship between two objects is expressed using their relative coordinates.

The relative coordinates for the final task state may be specified with any method selected as appropriate in each embodiment. For example, the relative coordinates for the final task state may be directly specified through an operator input using the input device 25. In another example, the relative coordinates for the final task state may be specified in accordance with the task to be performed selected through an operator input. In still another example, the relative coordinates for the final goal may be specified by the models for the objects being placed in a positional relationship at the final goal in a virtual space using the CAD data 220. The models for the objects may be placed automatically with a simulator or manually through an operator input. For the task state specified as the final goal, the controller 21 advances the processing to subsequent step S202.

Steps S202 to S204

In step S202, the controller 21 sets any selected task state as a start point. The task state set as the start point corresponds to the state at the start of the task. The task state as the start point may be set randomly or specified through an operator input. The start point may be specified by an operator similarly to the final goal being specified as described above. The task state as the start point may be determined using any selected algorithm. In one example, actual objects placed in a real space are imaged with a camera to obtain image data including the objects. The obtained image data may undergo image processing (e.g., matching using the CAD data 220) to determine the task state as the start point. The task state as the start point may be determined in another manner as appropriate using the CAD data 220.

In step S203, the controller 21 operates as the contact determiner 211 and determines whether two objects come in contact with each other in the task state set as the start point using the trained determination model 50. More specifically, the controller 21 refers to the training-result data 125 to define the trained determination model 50. The controller 21 then inputs the relative coordinates for the task state set in step S202 into the input layer 501 in the trained determination model 50. The controller 21 then determines neuronal firing in each of the layers 501 to 503 sequentially from the layer on the input end as the computational operation of the trained determination model 50. The controller 21 thus obtains, from the output layer 503 in the trained determination model 50, an output value corresponding to the result of determination as to whether two objects come in contact with each other in the task state set as the start point.

In step S204, the controller 21 determines a branch destination of the processing based on the determination result in step S203. When determining that two objects come in contact with each other in the task state set as the start point in step S203, the controller 21 returns the processing to step S202 and resets the task state at the start point. When determining that two objects do not come in contact with each other in the task state set as the start point, the controller 21 identifies the set task state at the start point as the current task state of the manipulator 4 and advances the processing to subsequent step S205.

Figure 12A:
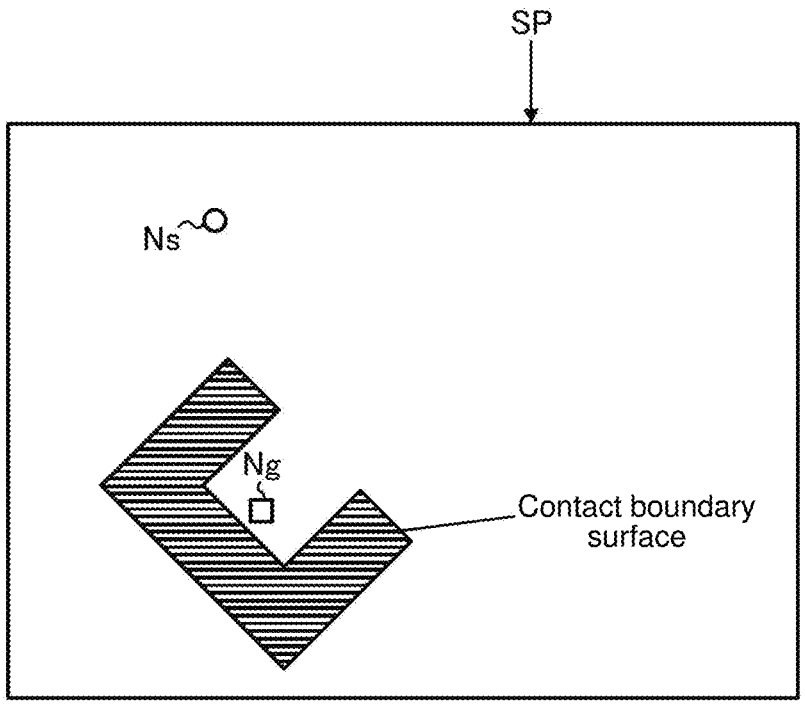
FIG. 12A is a schematic diagram illustrating an example task space in one or more embodiments.

FIG. 12A is a schematic diagram of a task space SP in an example situation in which the task state at the start point and the task state as the final goal are set through the processing in steps S201 to S204 above. The task space SP represents a set of relative coordinates indicating the task state. Information representing the task space SP may or may not be stored in the second model generation apparatus 2. The nodes (points) in the task space SP correspond to the relative coordinates between two objects. In the example of FIG. 12A, a node Ns corresponds to the relative coordinates for the task state at the start point, and a node Ng corresponds to the relative coordinates for the task state as the final goal. In the present embodiment, the boundary surface (contact boundary surface) indicating whether two objects come in contact with each other in the task space SP is derived based on the determination result obtained by the trained determination model 50.

Steps 205 to S207

In step S205, the controller 21 determines the goal task state to be achieved subsequently to the current task state to be closer to the task state as the final goal.

The goal task state may be determined with any method selected as appropriate in each embodiment. In one example, the relative coordinates for the goal task state may be determined through an operator input. The relative coordinates for the goal task state may be determined using any selected algorithm or using the CAD data 220 as appropriate as in setting the task state as the start point. The controller 21 may determine, for example, the relative coordinates for the goal task state by randomly changing the relative coordinates for the task state at the start point. The controller 21 may select, for example, a node away from the node Ns by a predetermined distance to be closer to the node Ng in the task space SP. The controller 21 may obtain the task state corresponding to the selected node as a goal task state. When, for example, the inference model 55 is generated through reinforcement learning (described later), the goal task state may be determined using the inference model 55 during reinforcement learning.

For example, the goal task state may be determined with a known method such as path planning. In one example, the controller 21 may set a candidate node for the goal task state in the task space SP. The node may be set automatically by, for example, random sampling or manually through an operator input. Some nodes may be set automatically, and the remaining other nodes may be set manually. In response to candidate nodes being set for the goal task state, the controller 21 may select a combination of possible destination nodes as appropriate. A combination of possible destination nodes may be selected using, for example, the nearest neighbor algorithm. A combination of possible destination nodes may be expressed using edges connecting the nodes to one another in the task space SP. The controller 21 then searches for a path from the node Ns at the start point to the node Ng at the final goal. The path may be searched for using, for example, Dijkstra's algorithm. The controller 21 may obtain, as a goal task state, the task state corresponding to a node included in the path obtained through the search.

In step S206, the controller 21 operates as the contact determiner 211 and determines whether two objects come in contact with each other in the determined goal task state using the trained determination model 50. The controller 21 may perform the processing in step S206 in the same manner as in step S203 above except that the controller 21 determines the goal task state instead of the task state at the start point. More specifically, the controller 21 inputs the relative coordinates for the goal task state into the trained determination model 50 and performs a computational operation of the trained determination model 50. The controller 21 thus obtains, from the trained determination model 50, an output value corresponding to the result of determination as to whether two objects come in contact with each other in the goal task state.

In step S207, the controller 21 determines a branch destination of the processing based on the determination result in step S206. When determining that two objects come in contact with each other in the goal task state in step S207, the controller 21 returns the processing to step S205 and resets the goal task state. When determining that two objects do not come in contact with each other in the goal task state, the controller 21 advances the processing to subsequent step S208.

The branch destination in step S207 is not limited to the above example. For example, when determining that two objects come in contact with each other in the goal task state, the controller 21 may return the processing to step S202 and restart the processing from setting the start point. For example, the goal task state may be determined multiple times. When determining that two objects come in contact with each other in the determined latest goal task state, the controller 21 may return the processing to step S205 and restart, from the start point, determining the goal task state to be achieved subsequently. The sequence of goal task states determined until the contact occurs may be collected as failure states that cannot achieve the task state as the final goal.

Figure 12B:
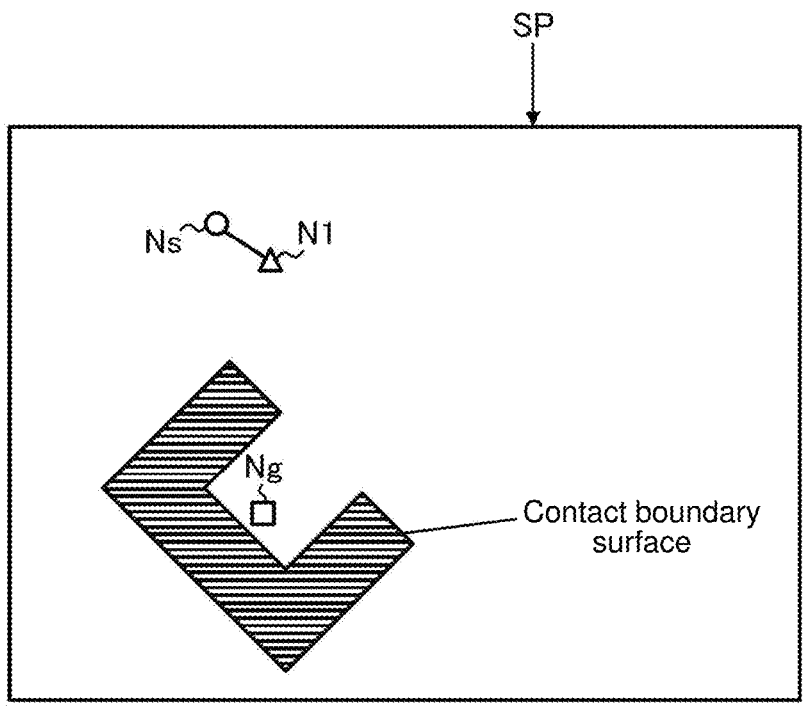
FIG. 12B is a schematic diagram illustrating an example task space in one or more embodiments.

FIG. 12B is a schematic diagram of a task space SP in an example situation in which the goal task state is determined through the processing in steps S205 to S207 above. In the example of FIG. 12B, a node N1 corresponds to the relative coordinates for the task state determined to be the goal task state to be achieved subsequently to the task state at the start point (node Ns). In the example of FIG. 12B, the goal task state corresponding to a single change is determined in step S205. However, any number of goal task states other than one may be determined in step S205. In step S205, the controller 21 may determine goal task states corresponding to multiple changes (the sequence of goal task states) toward the task state as the final goal.

Step S208

In step S208, the controller 21 causes a change from the current task state of the manipulator 4 to the goal task state determined in step S205. The controller 21 then determines whether the task state of the manipulator 4 has achieved the task state as the final goal, or in other words, whether the task state after the change is the task state as the final goal. The task state may be changed in a virtual space through a simulation. When determining that the task state as the final goal has been achieved, the controller 21 advances the processing to subsequent step S209. When determining that the task state as the final goal has not been achieved, the controller 21 returns the processing to step S205 and determines the task state of another goal.

Figure 12C:
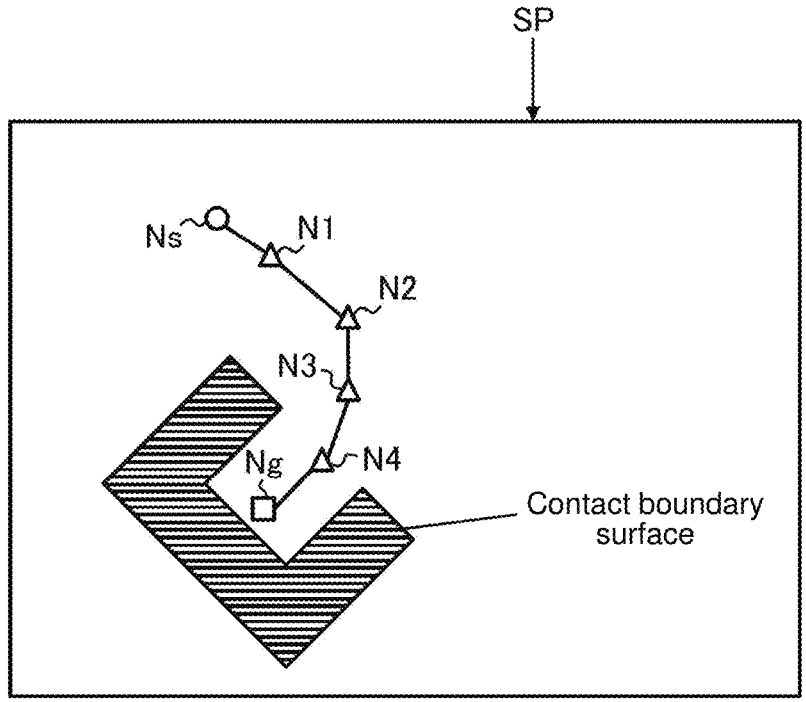
FIG. 12C is a schematic diagram illustrating an example task space in one or more embodiments.

FIG. 12C is a schematic diagram of a task space SP in an example situation in which the sequence of task states changing from the task state at the start point to the task state as the final goal is determined through the processing up to step S208 above. The nodes N1 to N4 correspond to the relative coordinates for the task states determined as the goal task states between the node Ns at the start point and the node Ng at the final goal. The node N(k+1) represents the goal task state to be achieved subsequently to the node N(k), where k is 1 to 3. As illustrated in FIG. 12C, the controller 21 can obtain the sequence of goal task states changing from the start point to the final goal through the processing up to step S208.

Step S209

In step S209, the controller 21 determines whether to repeat the processing in steps S202 to S208. The determination as to whether the processing is to be repeated may be performed as appropriate in each embodiment.

For example, the processing may be repeated a predefined number of times. The predefined number of times may be a preset value or may be specified by an operator. In this case, the controller 21 determines whether the count for the series of processes from step S202 to step S208 has reached the predefined number of times. When determining that the count has not reached the predefined number of times, the controller 21 returns the processing to step S202 and repeats the processing in steps S202 to S208. When determining that the count has reached the predefined number of times, the controller 21 advances the processing to subsequent step S210.

For example, the controller 21 may prompt an operator to indicate whether to repeat the processing. In this case, the controller 21 determines whether to repeat the processing in steps S202 to S208 in response to the operator's indication. In response to the operator indicating to repeat the processing, the controller 21 returns the processing to step S202 and repeats the processing in steps S202 to S208. In response to the operator indicating not to repeat the processing, the controller 21 advances the processing to subsequent step S210.

The processing up to step S209 yields one or more sequences of goal task states changing from the start point to the final goal illustrated in FIG. 12C. The controller 21 operates as the data collector 212 and collects one or more sequences of goal task states changing from the start point to the final goal. The controller 21 then uses the collected sequence of goal task states to generate the learning data 223. The controller 21 may directly use the collected sequence of goal task states as the learning data 223, or may perform information processing on the collected sequence of goal task states to generate the learning data 223. The learning data 223 may have any structure determined as appropriate for the method for generating the inference model 55. The structure of the learning data 233 will be described later.

Steps S210 and S211

In step S210, the controller 21 operates as the model generator 213. More specifically, the controller 21 uses the learning data 223 obtained using the determination result from the trained determination model 50 to generate the inference model 55 for inferring the goal task state to be achieved subsequently based on the current task state and the task state as the final goal while avoiding contact of the first object with the second object. The method for generating the inference model 55 will be described later.

In step S211, the controller 21 operates as the storing unit 214. More specifically, the controller 21 generates information about the generated inference model 55 as the inference model data 225 and stores the generated inference model data 225 into a predetermined storage area. The predetermined storage area may be, for example, the RAM in the controller 21, the storage 22, an external storage, a storage medium, or a combination of these. The storage medium is, for example, a CD or a DVD. The controller 21 may store the inference model data 225 into the storage medium through the drive 27. The external storage may be, for example, a data server such as a NAS. In this case, the controller 21 may use the communication interface 23 to store the inference model data 225 into the data server through a network. The external storage may be connected to the second model generation apparatus 2.

Upon storage of the inference model data 225, the controller 21 ends the series of processing steps for generating the inference model 55.

The generated inference model data 225 may be provided to the control apparatus 3 at any selected time. For example, the controller 21 may transfer the inference model data 225 to the control apparatus 3 in step S211 or in a step separate from step S211. The control apparatus 3 may receive the transferred data to obtain the inference model data 225. In another example, the control apparatus 3 may use the communication interface 33 to access the second model generation apparatus 2 or a data server through a network and obtain the inference model data 225. In still another example, the control apparatus 3 may obtain the inference model data 225 through the storage medium 93. For example, the control apparatus 3 may prestore the inference model data 225.

Further, the controller 21 may update or newly generate the inference model data 225 by regularly or irregularly repeating the processing in steps S201 to S211 above. During the repeated processes, at least part of the learning data 223 may undergo changes, modifications, additions, and deletions as appropriate. The controller 21 may provide the updated or newly generated inference model data 225 to the control apparatus 3 through every training process to update the inference model data 225 stored in the control apparatus 3.

Generating Inference Model

An example method for generating the inference model 55 in step S210 above will now be described. In the present embodiment, the controller 21 can generate the inference model 55 with at least one of the two methods described below.

(1) First Method

With the first method, the controller 21 generates the inference model 55 through machine learning. In this case, the inference model 55 includes a machine learning model. The machine learning model may be of any type selected as appropriate in each embodiment. The inference model 55 may include a functional expression or a data table. The inference model 55 being a functional expression may include a neural network, a support vector machine, a regression model, or a decision tree. The method of machine learning may be other than described in the above example and may be selected as appropriate for the configuration of the inference model 55. Examples of machine learning for the inference model 55 include supervised learning and reinforcement learning. Two examples of the machine learning model for the inference model 55 and the machine learning method will now be described.

(1-1) First Example

Figure 13:
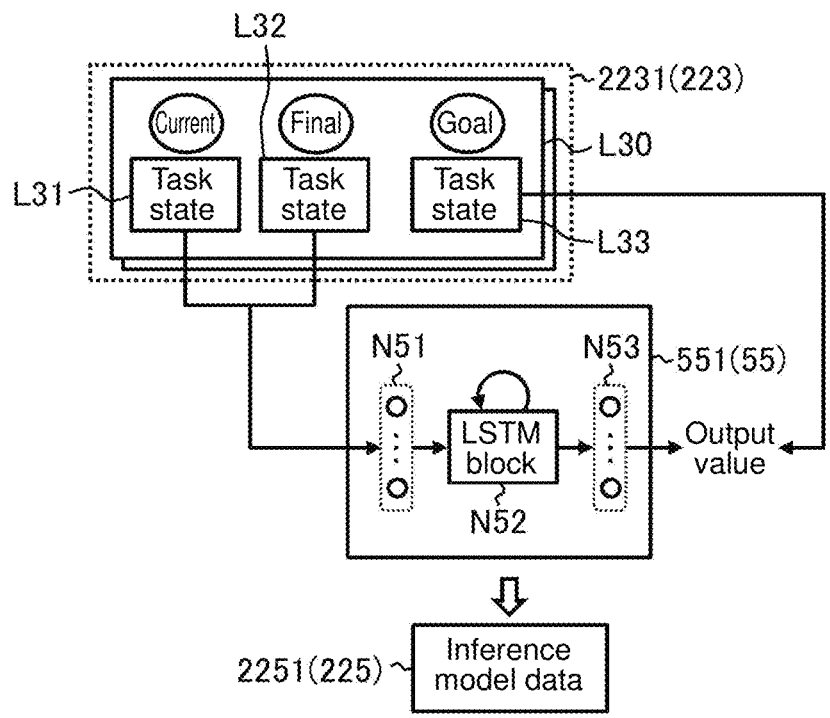
FIG. 13 is a schematic diagram illustrating an inference model used in one or more embodiments, showing an example configuration and an example method for generating the model.

FIG. 13 is a schematic diagram of the machine learning model for the inference model 55 and the machine learning method in a first example. In the first example, the inference model 55 uses a neural network, and the method of machine learning is supervised learning. In the example of FIG. 13, examples of the inference model 55, the learning data 223, and the inference model data 225 are an inference model 551, learning data 2231, and inference model data 2251 for ease of explanation.

(1-1-1) Example Configuration of Inference Model

In the first example, the inference model 551 includes a three-layered recurrent neural network. More specifically, the inference model 551 includes an input layer N51, a long short-term memory (LSTM) block N52, and an output layer N53. The LSTM block N52 corresponds to an intermediate layer.

The LSTM block N52 includes an input gate and an output gate to learn the timing for storing and outputting information (S. Hochreiter; J. Schmidhuber, Long Short-term Memory, Neural Computation, Nov. 15, 1997, 9(8), 1735-1780.). The LSTM block N52 may also include a forget gate to adjust the timing when information is forgotten (Felix A. Gers; Jurgen Schmidhuber; Fred Cummins, Learning to Forget: Continual Prediction with LSTM, Neural Computation, October 2000, 2451-2471.). The architecture of the LSTM block N52 may be constructed as appropriate in each embodiment.

However, the configuration of the inference model 551 is not limited to the above example and may be selected as appropriate in each embodiment. The inference model 551 may include a recurrent neural network with a different configuration. In some embodiments, the inference model 551 may include a fully coupled neural network or a convolutional neural network instead of a recurrent neural network, similarly to the above determination model 50. In some embodiments, the inference model 551 may include a combination of two or more types of neural networks. The inference model 551 may include two or more intermediate layers. The intermediate layer may be eliminated. The other configuration of the inference model 551 may be the same as that of the above determination model 50.

(1-1-2) Example Structure of Learning Data

The learning data 2231 used in supervised learning for the inference model 551 includes multiple learning datasets L30 each including a combination of training data (input data) and true data (supervisory signal). The training data may include the relative coordinates for a current task state L31 for training and the relative coordinates for a task state L32 as the final goal for training. The true data may include the relative coordinates for a goal task state L33 for training. The training data and the true data may be in any format selected as appropriate in each embodiment. For example, the training data may represent the relative coordinates, or may represent values resulting from conversion of the relative coordinates into a feature quantity.

The controller 21 can generate each learning dataset L30 from one or more sequences of goal task states obtained through the processing up to step S209. For example, the task state as the final goal indicated by the node Ng can be used as the task state L32 as the final goal for training. The controller 21 may set the task state at the start point indicated by the node Ns as the current task state L31 for training. In this case, the controller 21 may set the task state indicated by the node N1 as the goal task state L33 for training in the corresponding true data. Similarly, the controller 21 may set the task state indicated by the node N(k) as the current task state L31 for training. In this case, the controller 21 may set the task state indicated by the node N(k+1) as the goal task state L33 for training in the corresponding true data. The controller 21 may set the task state indicated by the node N4 as the current task state L31 for training. In this case, the controller 21 may set the task state as the final goal indicated by the node Ng as the goal task state L33 for training in the corresponding true data. The controller 21 can thus generate each learning dataset L30 from one or more sequences of obtained goal task states.

(1-1-3) Step S210

In step S210 above, the controller 21 trains the inference model 551 through machine learning (supervised learning) using the obtained multiple learning datasets L30. In the first example, the controller 21 trains, for each learning dataset L30, the inference model 551 through machine learning to output an output value that fits the true data from the output layer N53 in response to an input of the training data into the input layer N51. The controller 21 can generate the trained inference model 551 capable of inferring the goal task state to be achieved subsequently based on the current task state and the task state as the final goal.

The inference model 551 may use the same method of machine learning as the above determination model 50. In the first step, the controller 21 inputs, for each learning dataset L30, training data into the input layer N51 in the inference model 551 and performs a computational operation of the inference model 551. The controller 21 thus obtains, from the output layer L53 in the inference model 551, an output value corresponding to the result of inference of the goal task state to be achieved subsequently to the current task state. In the second step, the controller 21 calculates an error between the output value obtained from the output layer L53 and the true data based on a loss function.

In the third step, the controller 21 then calculates an error in the values of the computational parameters of the inference model 551 using the gradient of the error in the calculated output value by the error back propagation method. The controller 21 calculates an error in the values of the computational parameters (e.g., the coupling weights between neurons and the threshold of each neuron) for the inference model 551 using the gradient of the calculated error. In the fourth step, the controller 21 updates the values of the computational parameters of the inference model 551 based on each calculated error. The computational parameters may be updated by the degree adjusted based on the learning rate. The learning rate may be specified by an operator or may be a preset value in the program.

Through the first to fourth steps described above performed repeatedly, the controller 21 adjusts, for each learning dataset L30, the value of each computational parameter of the inference model 551 to reduce the sum of the errors between the output values obtained from the output layer N53 and the true data. For example, the controller 21 may repeat the above first to fourth steps until the sum of the errors is less than or equal to a threshold. The threshold may be determined as appropriate in each embodiment. In some embodiments, the controller 21 may repeat the above first to fourth steps a predetermined number of times. The adjustment may be repeated the number of times specified with, for example, a preset value in the program or with an input from an operator.

The controller 21 can thus build the trained inference model 551 trained through machine learning (supervised learning) to output, in response to an input of the training data included in each learning dataset L30 into the input layer N51, an output value that fits the true data included in the corresponding learning dataset L30 from the output layer N53. In other words, the controller 21 can build the trained inference model 551 capable of inferring the goal task state to be achieved subsequently based on the current task state and the task state as the final goal.

In step S211, the controller 21 generates information indicating the configuration and the computational parameters of the inference model 551 trained through supervised learning as the inference model data 2251. The controller 21 stores the generated inference model data 2251 into a predetermined storage area. The details of the inference model data 2251 are not limited to the above example and may be modified to regenerate the trained inference model 551. For the apparatuses each using the inference model 551 having the same configuration, for example, the inference model data 2251 may not include information indicating the configuration of the inference model 551.

(1-1-4) Others

When the method of machine learning is supervised learning, the inference model 551 may not rely on a neural network but may have other configurations. The inference model 551 may include a machine learning model other than a neural network. For example, the machine learning model for the inference model 551 may include a support vector machine, a regression model, or a decision tree. The method of supervised learning may be other than described in the above example and may be selected as appropriate for the configuration of the machine learning model.

(1-2) Second Example

Figure 14:
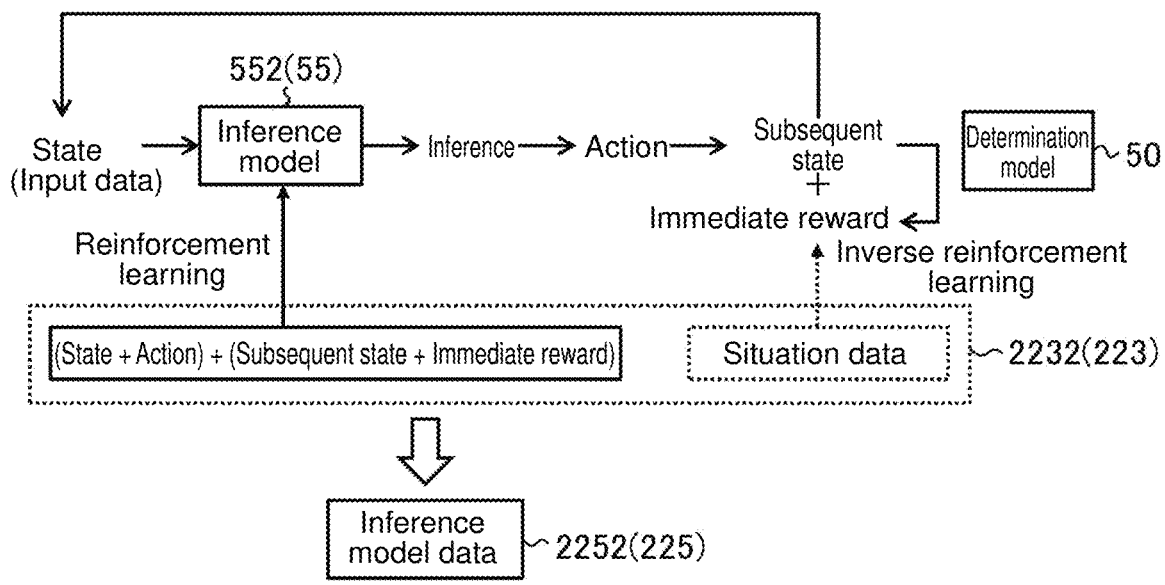
FIG. 14 is a schematic diagram illustrating an inference model used in one or more embodiments, showing an example configuration and an example method for generating a model.

FIG. 14 is a schematic diagram of a machine learning model for the inference model 55 and the machine learning method in a second example. In the second example, the method of machine learning is reinforcement learning. In the example of FIG. 14, examples of the inference model 55, the learning data 223, and the inference model data 225 are an inference model 552, learning data 2232, and inference model data 2252 for ease of explanation.

(1-2-1) Example Configuration of Inference Model

In the second example, the inference model 552 may be value-based, policy-based, or both value-based and policy-based. The inference model 552 being value-based may include a value function, such as a state-value function or an action-value function (Q function). The state-value function returns the value of a given state. The action-value function returns the value of each action in a given state. The inference model 552 being policy-based may include a policy function. The policy function returns the probability of selecting each action in a given state. The inference model 552 being both value-based and policy-based may include a value function (critic) and a policy function (actor). Each function may include a data table or a functional expression. The inference model 552 being a functional expression may include a neural network, a linear function, or a decision tree. A multilayered neural network including multiple intermediate (hidden) layers may be used for each function to perform training through deep reinforcement learning.

(1-2-2) Example Structure of Learning Data

Reinforcement learning basically uses an agent expected to interact with a training environment through an action in accordance with a policy. An agent is, for example, a CPU. The inference model 552 has the configuration described above and operates as a policy and determines an action. The agent observes a state for an action to be reinforced in a defined training environment. In the present embodiment, the state to be observed is a task state defined using relative coordinates, and the action to be performed is a change from a current task state to a goal task state. The policy is defined to determine (infer) the goal task state to be achieved subsequently based on the current task state and the task state as the final goal.

The agent may provide an observed current task state (input data) to the inference model 552 to infer the goal task state to be achieved subsequently. The agent may determine the goal task state based on the inference result. In some embodiments, the goal task state may be determined randomly. The agent can thus determine an action to be performed. The task state to be observed changes to the subsequent task state once the agent performs the action of changing to the determined goal task state. The agent may possibly receive an immediate reward from the training environment.

Through repeated trial and error for determining and performing the action, the agent updates the inference model 552 to maximize the total immediate reward (referred to as the value). This reinforces an optimum action, or more specifically, an action expected to obtain a high value, and defines a policy (trained inference model 552) that enables the selection of such an action.

In reinforcement learning, the learning data 2232 includes state-change data resulting from the trial-and-error process. The state-change data indicates a state change from the current task state to the subsequent task state through the action, from which an immediate reward may possibly be obtained. A single set of state-change data may be data representing the trajectories of all state changes for a single episode, or may be data representing state changes of a predetermined number of times (one or more times). Through the processing from steps S202 to S209 above, the controller 21 may obtain the above state-change data through the trial-and-error process using the inference model 552 that is being trained.

A reward function may be used to calculate an immediate reward in accordance with the state change. The reward function may be expressed using, for example, a data table, a functional expression, or a rule. The reward function being a functional expression may include a neural network, a linear function, or a decision tree. The reward function may be defined manually by, for example, an operator.

In some embodiments, the reward function may be defined to provide an immediate reward based on the result of determination obtained by the above trained determination model 50 as to whether the first object and the second object come in contact with each other in the target task state to be achieved and based on the distance between the target task state and the task state as the final goal. More specifically, the immediate reward may be set higher for the first object and the second object not coming in contact with each other and for the distance between the target task state and the task state as the final goal being shorter. The immediate reward may be set lower for the first object and the second object coming in contact with each other or for the distance being longer. Formula 1 below is an example reward function that provides an immediate reward in this manner.

$$(\text{reward}) = \frac{F(s_c)}{\|s_g - s_c\|_2^2} \qquad \text{Formula 1}$$

$s_c$ indicates the goal task state determined by the policy. $s_g$ indicates the task state as the final goal. $F(s_c)$ indicates the result of determination obtained by the trained determination model 50 as to whether the first object and the second object come in contact with each other in the task state $s_c$. The value of $F(s_c)$ may be set low (e.g., 0) for the objects determined to come in contact with each other, and may be set high (e.g., 1) for the objects determined not to come in contact with each other. The output value from the trained determination model 50 corresponding to the setting may be directly used as $F(s_c)$.

In some embodiments, the reward function may be estimated through inverse reinforcement learning using situation data obtained from an expert. The situation data may be data representing a demonstration by an expert (its trajectory). In the present embodiment, the situation data may include data representing the path along which the first object has actually moved from the task state at any selected start point to the task state as the final goal. The situation data may be generated with any method selected as appropriate in each embodiment. For example, the situation data may be generated by recording the trajectory of a demonstration performed by an expert using, for example, a sensor.

The method of inverse reinforcement learning may be selected as appropriate in each embodiment. Example methods of inverse reinforcement learning include maximum entropy inverse reinforcement learning, minimum relative entropy inverse reinforcement learning, and inverse reinforcement learning using adversarial generative networks (e.g., Justin Fu et al., Learning Robust Rewards with Adversarial Inverse Reinforcement Learning, arXiv:1710.11248, 2018.). For the reward function using inverse reinforcement learning, the learning data 2232 may further include situation data used for inverse reinforcement learning.

(1-2-3) Step S210

In step S210 above, the controller 21 updates the values of the computational parameters of the inference model 552 to maximize the value based on the obtained state-change data. The values of the computational parameters of the inference model 552 may be adjusted with any method selected as appropriate for the configuration of the inference model 552. For the inference model 552 including a neural network, for example, the values of the computational parameters of the inference model 552 may be adjusted in the same manner as described in the first example by, for example, the error back propagation method.

The controller 21 adjusts the value of each computational parameter of the inference model 552 to maximize the resultant value (expected value) (e.g., until the update is less than or equal to a threshold). More specifically, training the inference model 552 includes repeatedly correcting the value of each computational parameter included in the inference model 552 to have a higher reward until the predetermined condition (e.g., until the update is less than or equal to a threshold) is satisfied. The controller 21 can thus generate the trained inference model 552 capable of inferring the goal task state to be achieved subsequently based on the current task state and the task state as the final goal.

The controller 21 may adjust the value of each computational parameter of the above inference model 552 after collecting the learning data 2232 through the processing in steps S202 to S209. In some embodiments, the controller 21 may adjust the value of each computational parameter of the above inference model 552 while repeating the processing in steps S202 to S210.

For the inference model 552 being value-based, the method of reinforcement learning may be a temporal difference (TD) method, a TD(A) method, a Monte Carlo method, or dynamic programming. The action may be determined by trial and error through on-policy learning or off-policy learning. Example methods of reinforcement learning include Q-learning and SARSA. In trial and error, a random action may be used with probability & (epsilon-Greedy learning).

For the inference model 552 being policy-based, the method of reinforcement learning may be a policy gradient method, trust region policy optimization (TRPO), or proximal policy optimization (PPO). In this case, the controller 21 calculates the gradients of the computational parameters for the policy function to yield a higher value and updates the values of the computational parameters for the policy function based on the calculated gradients. The gradients for the policy function may be calculated using, for example, the REINFORCE algorithm.

For the inference model 55 being both value-based and policy-based, the method of reinforcement learning may be an actor critic method, an advantage actor critic (A2C) algorithm, or an asynchronous advantage actor critic (A3C) algorithm.

For inverse reinforcement learning, the controller 21 further obtains situation data before the above reinforcement learning process. The situation data may be generated by the second model generation apparatus 2 or by another computer. When the situation data is generated by another computer, the controller 21 may obtain the situation data generated by the other computer through, for example, a network or the storage medium 92. The controller 21 then performs inverse reinforcement learning using the obtained situation data to define a reward function. The controller 21 uses the reward function defined through inverse reinforcement learning to perform the above reinforcement learning process. The controller 21 thus uses the reward function defined through inverse reinforcement learning to generate the trained inference model 552 capable of inferring the goal task state to be achieved subsequently based on the current task state and the task state as the final goal.

In step S211, the controller 21 generates information indicating the trained inference model 552 built through reinforcement learning as the inference model data 2252. The information indicating the trained inference model 552 may include computational parameters, such as the values of entries in a data table or the values of coefficients in a functional expression. The controller 21 stores the generated inference model data 2252 into a predetermined storage area. The inference model 55 generated in the second example can determine the goal task state to avoid unintended contact between the first object and the second object and to allow the manipulator 4 to quickly achieve the task state as the final goal.

(1-3) Brief Summary

In the present embodiment, the inference model 55 including the machine learning model may have at least one of the two configurations described above. The controller 21 can use at least one of the two methods of machine learning to generate the trained inference model 55 capable of inferring the goal task state to be achieved subsequently based on the current task state and the task state as the final goal to avoid contact of the first object with the second object. The first method can thus appropriately generate the inference model 55 usable to perform a task.

(2) Second Method

Figure 15A:
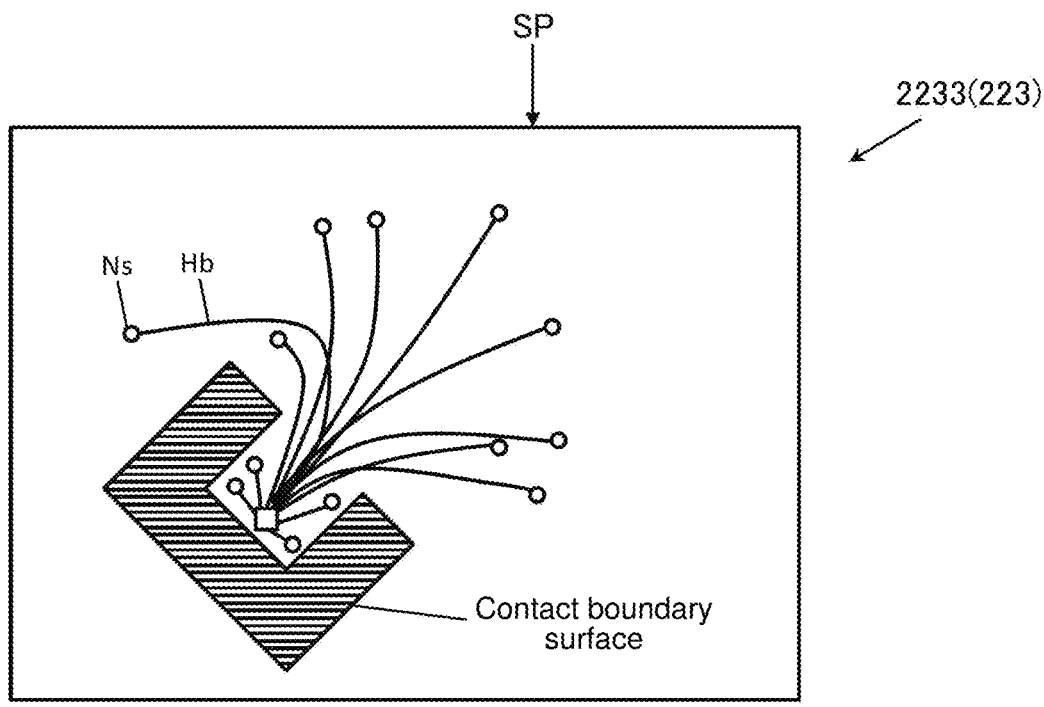
FIG. 15A is a schematic diagram illustrating example learning data in one or more embodiments.
Figure 15B:
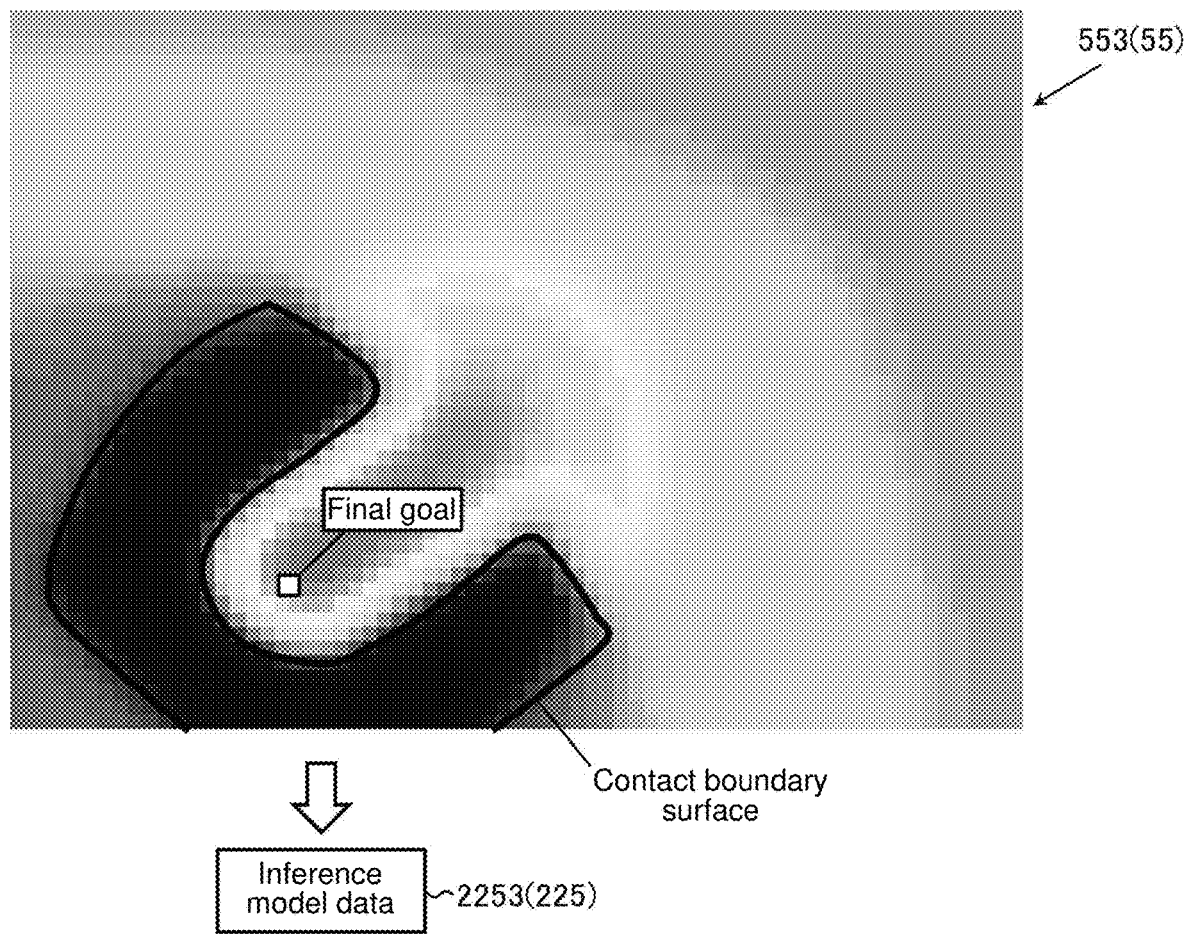
FIG. 15B is a schematic diagram illustrating an inference model in one or more embodiments showing an example configuration.

FIG. 15A is a schematic diagram of example learning data 223 with a second method. FIG. 15B is a schematic diagram of an inference model 55 with the second method showing its example configuration. With the second method, the inference model 55 includes a potential field defining the potential for each set of coordinates in the task space SP representing a set of task states. In FIGS. 15A and 15B, examples of the inference model 55, the learning data 223, and the inference model data 225 are an inference model 553, learning data 2233, and inference model data 2253 for ease of explanation.

The controller 21 performs path planning to avoid contact of the first object with the second object using the trained determination model 50 in the task space SP through the processing in steps S202 to S209. As shown in FIG. 15A, the controller 21 can thus generate the learning data 2233 representing paths Hb from multiple task states provided as the start points (nodes Ns) to the task state as the final goal. The start points (nodes Ns) may be provided randomly.

In step S210 above, the controller 21 generates a potential field by setting a potential for each set of coordinates in accordance with the frequency of passage through the paths Hb represented by the generated learning data 2233. The potential field may be derived with any method selected as appropriate in each embodiment. The controller 21 may derive the potential field from the learning data 2233 through estimation using, for example, kernel density estimation or a Gaussian mixture model (GMM). The potential field (inference model 553) shown in FIG. 15B can thus be obtained.

The potential for each set of coordinates in the potential field indicates an evaluation value indicating the possibility of achieving the final goal provided to the positional relationship between the first object and the second object at the corresponding coordinates. More specifically, a higher potential indicates a higher possibility that the positional relationship at the coordinates achieves the final goal, and a lower potential indicates a lower possibility that the positional relationship at the coordinates achieves the final goal. Changing to a state with a higher gradient of potential allows the task state as the final goal to be achieved appropriately from any task state selected at the start point. The second method can thus appropriately generate the inference model 55 usable to perform a task.

In step S211, the controller 21 generates information indicating the generated potential field as the inference model data 2253. The potential field may be expressed using a data table or a functional expression. The controller 21 stores the generated inference model data 2253 into a predetermined storage area.

(3) Brief Summary

In the present embodiment, the inference model 55 may be generated with at least one of the two methods described above. The controller 21 can use at least one of the two methods to generate the inference model 55 for inferring the goal task state to be achieved subsequently based on the current task state and the task state as the final goal to avoid contact of the first object with the second object.

Inferring the goal task state to avoid contact of the first object with the second object refers to determining the goal task state to avoid unintended contact between the first object and the second object. For example, the inferring may include determining, to be the goal task state, a task state in which the first object is in contact with the second object appropriately, such as when the end-effector T holds the workpiece W. In other words, a contact state to be avoided is an inappropriate state of contact in which, for example, an excessive force acts between the first object and the second object, or in which either the first object or the second object is in contact with or joined to the other object at an incorrect orientation. Avoiding contact of the first object with the second object may thus be rephrased as avoiding contact of the first object with the second object in an inappropriate state.

Control Apparatus
(A) Operation Control

Figure 16A:
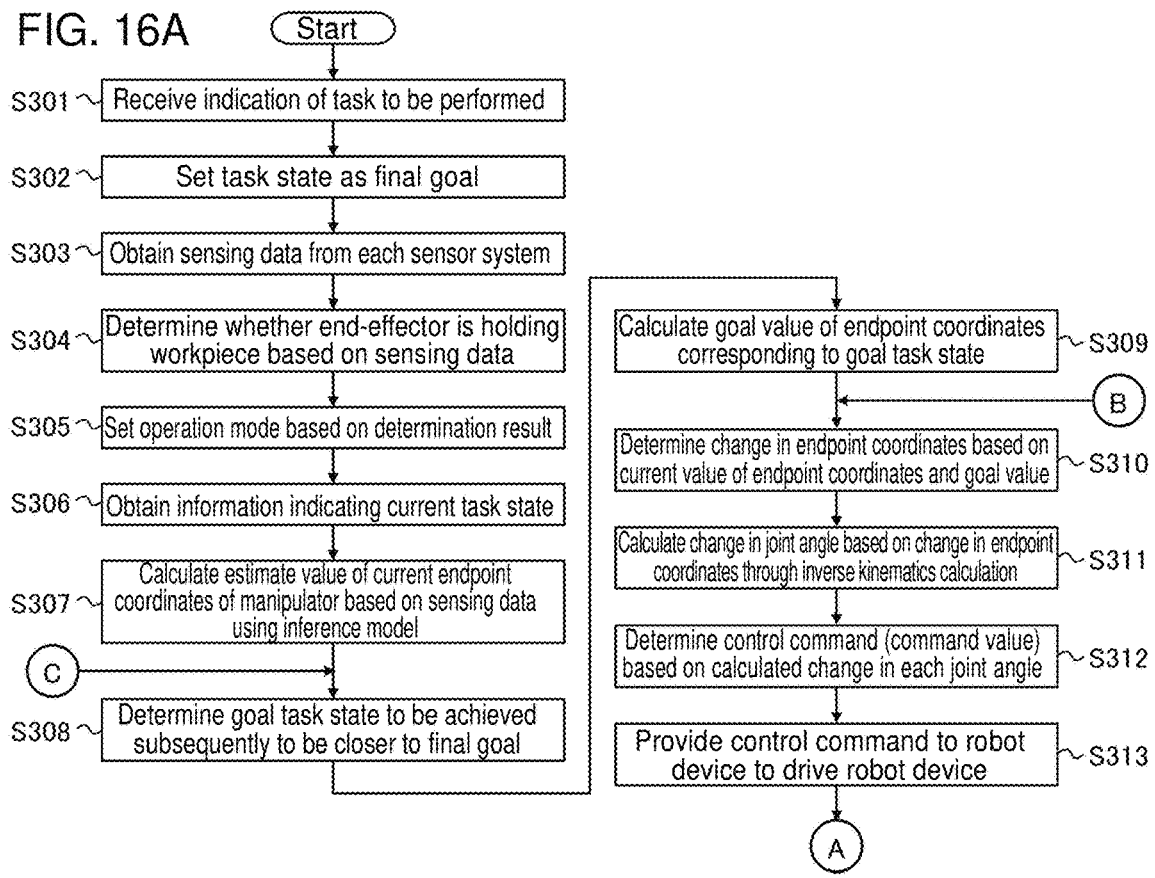
FIG. 16A is a flowchart illustrating an example procedure performed by a control apparatus according to one or more embodiments for an operation control over a manipulator.
Figure 16B:
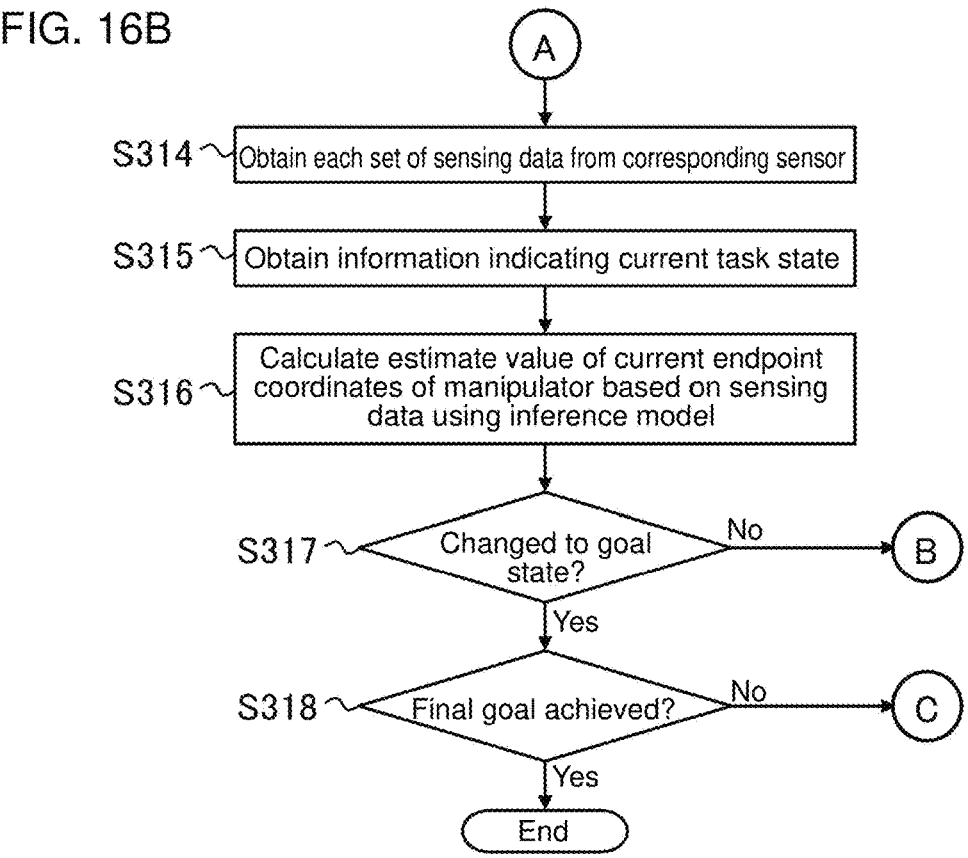
FIG. 16B is a flowchart illustrating an example procedure performed by a control apparatus according to one or more embodiments for an operation control over a manipulator.
Figure 17:
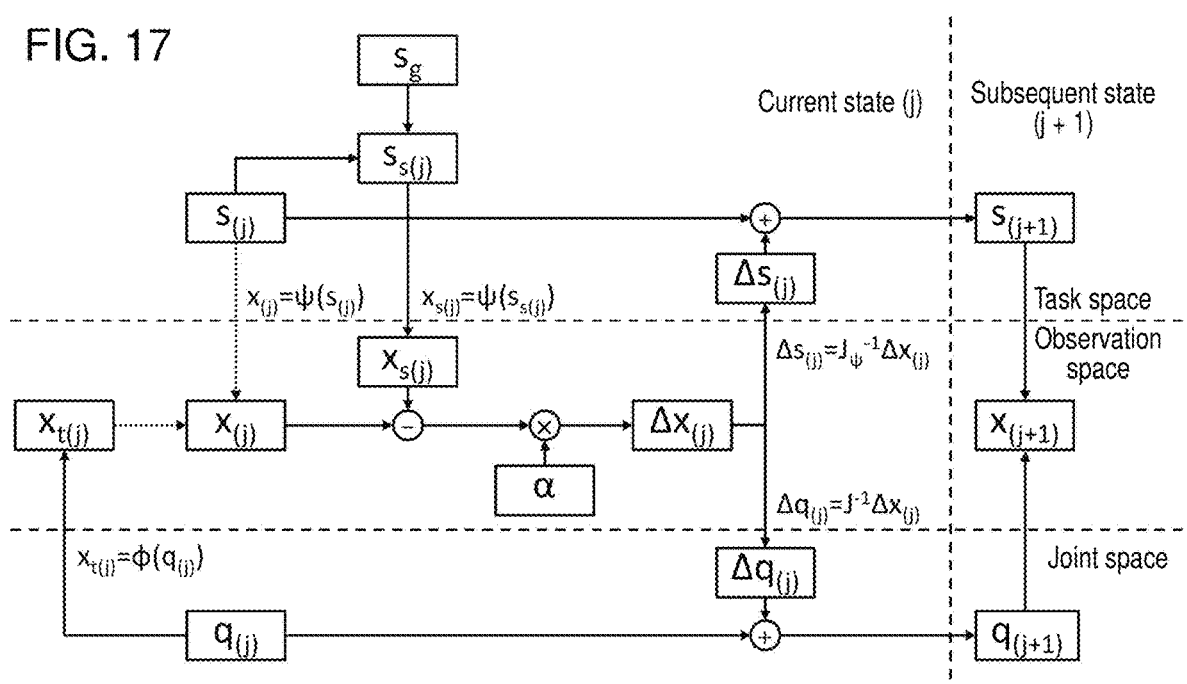
FIG. 17 is a diagram illustrating example computational processes for elements in one or more embodiments.

An example operation of the control apparatus 3 according to the present embodiment for the operation control over the manipulator 4 will now be described with reference to FIGS. 16A, 16B and 17. FIGS. 16A and 16B are flowcharts of an example procedure performed by the control apparatus 3 according to the present embodiment for the operation control over the manipulator 4. FIG. 17 is a diagram showing example computational processes for elements during operation control. However, the procedure below is a mere example, and each of its steps may be modified in any possible manner. In the procedure below, steps may be eliminated, substituted, or added as appropriate in each embodiment. The control over the operation of the manipulator 4 described below may be performed in a real space or in a virtual space.

Steps S301 and S302

In step S301, the controller 31 receives an indication of a task to be performed. The controller 31 may receive an indication of a task in any manner selected as appropriate in each embodiment. For example, the controller 31 may receive an input of the task name of the task to be performed through the input device 35. The controller 31 may output, to the output device 36, a list of tasks that can be performed and prompt an operator to select a task to be performed from the list. In this manner, the controller 31 receives an indication of the task to be performed.

In the present embodiment, the controller 31 can receive a task of moving a first object relative to a second object in an environment including the first object and the second object. More specifically, an example task to be indicated includes a series of operations for driving the manipulator 4 to hold the workpiece W with the end-effector T and joining the workpiece W being held to the other workpiece G. In the present embodiment, the first task of moving and holding the workpiece W is performed using a target point T0 on the end-effector T as the endpoint of the manipulator 4 and using the workpiece W as a destination object to which the endpoint is to be moved. After the workpiece W is being held, the second task of joining the workpiece W to the other workpiece G is performed using a target point W0 on the workpiece W held by the end-effector T as the endpoint of the manipulator 4 and using the other workpiece G to which the workpiece W is to be joined as a destination object to which the endpoint is to be moved. In each task, the endpoint of the manipulator 4 corresponds to the first object, and the destination object corresponds to the second object.

In step S302, the controller 31 operates as the goal setter 310 and sets a task state $s_g$ as a final goal in accordance with the specified task. In the present embodiment as described above, the task state is defined by the positional relationship between the endpoint of the manipulator 4 and the destination object. The positional relationship is expressed using their relative coordinates. The relative coordinates for the task state $s_g$ as the final goal may be provided by a simulator, such as a CAD simulator, or may be specified by an operator. The relative coordinates for the task state $s_g$ as the final goal may be set with the same method as in step S201 above. Upon setting the task state $s_g$ as the final goal, the controller 31 advances the processing to subsequent step S303.

Step S303

In step S303, the controller 31 operates as the first data obtainer 311 and obtains the first sensing data 323 from the first sensor system. The controller 31 also operates as the second data obtainer 312 and obtains the second sensing data 324 from the second sensor system.

In the present embodiment, the first sensor system includes the encoder S2 for measuring the angle of each joint (joints 41 to 46) and the touch sensor S3 for measuring the force acting on the end-effector T. The controller 31 can obtain a current value $q_{(j)}$ (current measurement value) of the angle of each joint in the manipulator 4 from the corresponding encoder S2 as the first sensing data 323. The controller 31 further obtains measurement data about the force acting on the end-effector T from the touch sensor S3 as the first sensing data 323. In the present embodiment, the second sensor system includes the camera S1. The controller 31 can obtain, as the second sensing data 324, image data from the camera S1 that captures an environment in which the task is performed. For ease of explanation, a symbol such as (j) may be added to indicate a particular time, for example, being current, and no such symbol is added when a particular time is not to be indicated.

The controller 31 may directly obtain sensing data (323, 324) from the sensors (the camera S1, each encoder S2, and the touch sensor S3), or may indirectly obtain sensing data (323, 324) through, for example, another computer. The camera S1 and the touch sensor S3 are examples of observation sensors that observe the state of the workpiece W relative to the end-effector T. Upon obtaining the sensing data (323, 324), the controller 31 advances the processing to subsequent step S304.

Step S304

In step S304, the controller 31 determines whether the end-effector T is holding the workpiece W based on the sensing data obtained with the above observation sensor in step S303. The determination may be performed as appropriate for the sensing data.

In the present embodiment, for example, image data including the environment in which the task is performed is obtained with the camera S1 as the second sensing data 324. The controller 31 may use the CAD data 320 for matching the models for the end-effector T and the workpiece W with the obtained image data. The controller 31 may then determine whether the end-effector T is holding the workpiece W based on the positional relationship between the end-effector T and the workpiece W resulting from the matching. The matching may be performed using a known image processing method.

In the present embodiment, for example, measurement data about the force acting on the end-effector T may be obtained as the first sensing data 323. The controller 31 may determine whether the end-effector T is holding the workpiece W based on the distribution of the force indicated by the measurement data. When the measurement data shows the force acting on the end-effector T comparable to the holding of the workpiece W with the end-effector T, the controller 31 may determine that the end-effector T is holding the workpiece W. Otherwise, the controller 31 may determine that the end-effector T is not holding the workpiece W.

Upon determining whether the end-effector T is holding the workpiece W based on the sensing data, the controller 31 advances the processing to subsequent step S305.

Step S305

In step S305, the controller 31 sets the operation mode of the manipulator 4 based on the determination result in step S304. More specifically, when determining that the end-effector T is not holding the workpiece W, the controller 31 sets the target point T0 on the end-effector T to the endpoint of the manipulator 4, and sets the operation mode to a mode for performing the first task of holding the workpiece W with the end-effector T. When determining that the end-effector T is holding the workpiece W, the controller 31 sets the target point W0 on the workpiece W to the endpoint of the manipulator 4, and sets the operation mode to a mode for performing the second task of joining the workpiece W to the other workpiece G. Upon setting the operation mode, the controller 31 advances the processing to subsequent step S306.

Step S306

In step S306, the controller 31 operates as the state obtainer 315 and obtains the current task state s(j) of the manipulator 4.

As described above, when the end-effector T is not holding the workpiece W in the present embodiment, the task state s is defined using the relative coordinates of the workpiece W relative to the end-effector T. When the end-effector T is holding the workpiece W, the task state s is defined using the relative coordinates of the other workpiece G relative to the workpiece W. In the present embodiment, the controller 31 uses the CAD data 320 for matching the image data obtained with the camera S1 with each object. The controller 31 can obtain the current task state $s_{(j)}$ through the matching.

Figure 18:
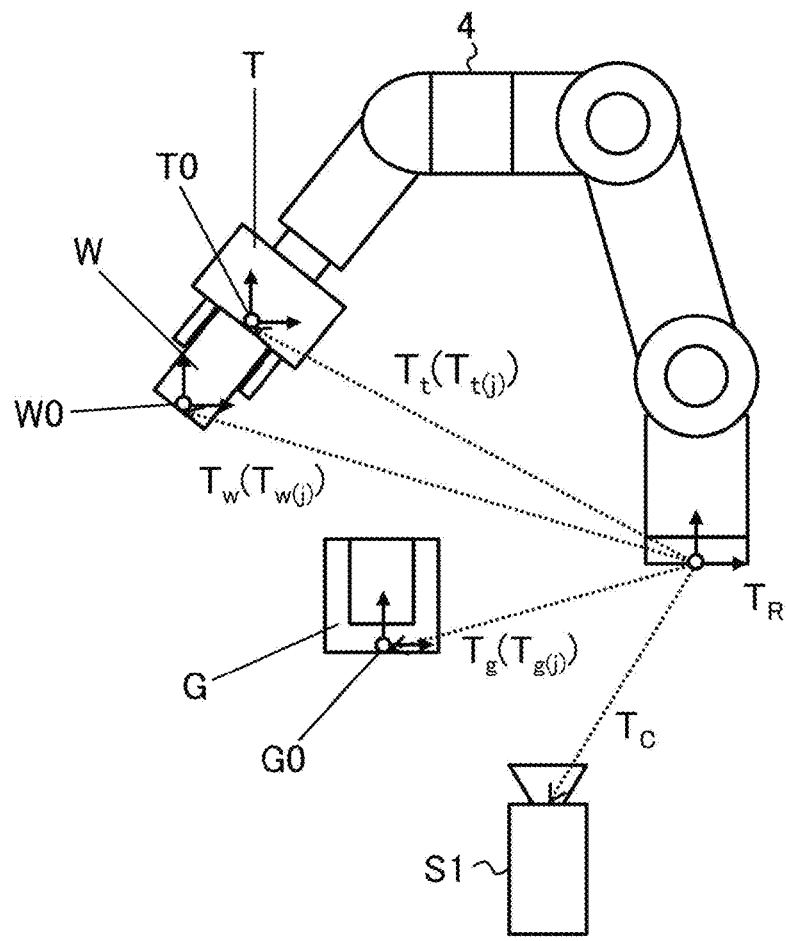
FIG. 18 is a schematic diagram illustrating objects in one or more embodiments in an illustrated positional relationship.

An example method for obtaining the current task state s will now be described further with reference to FIG. 18. FIG. 18 is a schematic diagram of objects in the illustrated positional relationship. In the example of FIG. 18, the base 40 included in the manipulator 4 is used as the origin in the observation space. However, the origin may be set at another position selected as appropriate in each embodiment. The homogeneous coordinates (Tc) of the camera S1 with respect to the origin can be written using Formula 2 below.

$R_{rc}$ indicates a rotation element in the coordinate system of the camera SI as viewed from the coordinate system including the origin, and trc indicates a translation element in the coordinate system. For ease of explanation, the camera SI is calibrated to have the homogeneous coordinates (TR) of the origin satisfying Formula 3 below.

I is a unit matrix. In the example of FIG. 18, the coordinates of the end-effector T ($T_t$) are the relative coordinates of the target point TO on the end-effector T relative to the origin. The relative coordinates of the target point WO on the workpiece W relative to the origin are the coordinates of the workpiece W ($T_w$). The relative coordinates of the target point GO on the other workpiece G relative to the origin are the coordinates of the other workpiece G ($T_g$). The controller 31 can obtain the estimate value of each set of coordinates ($T_t$, $T_w$, $T_g$) through matching of the image data with a model for the corresponding object using the CAD data 320. The controller 31 can use the estimate value of the coordinates obtained at the processing timing as the current value of the coordinates.

$$s = T_w^{-1} \cdot T_t \qquad \text{Formula 4}$$

When the end-effector T is not holding the workpiece W, the task state s and the coordinates ($T_t$, $T_w$) of the end-effector T and the workpiece W may have the relationship written using Formula 4 above. The controller 31 can calculate the estimate value of the current task state $s_{(j)}$ by substituting the current values ($T_{t(j)}$, $T_{w(j)}$) of the coordinates of the end-effector T and the workpiece W estimated through the matching into Formula 4 above and performing a computational operation written as Formula 4. Calculating the estimate value of the current task state se corresponds to obtaining the current task state $s_{(j)}$.

$$s = T_g^{-1} \cdot T_w \qquad \text{Formula 5}$$

When the end-effector T is holding the workpiece W, the task state s and the coordinates ($T_w$, $T_g$) of the workpiece W and the other workpiece G may have the relationship written using Formula 5 above. The controller 31 can calculate the estimate value of the current task state se) by substituting the current values ($T_{w(j)}$, $T_{g(j)}$) of the coordinates of the workpiece W and the other workpiece G estimated through the matching into Formula 5 above and performing a computational operation written as Formula 5. The coordinates ($T_t$, $T_w$, $T_g$) may be selected as appropriate. For example, the coordinates ($T_1$, $T_w$, $T_g$) may be represented in the homogeneous coordinate system. The same applies to the processing described below.

When the camera S1 is not calibrated, the controller 31 may further calculate the estimate value of the coordinates ($T_R$) of the origin in the image data obtained with the camera S1. The origin may be detected using a marker or another mark. More specifically, the estimate value of the coordinates ($T_R$) of the origin may be calculated by matching each mark in the image data. The controller 31 can calculate the estimate value of the current task state $s_{(j)}$ using the calculated estimate value of the coordinates ($T_R$) of the origin in each of the operations described above. The same processing applies to subsequent steps including matching using the CAD data 320.

Upon receiving the current task state so, the controller 31 advances the processing to subsequent step S307. The processing in step S306 may be performed at the timing not limited to the above example. The processing in step S306 may be performed at any selected time before the processing in step S308 (described later) is performed. For example, matching using the CAD data 320 may also be performed in step S304 above. In this case, the processing in step S306 may be performed together with the processing in step S304 above.

Step S307

In step S307, the controller 31 operates as the first estimator 313 and calculates the first estimate value of the current endpoint coordinates in the observation space based on the obtained first sensing data 323 using the first estimation model 61. The controller 31 also operates as the second estimator 314 and calculates the second estimate value of the current endpoint coordinates in the observation space based on the obtained second sensing data 324 using the second estimation model 62.

(1) Calculating First Estimate Value

An example computational process for the first estimate value will now be described. As shown in FIG. 17, the controller 31 calculates the first estimate value of the endpoint coordinates of the manipulator 4 in the observation space based on the current value $q_{(j)}$ (first sensing data 323) of the angle of each joint of the manipulator 4 in a joint space defined by the corresponding encoder S2 through the forward kinematics calculation (or estimates the current value $x_{(j)}$). The processing will be described for when the end-effector T is not holding the workpiece W and for when the end-effector T is holding the workpiece W.

(1-1) When Not Holding Workpiece W

When the end-effector T is not holding the workpiece W, the target point T0 on the end-effector T is set to the endpoint. In this case, the controller 31 calculates the first estimate value of the endpoint coordinates defined based on the current value $q_{(j)}$ of the angle of each joint through the forward kinematics calculation using a first transformation matrix group ($\varphi$) derived by a first homogeneous transformation matrix of the joint as a transformation function.

$$x_t = \varphi(q) \qquad \text{Formula 6}$$

$$\varphi(q) = {}_0T^1 \cdot \ldots \cdot {}_{n-1}T^n \qquad \text{Formula 7}$$

More specifically, the coordinates ($x_t$) of the target point T0 on the end-effector T and the angle (q) of each joint may have the relationship written using Formula 6 above based on forward kinematics. The angle (q) is a variable having the number of dimensions corresponding to the number of joints. The first transformation matrix group ($\varphi$) and the first homogeneous transformation matrix (${}_{m-1}T^m$) for each joint may have the relationship written using Formula 7 above (where m is from 0 to n, and n is the number of joints). The first homogeneous transformation matrix represents relative coordinates in the coordinate system for a target joint as viewed from the coordinate system for a position closer to the endpoint than the target joint. The first homogeneous transformation matrix is used to transform the coordinate system for the position closer to the base into the coordinate system for the target joint.

The parameters of the first homogeneous transformation matrix for each joint have known values except for the angle of the joint. In the present embodiment, the parameters are included in the robot data 321. The parameters may be set using a known method, such as Denavit-Hartenberg (DH) notation or modified DH notation. The controller 31 refers to the robot data 321 to derive the first transformation matrix group ($\varphi$) written using Formula 7 above. As written using Formula 6 above, the controller 31 substitutes the current value $q_{(j)}$ of the angle of each joint into the derived first transformation matrix group ($\varphi$) and performs a computational operation of the first transformation matrix group (q). Through the forward kinematics calculation, the controller 31 can calculate the estimate value of the current coordinates of the end-effector T (target point T0 on the end-effector T) (or estimate the current value $x_{(j)}$ of the coordinates). The controller 31 obtains the calculated estimate value as a first estimate value of the current coordinates of the endpoint.

(1-2) When Holding Workpiece W

When the end-effector T is holding the workpiece W, the target point W0 on the workpiece W is set to the endpoint. In this case, the controller 31 first obtains a second homogeneous transformation matrix (${}_tT^w$) for transforming coordinates from the coordinate system for the target point T0 on the end-effector T into the coordinate system for the target point W0 on the workpiece W.

The second homogeneous transformation matrix (${}_tT^w$) may be obtained with any method selected as appropriate in each embodiment. For example, the workpiece W held by the end-effector T may be at a constant position and orientation relative to the end-effector T. The second homogeneous transformation matrix (${}_tT^w$) may thus be defined as a constant.

In some embodiments, the controller 31 may estimate the second homogeneous transformation matrix (${}_tT^w$) from the sensing data obtained in step S303. As an example method for the estimation, the controller 31 may use the CAD data 320 for matching the models for the end-effector T and the workpiece W with the image data obtained with the camera S1. The controller 31 can obtain the estimate values of the coordinates ($T_t$) of the end-effector T and the coordinates ($T_w$) of the workpiece W through the matching. The camera S1 may be calibrated as in the example described above. The controller 31 can then estimate the second homogeneous transformation matrix (${}_tT^w$) from the estimate values of the coordinates ($T_t$) of the end-effector T and the coordinates ($T_w$) of the workpiece W using Formula 8 below.

$${}_tT^w = T_t^{-1} \cdot T_w \qquad \text{Formula 8}$$

The matching using the CAD data 320 may be performed near the coordinates ($x_t$) of the target point T0 on the end-effector T calculated through the forward kinematics calculation. The controller 31 may also use the estimate value of the coordinates ($x_t$) calculated through the forward kinematics calculation as the estimate value of the coordinates ($T_t$). The controller 31 can thus estimate the second homogeneous transformation matrix (${}_tT^w$). In the computational operation written as Formula 4 above in step S306 above, the current value ($x_{t(j)}$) of the coordinates estimated through the forward kinematics calculation may also be used instead of the current value ($T_{t(j)}$) of the coordinates of the end-effector T estimated through the matching.

Another example of the estimation may use the distribution of force acting on the end-effector T measured with the touch sensor S3 that depends on the position and the orientation of the workpiece W relative to the end-effector T. More specifically, the controller 31 may estimate the relative positions (the relative position and the relative orientation) of the workpiece W relative to the end-effector T based on the measurement data (the first sensing data 323) obtained with the touch sensor S3. The controller 31 can estimate the second homogeneous transformation matrix ($_tT^w$) through the estimation.

The second homogeneous transformation matrix ($_tT^w$) may be estimated from the sensing data 322 with any method other than the analytical method described above. The second homogeneous transformation matrix ($_tT^w$) may be estimated using a trained machine learning model capable of estimating the second homogeneous transformation matrix ($_tT^w$) from the sensing data 322 through machine learning, similarly to, for example, the determination model 50 and the inference model 551. In this case, the controller 31 inputs the obtained sensing data 322 into the trained machine learning model and performs a computational operation of the trained machine learning model. In this manner, the controller 31 obtains, from the trained machine learning model, an output value corresponding to an estimation result of the second homogeneous transformation matrix ($_tT^w$).

The controller 31 then multiplies the first transformation matrix group ($\varphi$) by the obtained second homogeneous transformation matrix ($_tT^w$) to calculate a second transformation matrix group ($\varphi(q) \cdot _tT^w$). The second transformation matrix group can be written using Formula 9 below. The first homogeneous transformation matrix is an example first transformation formula. The second homogeneous transformation matrix is an example second transformation formula. The first transformation matrix group ($\varphi$) is an example first transformation formula group. The second transformation matrix group ($\varphi(q) \cdot _tT^w$) is an example second transformation formula group. Each transformation formula may be in any format usable for computing the endpoint coordinates. For example, each transformation formula may be a transformation matrix other than in the homogeneous coordinate system, or may be a formula other than the matrix.

$$\varphi(q) \cdot _tT^w = x_{t \cdot t}T^w \qquad \text{Formula 9}$$

The controller 31 calculates the first estimate value of the endpoint coordinates defined based on the current value $q_{(j)}$ of the angle of each joint through the forward kinematics calculation using the calculated second transformation matrix group as a transformation function. More specifically, the controller 31 substitutes the current value $q_{(j)}$ of the angle of each joint into the second transformation matrix group ($\varphi(q) \cdot _tT^w$) and performs a computational operation of the second transformation matrix group ($\varphi(q) \cdot _tT^w$). Through the forward kinematics calculation, the controller 31 can calculate the estimate value of the current coordinates of the workpiece W (target point W0 on the workpiece W) (or estimate the current value of the coordinates). The controller 31 obtains the estimate value of the calculated estimate value of the workpiece W as a first estimate value of the current endpoint coordinates.

The second homogeneous transformation matrix ($_tT^w$) estimated from the sensing data as described above can reflect any change in the state of the end-effector T holding the workpiece W. The current value of the coordinates of the workpiece W, or in other words, the current value of the endpoint coordinates of the manipulator 4, can be appropriately estimated in response to any change in the state of the end-effector T holding the workpiece W.

(1-3) Brief Summary

In the situations described above, the controller 31 can calculate the first estimate value of the current endpoint coordinates of the manipulator 4 based on the current value $q_{(j)}$ of the angle of each joint through the forward kinematics calculation using the derived transformation function. The transformation function used for the forward kinematics calculation is an example of the first estimation model 61. More specifically, when the end-effector T is not holding the workpiece W, the first transformation matrix group ($\varphi$) is an example of the first estimation model 61. When the end-effector T is holding the workpiece W, the second transformation matrix group ($\varphi(q) \cdot _tT^w$) is an example of the first estimation model 61. The parameters of each transformation function are examples of the parameters of the first estimation model 61.

(2) Calculating Second Estimate Value

An example computational process for the second estimate value will now be described. The controller 31 uses the CAD data 320 for matching the image data (second sensing data 324) obtained with the camera S1 with the model of each object. Thus, the controller 31 can calculate the second estimate value of the current endpoint coordinates of the manipulator 4 (or estimate the current value $x_{(j)}$) In this case, the controller 31 may calculate the second estimate value of the current endpoint coordinates of the manipulator 4 based on the current task state $s_{(j)}$ estimated in the task space in step S306 above.

$$x = \Psi(s) = T_w \cdot s \qquad \text{Formula 10}$$

When the end-effector T is not holding the workpiece W, the task state s and the coordinates x of the endpoint may have the relationship written using Formula 10 above based on the positional relationship between the objects shown in FIG. 18. In this case, the transformation function ($\Psi$) for transforming from the task space to the observation space is defined using the coordinates ($T_w$) of the workpiece W. The controller 31 can calculate the second estimate value of the current endpoint coordinates of the manipulator 4 by substituting the current task state $s_{(j)}$ obtained in step S306 above and the current value ($T_{w(j)}$) of the coordinates of the workpiece W estimated through matching into Formula 10 above and performing a computational operation written as Formula 10.

$$x = \Psi(s) = T_g \cdot s \qquad \text{Formula 11}$$

Similarly, when the end-effector T is holding the workpiece W, the task state s and the coordinates x of the endpoint may have the relationship written using Formula 11 above. In this case, the transformation function ($\Psi$) for transforming from the task space to the observation space is defined using the coordinates ($T_g$) of the other workpiece G. The controller 31 can calculate the second estimate value of the current endpoint coordinates of the manipulator 4 by substituting the current task state $s_{(j)}$ obtained in step S306 above and the current value ($T_{g(j)}$) of the coordinates of the other workpiece G estimated through matching into Formula 11 above and performing a computational operation written as Formula 11.

The transformation function ($\Psi$) in each of Formula 10 and Formula 11 above is an example of the second estimation model 62. The parameters of each transformation function ($\Psi$) are examples of the parameters of the second estimation model 62. The current value $x_{(j)}$ of the endpoint coordinates of the manipulator 4 may be estimated through matching using the CAD data 320 with any method other than the above example method. When the end-effector T is not holding the workpiece W, the controller 31 may estimate the current value ($T_{t(j)}$) of the coordinates of the end-effector T through the matching, and obtain the estimated current value ($T_{t(j)}$) as the second estimate value of the current endpoint coordinates. Similarly, when the end-effector T is holding the workpiece W, the controller 31 may estimate the current value ($T_{w(j)}$) of the coordinates of the workpiece W through the matching, and obtain the estimated current value ($T_{w(j)}$) as the second estimate value of the current endpoint coordinates. In other words, the controller 31 may directly derive the second estimate value of the current endpoint coordinates of the manipulator 4 through the matching. In this case, each set of coordinates ($T_t$, $T_w$) is an example of the second estimation model 62. The terms in each set of coordinates ($T_t$, $T_w$) are examples of the parameters of the second estimation model 62.

(3) Brief Summary

As described above, the controller 31 can calculate the first estimate value and the second estimate value of the current endpoint coordinates of the manipulator 4. The controller 31 determines the current value x(j) of the endpoint coordinates of the manipulator 4 based on at least one of the first estimator or the second estimator. This determination may be performed as appropriate. For example, the controller 31 may directly use either the first estimate value or the second estimate value as the current value $x_{(j)}$ of the endpoint coordinates. For example, the controller 31 may calculate the average of the first estimate value and the second estimate value, and obtain the calculated average as the current value $x_{(j)}$ of the endpoint coordinates. In this case, a weighted average may be used as the average. Each estimate value expected to have higher accuracy of estimation may be weighted with a higher priority. In one example, estimating the endpoint coordinates through the forward kinematics calculation has higher accuracy than estimating the endpoint coordinates through matching with image data obtained with the camera S1. In this case, the first estimate value may be weighted with a higher priority than the second estimate value. Upon obtaining the current value $x_{(j)}$ of the endpoint coordinates, the controller 31 advances the processing to subsequent step S308.

When no adjustment (described later) is performed, the first estimate value or the second estimate value may not be calculated. The processing in step S307 may be performed at the timing not limited to the above example. The processing in step S307 may be performed at any selected time before the processing in step S310 (described later) is performed. For example, the processing in step S307 may be performed before the processing in step S306. For matching using the CAD data 320, for example, the processing in step S307 may be performed together with the processing in step S306 or S304 above.

Step S308

In step S308, the controller 31 operates as the action determiner 316 and determines the goal task state $s_{s(j)}$ to be achieved subsequently to the obtained current task state s) to be closer to the task state $s_g$ as the final goal. In the present embodiment, the controller 31 determines the goal task state $s_{s(j)}$ to be achieved subsequently to the current task state $s_{(j)}$ by referring to the inference model data 225 and using the inference model 55 generated in the processing in step S210 above.

The computational operation of the inference model 55 for inferring the goal task state $s_{s(j)}$ to be achieved subsequently may be performed as appropriate for the configuration of the inference model 55. For the inference model 55 generated with the first method described above and being a functional expression, the controller 31 substitutes the current task state si and the task state $s_g$ as the final goal into the functional expression and performs a computational operation of the functional expression. For the inference model 55 including a neural network, the controller 31 inputs the current task state $s_{(j)}$ and the task state $s_g$ as the final goal into the input layer and then determines neuronal firing in each of the layers sequentially from the layer on the input end. For the inference model 55 including a data table, the controller 31 compares the current task state $s_{(j)}$ and the task state $s_g$ as the final goal with the data table. The controller 31 obtains the result of inference of the goal task state $s_{s(j)}$ to be achieved subsequently as an output from the inference model 55. The controller 31 can determine the goal task state $s_{s(j)}$ to be achieved subsequently based on the inference result.

For the inference model 55 generated with the second method described above, or in other words, the inference model 55 including a potential field, the controller 31 refers to the value of the potential set for the coordinates corresponding to the current task state $s_{(j)}$ in the generated potential field. The controller 31 determines the goal task state $s_{s(j)}$ to be achieved subsequently in accordance with the gradient of the potential set for the coordinates corresponding to the current task state $s_{(j)}$. More specifically, the controller 31 determines the goal task state $s_{s(j)}$ to change to a state with a higher gradient of potential (e.g., to change by a predetermined distance toward the state with the highest gradient of potential).

Any number of goal task states may be determined. In step S308, the controller 31 may use the determined goal task state as the current task state and further determine the goal task state to be achieved subsequently. The controller 31 may repeat the processing to determine the goal task state multiple times. Upon determining the goal task state $s_{s(j)}$ to be achieved subsequently, the controller 31 advances the processing to subsequent step S309.

Step S309

In step S309, the controller 31 operates as the command determiner 317 and calculates the goal value $x_{s(j)}$ of the endpoint coordinates based on the determined goal task state $s_{s(j)}$. As shown in FIG. 17, the controller 31 can use the transformation function ($\Psi$) above to transform the goal task state $s_{s(j)}$ in the task space into the goal value $x_{s(j)}$ of the endpoint coordinates in the observation space.

More specifically, when the end-effector T is not holding the workpiece W, the transformation function ($\Psi$) from the task space to the observation space is written using Formula 10 above. The controller 31 can calculate the goal value $x_{s(j)}$ of the endpoint coordinates by substituting the determined goal task state $s_{s(j)}$ into Formula 10 above and performing a computational operation written as Formula 10. When the end-effector T is holding the workpiece W, the transformation function (Ψ) from the task space to the observation space is written using Formula 11 above. The controller 31 can calculate the goal value $x_{s(j)}$ of the endpoint coordinates by substituting the determined goal task state $s_{s(j)}$ into Formula 11 above and performing a computational operation written as Formula 11. Upon calculating the goal value $x_{s(j)}$ of the endpoint coordinates, the controller 31 advances the processing to subsequent step S310.

Step S310

In step S310, the controller 31 operates as the command determiner 317 and calculates an amount of change ($\Delta x_{(j)}$) in the endpoint coordinates based on the current value $x_{(j)}$ of the endpoint coordinates and the goal value $x_{s(j)}$ of the endpoint coordinates. More specifically, as shown in FIG. 17, the controller 31 determines the amount of change ($\Delta x_{(j)}$) in the endpoint coordinates based on the deviation of the current value $x_{(j)}$ of the endpoint coordinates from the goal value $x_{s(j)}$. For example, the amount of change ($\Delta x$) and the deviation ($x_s-x$) of the current value of the endpoint coordinates from the goal value may have the relationship written using Formula 12 below. The amount of change ($\Delta x$) in the endpoint coordinates is an example of the difference between the current value and the goal value of the endpoint coordinates.

$$\Delta x = \alpha \times (x_s - x) \quad \text{Formula 12}$$

α is a coefficient. For example, the value of α may be determined as appropriate in a range of more than 0 to less than or equal to 1. α may be eliminated. The controller 31 can determine the amount of change ($\Delta x_{(j)}$) in the endpoint coordinates by substituting the current value $x_{(j)}$ of the endpoint coordinates obtained in step S307 and the goal value $x_{s(j)}$ of the endpoint coordinates obtained in step S309 into Formula 12 above and performing a computational operation written as Formula 12. Upon determining the amount of change ($\Delta x_{(j)}$) in the endpoint coordinates, the controller 31 advances the processing to subsequent step S311.

Step S311

In step S311, the controller 31 operates as the command determiner 317 and calculates an amount of change ($\Delta q_{(j)}$) in the angle of each joint from the determined amount of change ($\Delta x_{(j)}$) in the endpoint coordinates through the inverse kinematics calculation using the inverse function of the transformation function for the forward kinematics calculation described above. More specifically, the amount of change ($\Delta x$) in the endpoint coordinates and the amount of change ($\Delta q$) in the angle of each joint may have the relationship written using Formula 13 below.

J is a Jacobian matrix derived from the transformation function in above forward kinematics calculation. $j_i$ indicates a matrix element at the i-th joint, and $\Delta q_i$ indicates the amount of change at the i-th joint.

Figure 19A:
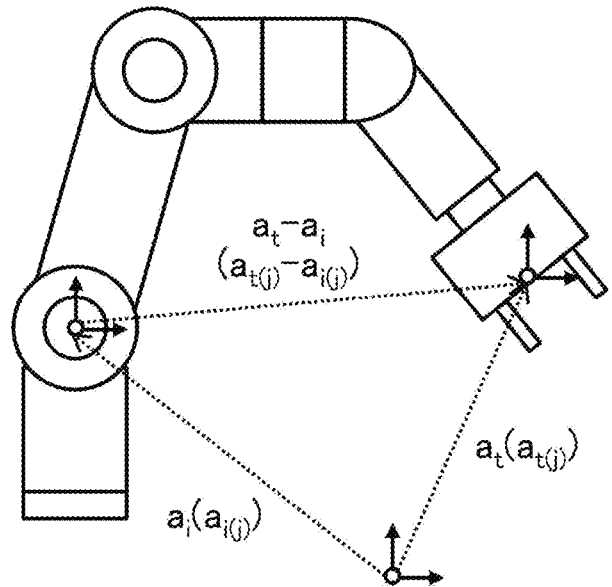
FIG. 19A is a schematic diagram illustrating an end-effector not holding a workpiece, showing an example relationship between each joint and an endpoint.
Figure 19B:
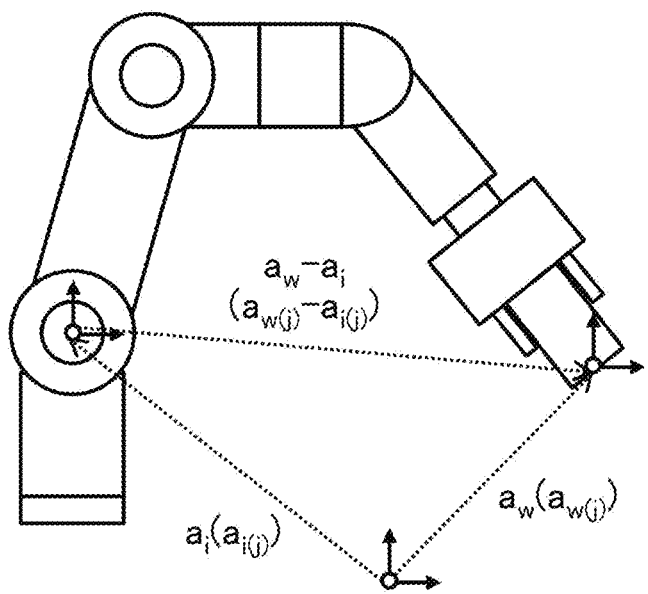
FIG. 19B is a schematic diagram illustrating an end-effector holding a workpiece, showing an example relationship between each joint and an endpoint.

An example calculation with the Jacobian matrix will now be described with further reference to FIGS. 19A and 19B. FIG. 19A is a schematic diagram of the end-effector T not holding the workpiece W, showing an example relationship between each joint and the endpoint. FIG. 19B is a schematic diagram of the end-effector T holding the workpiece W, showing an example relationship between each joint and the endpoint.

As shown in FIG. 19A, when the end-effector T is not holding the workpiece W, the elements at the joints of the Jacobian matrix are calculated based on the positional relationship between the joints and the end-effector T. For example, the controller 31 can calculate the elements at the joints using Formula 14 below. As shown in FIG. 19B, when the end-effector T is holding the workpiece W, the elements at the joints of the Jacobian matrix are calculated based on the positional relationship between the joints and the workpiece W. For example, the controller 31 can calculate the elements at the joints using Formula 15 below.

$$j_i = \begin{bmatrix} z_i \times (a_t - a_i) \\ z_i \end{bmatrix} \quad \text{Formula 14}$$

$$j_i = \begin{bmatrix} z_i \times (a_w - a_i) \\ z_i \end{bmatrix} \quad \text{Formula 15}$$

$z_i$ indicates a rotation element of the rotational axis at the homogeneous coordinates of the i-th joint, and $a_i$ indicates a translation element at the homogeneous coordinates of the i-th joint. $z_i$ and $a_i$ are extracted from the first homogeneous transformation matrix at the i-th joint. $a_t$ indicates a translation element at the homogeneous coordinates of the end-effector T. $a_w$ indicates a translation element at the homogeneous coordinates of the workpiece W. $a_t$ is extracted from the coordinates ($T_t$) of the end-effector T. $a_w$ is extracted from the coordinates ($T_w$) of the workpiece W. Each element $j_i$ of the Jacobian matrix indicates a differential element at each joint in the first homogeneous transformation matrix.

The controller 31 calculates the Jacobian matrix in accordance with the operation mode using Formulas 14 and 15 above. In the present embodiment, the element ($a_t$) of the end-effector T and the element ($a_w$) of the workpiece W are simply replaced with each other in the elements of the Jacobian matrix between when the end-effector T is not holding the workpiece W and when the end-effector T is holding the workpiece W. The controller 31 thus calculates the Jacobian matrix through a simple computational process.

The controller 31 calculates the inverse matrix ($J^{-1}$) of the calculated Jacobian matrix. The controller 31 performs the inverse kinematics calculation using the calculated inverse matrix ($J^{-1}$). More specifically, the controller 31 derives the relationship between each amount of change ($\Delta x$, $\Delta q$) and the inverse matrix ($J^{-1}$) from Formula 13 above as written using Formula 16 below.

$$\Delta q = J^{-1} \cdot \Delta x \quad \text{Formula 16}$$

The controller 31 can calculate the amount of change ($\Delta q_{(j)}$) in the angle of each joint by substituting the calculated inverse matrix ($J^{-1}$) and the amount of change ($\Delta x_{(j)}$) in the endpoint coordinates into Formula 16 and performing a computational operation written as Formula 16 above. Upon calculating the amount of change ($\Delta q_{(j)}$) in the angle of each joint, the controller 31 advances the processing to subsequent step S312.

Step S312

In step S312, the controller 31 operates as the command determiner 317 and determines a command value for each joint based on the calculated amount of change in the angle of each joint. The command value may be determined with a known method such as proportional-integral-derivative (PID) control and PI control. A command value for each joint is an example of a control command for the manipulator 4. In the present embodiment, the controller 31 can determine the control command for the manipulator 4 to allow the endpoint coordinates to be closer to the goal value (and further to change the task state of the manipulator 4 from the current task state $s_{(j)}$ to the goal task state $s_{s(j)}$) through the processing in steps S309 to S312. Upon determining the control command, the controller 31 advances the processing to subsequent step S313.

Step S313

In step S313, the controller 31 operates as the driver 318 and provides the determined control command to the manipulator 4 to drive the manipulator 4. In the present embodiment, the controller 31 drives each joint of the manipulator 4 using the determined command value. The driving may be performed in any manner selected as appropriate in each embodiment. For example, the controller 31 may directly drive each joint of the manipulator 4. In some embodiments, the manipulator 4 may include a controller (not shown). In this case, the controller 31 may indirectly drive each joint of the manipulator 4 by providing a command value for each joint to the controller. Upon driving the manipulator 4 in accordance with the determined control command, the controller 31 advances the processing to subsequent step S314.

Steps S314 to S316

The processing in steps S314 to S316 may be the same as the processing in steps S303, S306, and S307 above except that the cycle advances from (j) to (j+1). More specifically, in step S314, the controller 31 obtains each set of sensing data (323, 324) from the corresponding sensor system. In step S315, the controller 31 operates as the state obtainer 315 and obtains the current task state $s_{(j+1)}$ of the manipulator 4. In step S316, the controller 31 operates as each estimator (313, 314), and calculates each estimate value of the current endpoint coordinates of the manipulator 4 based on the corresponding set of sensing data (323, 324). The controller 31 determines the current value $x_{(j+1)}$ of the endpoint coordinates based on at least one of the calculated first estimate value or the calculated second estimate value. Upon obtaining the current value $x_{(j+1)}$ of the endpoint coordinates, the controller 31 advances the processing to subsequent step S317.

Step S317

In step S317, the controller 31 determines whether the task state of the manipulator 4 has changed to the goal task state $s_{s(j)}$ after the driving in step S313.

The determination method may be selected as appropriate in each embodiment. For example, as shown in FIG. 17, the angle $(q_{(j+1)})$ of a joint after the driving and the angle $(q_{(j)})$ of the joint before the driving may have the relationship written using Formula 17 below.

$$q_{(j+1)} = q_{(j)} + \Delta q(j) \qquad \text{Formula 17}$$

The controller 31 may determine whether the angle of a joint obtained with an encoder S2 in step S314 agrees with the sum of the angle $(q_{(j)})$ of the joint obtained with the encoder S2 before the driving and the amount of change $(\Delta q_{(j)})$ calculated in step S311. In response to the angle of the joint after the driving agreeing with the sum $(q_{(j)} + \Delta q_{(j)})$ of the angle of the joint before the driving and the calculated amount of change, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$.

Similarly to the transformation function in the forward kinematics calculation, for example, a Jacobian matrix $J_\Psi$ may be derived for the transformation function ($\Psi$). The Jacobian matrix $J_\Psi$ indicates a differential element in the transformation function ($\Psi$). The derived Jacobian matrix $J_\Psi$ may be used to calculate an inverse matrix $(J_\Psi^{-1})$. The amount of change ($\Delta x$) in the endpoint coordinates, the amount of change ($\Delta s$) in the task state, and the inverse matrix $(J_\Psi^{-1})$ may have the relationship written using Formula 18 below.

$$\Delta s = J_\Psi^{-1} \cdot \Delta x \qquad \text{Formula 18}$$

The controller 31 can calculate the amount of change ($\Delta s(j)$) in the task state by substituting the calculated inverse matrix $(J_\Psi^{-1})$ and the amount of change $(\Delta x_{(j)})$ in the endpoint coordinates into Formula 18 and performing a computational operation written as Formula 18 above. The task state $s_{(j+1)}$ after the driving and the task state $s_{(j)}$ before the driving may have the relationship written using Formula 19 below, similarly to Formula 17 above.

$$s_{(j+1)} = s_{(j)} + \Delta s_{(j)} \qquad \text{Formula 19}$$

The controller 31 may determine whether the current task state obtained in step S315 after the driving agrees with the sum of the current task state se obtained in step S306 before the driving and the above calculated amount of change $(\Delta s_{(j)})$. In response to the current task state obtained after the driving agreeing with the sum $(s_{(j)} + \Delta s_{(j)})$ of the current task state obtained before the driving and the calculated amount of change, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$. In the present embodiment, the task space is defined using the relative coordinates between two objects, and the task space and the observation space can be represented in the same dimensions. The inverse matrix $(J_\Psi^{-1})$ in Formula 18 may be replaced with a unit matrix, and the amount of change ($\Delta x$) in the endpoint coordinates may be directly used as the amount of change ($\Delta s$) in the task state. For a task state defined using the relative coordinates of the workpiece W as viewed from the other workpiece G, for example, the inverse matrix $(J_\Psi^{-1})$ in Formula 18 may be replaced with a unit matrix.

In some embodiments, the controller 31 may determine whether the current task state obtained in step S315 agrees with the goal task state $s_{s(j)}$ determined in step S308. In response to the obtained current task state agreeing with the goal task state $s_{s(j)}$, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$.

For example, the current value $(x_{(j+1)})$ of the endpoint coordinates after the driving and the current value $(x_{(j)})$ of the endpoint coordinates before the driving may have the relationship written using Formula 20 below, similarly to Formula 17 above.

$$x_{(j+1)} = x_{(j)} + \Delta x_{(j)} \qquad \text{Formula 20}$$

The controller 31 may determine whether the current value of the endpoint coordinates after the driving obtained in step S316 agrees with the sum of the current value $(x_{(j)})$ of the endpoint coordinates before the driving obtained in step S307 and the amount of change $(\Delta x_{(j)})$ determined in step S310. In response to the current value of the endpoint coordinates after the driving agreeing with the sum $(x_{(j)} + \Delta x_{(j)})$ of the current value of the endpoint coordinates before the driving and the calculated amount of change, the controller 31 may determine that the task state of the manipulator 4 has changed to the goal task state $s_{s(j)}$.

Otherwise, the controller 31 may determine that the task state of the manipulator 4 has not changed to the goal task state $s_{s(j)}$.

In some embodiments, the controller 31 may determine whether the current value of the endpoint coordinates obtained in step S316 agrees with the goal value ($x_{s(j)}$) of the endpoint coordinates calculated in step S309. In response to the current value of the endpoint coordinates after the driving agreeing with the goal value ($x_{s(j)}$) of the endpoint coordinates calculated before the driving, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$.

The controller 31 can thus determine whether the task state of the manipulator 4 has changed to the goal task state $s_{s(j)}$ in any of the above manners. Agreeing in each determination above may include complete agreeing between two values, and may also include agreeing between two values including a difference of less than or equal to a threshold (allowable error). When determining that the task state of the manipulator 4 has changed to the goal task state $s_{s(j)}$, the controller 31 advances the processing to subsequent step S318. Otherwise, the controller 31 returns the processing to step S310 and drives the manipulator 4 again. The controller 31 may use the current value of the endpoint coordinates calculated in step S316 as the current value $x_{(j)}$ to perform the processing in step S310 and subsequent steps.

Step S318

In step S318, the controller 31 determines whether the task state $s_g$ as the final goal has been achieved.

The determination method may be selected as appropriate in each embodiment. For example, the controller 31 may determine whether the current task state $s_{(j+1)}$ obtained in step S315 agrees with the task state $s_g$ as the final goal. In response to the current task state $s_{(j+1)}$ agreeing with the task state $s_g$ as the final goal, the controller 31 determines that the task state $s_g$ as the final goal has been achieved. Otherwise, the controller 31 determines that the task state $s_g$ as the final goal has not been achieved. As in the above example, agreeing in each determination above may include complete agreeing between two values, and may also include agreeing between two values including a difference of less than or equal to a threshold (allowable error).

When determining that the task state $s_g$ as the final goal has been achieved, the controller 31 ends the series of processing steps for operation control over the manipulator 4. When determining that the task state $s_g$ as the final goal has not been achieved, the controller 31 returns the processing to step S308. The controller 31 then performs the processing in steps S308 to S313 using the results from steps S315 and S316. The controller 31 repeats the series of processing steps to achieve the task state $s_g$ as the final goal. The control apparatus 3 according to the present embodiment can thus control the operation of the manipulator 4 to perform a specified task.

In response to determination that the task state $s_g$ as the final goal has not been achieved, the branch destination is not limited to step S308 above. When the manipulator 4 performs a series of tasks, for example, the task state $s_g$ as the final goal may be the task state as the final goal of the task to be performed last. In the present embodiment, for performing a task of causing the end-effector T to hold the workpiece W and joining the workpiece W being held to the other workpiece G, the task state $s_g$ as the final goal may be the state in which the workpiece W is joined to the other workpiece G. In this case, the series of tasks may start from the start point for the first task. In this case, in response to determination that the task state $s_g$ as the final goal has not been achieved, the branch destination may be step S303 above instead of step S308 above. The controller 31 can thus drive the manipulator 4 while monitoring the operation mode through the processing in steps S304 and S305. The series of tasks can be performed while smoothly switching from one to another. When the workpiece W is held by the end-effector T in the present embodiment, the operation mode can be smoothly switched to the mode for the task of transporting the workpiece W toward the other workpiece G.

(B) Adjustment Process

Figure 20:
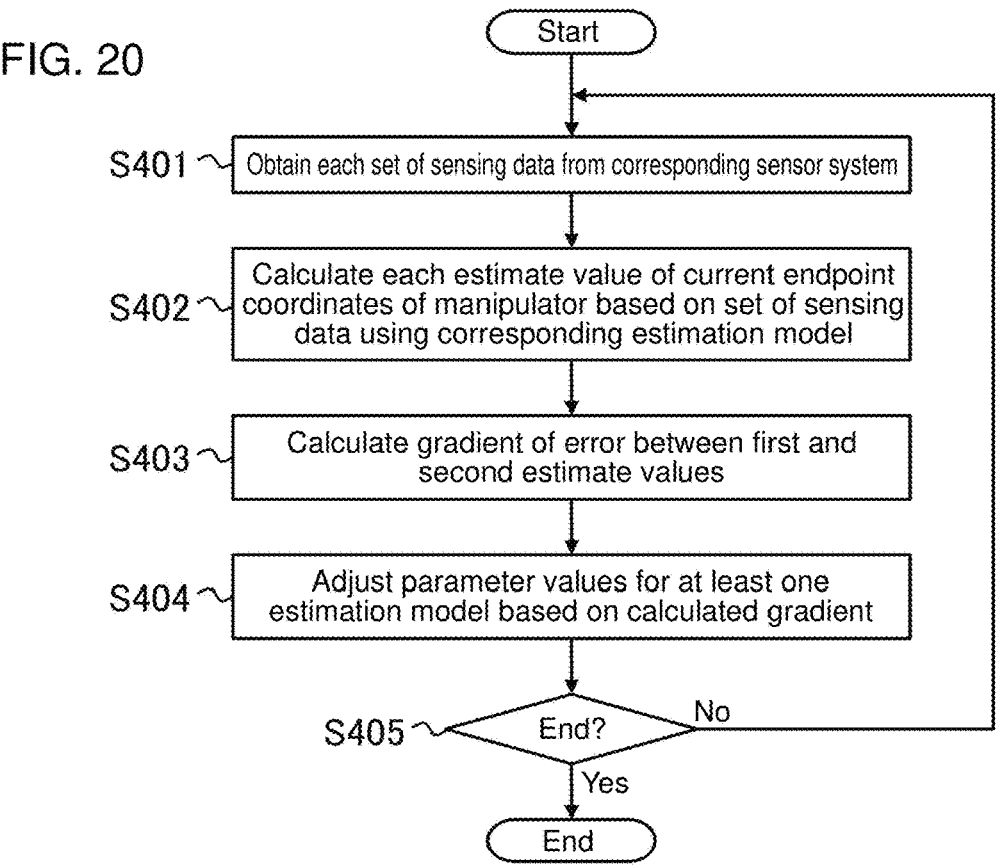
FIG. 20 is a flowchart illustrating an example procedure performed by a control apparatus according to one or more embodiments for adjusting parameters of an estimation model.

An example operation of the control apparatus 3 according to the present embodiment for adjusting the parameters of the estimation models (61, 62) will now be described with reference to FIG. 20. FIG. 20 is a flowchart of an example procedure performed by the control apparatus 3 according to the present embodiment for adjusting the parameters of the estimation models (61, 62). In the present embodiment, the first estimation model 61 is a transformation function (a first transformation matrix group or a second transformation matrix group) used for the above forward kinematics calculation. The second estimation model 62 is a transformation function ($\Psi$) or each set of coordinates ($T_t$, $T_w$) for transforming values in the task space into values in the observation space. The information processing for the parameter adjustment may be performed together with or separately from the information processing for the operation control over the manipulator 4 described above. The procedure described below including the procedure for the above operation control is an example of a control method in an aspect of the present invention. However, the procedure below is a mere example, and each of its steps may be modified in any possible manner. In the procedure below, steps may be eliminated, substituted, or added as appropriate in each embodiment.

Steps S401 and S402

In step S401, the controller 31 operates as each data obtainer (311, 312) and obtains each set of sensing data (323, 324) from the corresponding sensor system. The processing in step S401 may be performed in the same manner as in steps S303 and S314 above. In step S402, the controller 31 operates as each estimator (313, 314), and calculates each estimate value of the current endpoint coordinates based on the obtained set of sensing data (323, 324) using the corresponding estimation model (61, 62). The processing in step S402 may be performed in the same manner as in steps S307 and S316 above. Upon obtaining each estimate value, the controller 31 advances the processing to subsequent step S403.

When the information processing for the parameter adjustment is performed together with the information processing for the above operation control, the processing in step S401 corresponds to the processing in step S303 or step S314 above. The processing in step S402 corresponds to the processing in step S307 or step S316 above. In this case, after the processing in step S307 or step S316, the controller 31 may perform the processing in step S403 at any selected time.

Steps S403 and S404

In step S403, the controller 31 operates as the adjuster 319 and calculates the gradient of the error between the calculated first estimate value and the calculated second estimate value. A functional expression such as an error function may be used to calculate the error. For example, the controller 31 can calculate a difference between the first estimate value and the second estimate value, calculate a power (e.g., a square) of the calculated difference, and obtain the calculated value as an error. The controller 31 can then calculate the gradients of the errors for the parameters of each estimation model (61, 62) by calculating a partial derivative for each calculated error.

In step S404, the controller 31 operates as the adjuster 319 and calculates the gradient of the error between the first estimate value and the second estimate value and adjusts the parameter value for at least one of the first estimation model 61 or the second estimation model 62 to reduce the error based on the calculated gradient. In one example, the controller 31 updates the values of the parameters by subtracting each calculated gradient from the corresponding parameter value. The controller 31 can thus adjust the values of the parameters based on the calculated gradients.

The parameter values for both the estimation models (61, 62) may be adjusted. In some embodiments, the parameter values for one of the estimation models (61, 62) may be adjusted. When noise occurs in both the sensor systems or when the parameters of the two estimation models (61, 62) may be both inappropriate, the parameters of both the estimation models (61, 62) may be adjusted. Upon adjusting the parameters, the controller 31 advances the processing to subsequent step S405.

Step S405

In step S405, the controller 31 determines whether to end the parameter adjustment for each estimation model (61, 62). The determination as to whether to end the parameter adjustment may be performed as appropriate in each embodiment.

For example, the parameter adjustment may be ended after a predefined number of times the adjustment is repeated. The predefined number of times may be preset or may be specified by an operator. In this case, the controller 31 determines whether the count for the series of processes from step S401 to step S404 has reached the predefined number of times. When determining that the count has not reached the predefined number of times, the controller 31 returns the processing to step S401 and repeats the processing in steps S401 to S404. When determining that the count has reached the predefined number of times, the controller 31 ends the series of processes for the parameter adjustment based on the gradient of the error between the first estimate value and the second estimate value.

For example, the controller 31 may prompt an operator to indicate whether to repeat the processing. In this case, the controller 31 determines whether the processing for the parameter adjustment is to be repeated in response to an indication from the operator. In response to the operator indicating to repeat the processing, the controller 31 returns the processing to step S401 and repeats the processing in steps S401 to S404. In response to the operator indicating not to repeat the processing, the controller 31 ends the series of processes for the parameter adjustment based on the gradient of the error between the first estimate value and the second estimate value.

Adjustment After Contact

Figure 21:
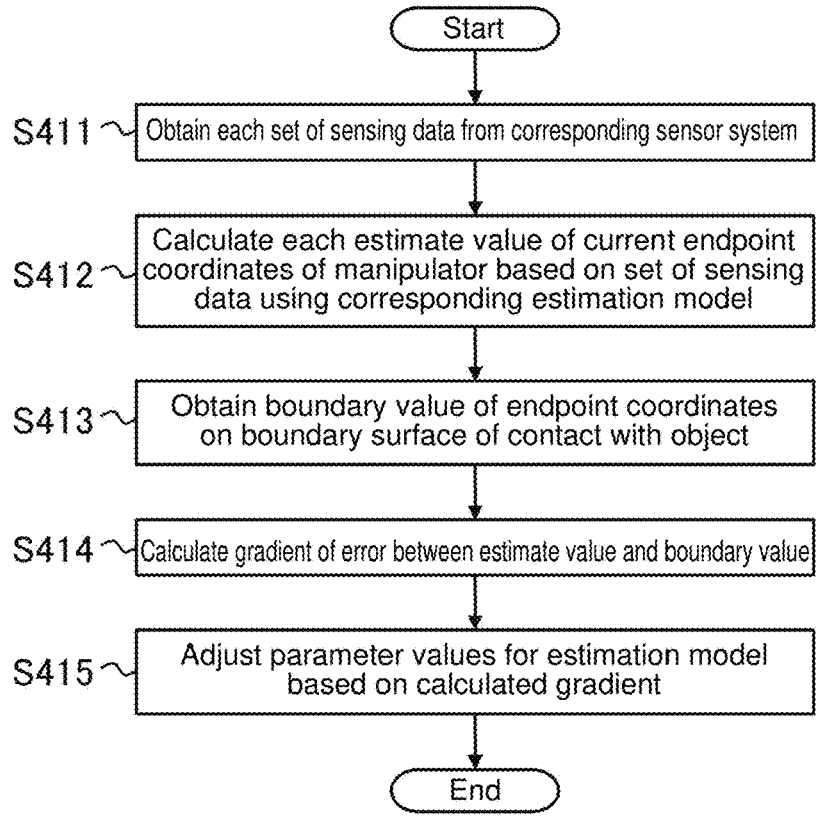
FIG. 21 is a flowchart illustrating an example procedure performed by a control apparatus according to one or more embodiments for adjusting parameters of an estimation model.

An example operation of the control apparatus 3 according to the present embodiment for adjusting the parameters of the estimation models (61, 62) will now be described with reference to FIG. 21. FIG. 21 is a flowchart of an example procedure for adjusting the parameters of the estimation models (61, 62) with another method.

Upon contact of the endpoint of the manipulator 4 with an object, the control apparatus 3 according to the present embodiment may perform parameter adjustment illustrated in FIG. 21, in addition to the parameter adjustment performed with the method illustrated in FIG. 20 above. In the present embodiment, when the end-effector T is not holding the workpiece W, the end-effector T is the endpoint of the manipulator 4, and the workpiece W is an example of an object with which the endpoint of the manipulator 4 comes in contact. In the present embodiment, when the end-effector T is holding the workpiece W, the workpiece W is the endpoint of the manipulator 4, and the other workpiece G is an example of an object with which the endpoint of the manipulator 4 comes in contact.

The information processing for the parameter adjustment performed with the method illustrated in FIG. 21 may also be performed together with or separately from the information processing for the operation control over the manipulator 4 as described above. The procedure described below including the procedure for the above operation control is an example of a control method in an aspect of the present invention. However, the procedure below is a mere example, and each of its steps may be modified in any possible manner. In the procedure below, steps may be eliminated, substituted, or added as appropriate in each embodiment.

Steps S411 and S412

In step S411, the controller 31 operates as each data obtainer (311, 312) and obtains each set of sensing data (323, 324) from the corresponding sensor system. The processing in step S411 may be performed in the same manner as in step S401 above. In step S412, the controller 31 operates as each estimator (313, 314) and calculates each estimate value of the current endpoint coordinates based on the obtained set of sensing data (323, 324) using the corresponding estimation model (61, 62). The processing in step S412 may be performed in the same manner as in step S402 above. Upon calculating each estimate value, the controller 31 advances the processing to subsequent step S413.

Step S413

In step S413, the controller 31 operates as the adjuster 319 and obtains the boundary value of the endpoint coordinates on the boundary surface of the contact with the object. The boundary value of the endpoint coordinates may be obtained with any method selected as appropriate in each embodiment. For example, the boundary value of the endpoint coordinates may be specified through an operator input using the input device 35. In the present embodiment, the task state is defined using the relative coordinates of the endpoint of the manipulator 4 relative to the destination object. The boundary value of the endpoint coordinates may be obtained using the task space SP representing a set of task states (relative coordinates).

Figure 22:
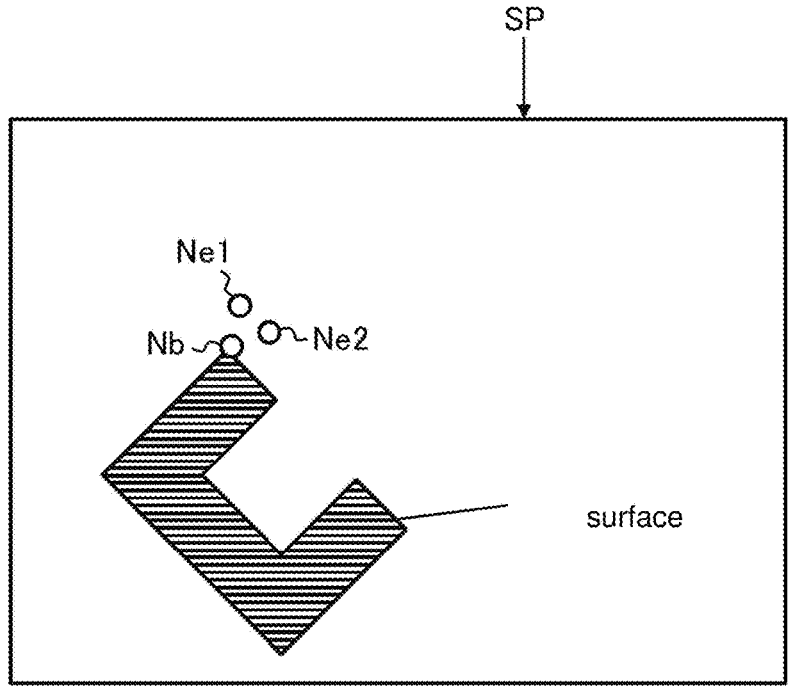
FIG. 22 is a schematic diagram illustrating an example situation in which a boundary value on a contact boundary surface is obtained.

An example method for obtaining the boundary value of the endpoint coordinates using the task space SP will now be described with reference to FIG. 22. FIG. 22 is a schematic diagram of an example situation in which the boundary value on the contact boundary surface is obtained. The controller 31 inputs each estimate value of the endpoint coordinates calculated in step S412 into an inverse function of the transformation function ($\Psi$) and calculates the coordinates in the task space SP corresponding to each estimate value through a computational operation of the inverse function. In the example of FIG. 22, a node Ne1 indicates the coordinates corresponding to the first estimate value, and a node Ne2 indicates the coordinates corresponding to the second estimate value.

The controller 31 derives the contact boundary surface in the task space SP. The contact boundary surface may be derived using a trained determination model 50. The controller 31 (storage 32) may include the trained determination model 50 stored as the training-result data 125. In some embodiments, the controller 31 may obtain the derived boundary surface from the second model generation apparatus 2 by requesting the result from the second model generation apparatus 2 through a network.

The controller 31 selects a node Nb near the coordinates corresponding to at least one of the first estimate value (node Ne1) or the second estimate value (node Ne2) on the derived contact boundary surface. For example, the controller 31 may select a node that is the nearest neighbor to these nodes (Ne1 and Ne2) as the node Nb. The controller 31 inputs the coordinates of the selected node Nb into the transformation function ($\Psi$) and performs a computational operation of the transformation function ($\Psi$) to calculate the boundary value of the endpoint coordinates.

With any of these methods, the controller 31 can obtain the boundary value of the endpoint coordinates. Upon obtaining the boundary value of the endpoint coordinates, the controller 31 advances the processing to subsequent step S414. The boundary value of the endpoint coordinates may be obtained differently. For example, the controller 31 may directly derive the contact boundary surface in the observation space. The controller 31 may select a point on the derived contact boundary surface near the coordinates corresponding to at least one of the first estimate value or the second estimate value. The controller 31 may then obtain the coordinates of the selected point as the boundary value.

Steps S414 and S415

In step S414, the controller 31 operates as the adjuster 319 and calculates the gradient of a first error between the first estimate value estimated at the contact and the obtained boundary value. The controller 31 also calculates the gradient of a second error between the second estimate value estimated at the contact and the obtained boundary value. Each gradient may be calculated in the same manner as in step S403 above.

In step S415, the controller 31 operates as the adjuster 319 and adjusts the parameter values for the first estimation model 61 to reduce the first error based on the calculated gradient of the first error. The controller 31 also adjusts the parameter values for the second estimation model 62 to reduce the second error based on the calculated gradient of the second error. The parameter values may be adjusted in the same manner as in step S404 above. Upon adjusting the parameters, the controller 31 ends the series of processes for the parameter adjustment using the boundary value.

Processing Timing

Figure 23:
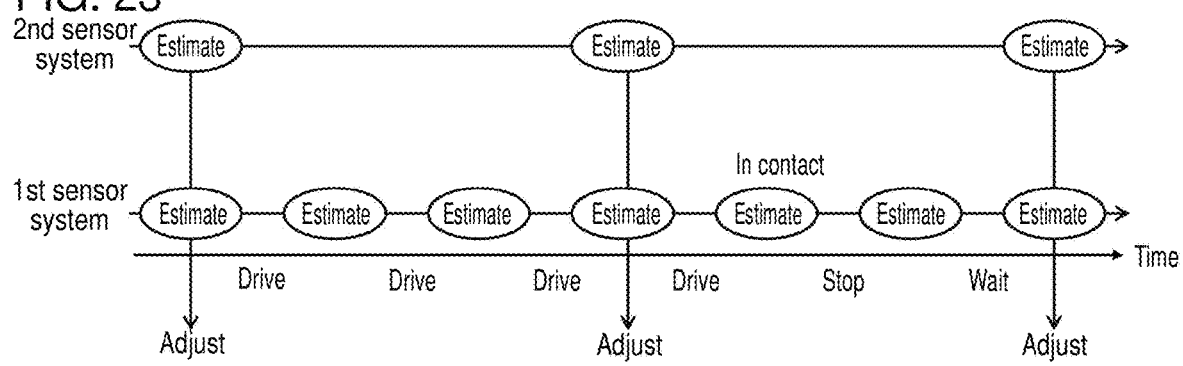
FIG. 23 is a schematic diagram illustrating an example relationship between control timing and adjustment timing.

An example relationship between the timing of the above operation control and the timing of the parameter adjustment will be described with reference to FIG. 23. FIG. 23 is a schematic diagram of an example relationship between the timing of the operation control and the timing of the parameter adjustment.

The first sensor system and the second sensor system operate in different processing cycles for obtaining different sets of sensing data (323, 324). With these sensor systems operating in different processing cycles, the information processing for the operation control over the manipulator 4 above may be performed at the time when sensing data can be obtained from at least one of the first sensor system or the second sensor system. The controller 31 may perform the above parameter adjustment at the time when these sets of sensing data (323, 324) can be obtained.

In the example of FIG. 23, the first sensor system including the encoders S2 and the touch sensor S3 operates in the processing cycles shorter than the processing cycles for the second sensor system including the camera S1. In one example, the first sensor system operates in processing cycles of 10 milliseconds (ms), whereas the second sensor system operates in processing cycles of 30 ms. In such processing cycles, the first sensor system obtains the first sensing data 323 three times while the second sensor system obtains the second sensing data 324 once.

In this example of FIG. 23, at the time when the first sensing data 323 alone can be obtained from the first sensor system, the controller 31 may control the operation of the manipulator 4 using the first estimate value of the current endpoint coordinates calculated based on the first sensing data 323. At the time when both those sets of sensing data (323, 324) can be obtained from the first sensor system and the second sensor system, the controller 31 may control the operation of the manipulator 4 using at least one of the calculated first estimate value or the calculated second estimate value of the current endpoint coordinates. At this time, the controller 31 may perform the above information processing for adjusting the parameters illustrated in FIG. 20.

Further, when the endpoint of the manipulator 4 comes in contact with an object, the controller 31 may stop the operation control over the manipulator 4 and wait until the time when both those sets of sensing data (323, 324) can be obtained from the first sensor system and the second sensor system. The controller 31 may perform the above information processing for adjusting the parameters at the time when these sets of sensing data (323, 324) can be obtained. The controller 31 may additionally perform the above information processing for adjusting the parameters illustrated in FIG. 20. To perform both the parameter adjustments shown in FIGS. 20 and 21, the processing in step S401 above may be the same processing as in step S411, and the processing in step S402 above may be the same processing as in step S412. This allows control over the operation of the manipulator 4 and adjustment of the parameter values for each of the estimation models (61, 62) at appropriate timing.

After adjusting the parameter values for each estimation model (61, 62) with the methods shown in FIGS. 20 and 21, the closeness of each estimate value estimated with the corresponding estimation model (61, 62) to the true value may be evaluated as appropriate. In one example, noise possibly contained in each set of sensing data (323, 324) obtained with the corresponding sensor system may be white noise. At least any set of sensing data obtained for a predetermined time is thus averaged to remove or reduce such noise contained in the sensing data. The closeness of each estimate value obtained with the corresponding estimation model (61, 62) to the true value can be evaluated by determining whether the averaged sensing data contains elements associated with each estimate value obtained with the corresponding estimation model (61, 62).

For example, a depth camera may be used as the camera S1, and a depth map (image data including depth information) may be obtained as the second sensing data 324. In this case, the controller 31 plots each estimate value on the depth map and compares the coordinates corresponding to each estimate value with the endpoint coordinates of the manipulator 4 on the depth map. For the comparison showing the sets of coordinates agreeing with each other (or being approximate to each other), the controller 31 may evaluate each estimate value estimated with the corresponding estimation model (61, 62) as being close to the true value. When the sets of coordinates deviate from each other, each estimate value estimated with the corresponding estimation model (61, 62) is not close to the true value. In this case, the controller 31 may repeat the parameter adjustment with at least one of the methods illustrated in FIGS. 20 and 21 above until each of the above estimate values can be evaluated as being close to the true value.

Features

In the present embodiment described above, the parameter values for at least one of the first estimation model 61 or the second estimation model 62 are adjusted in step S404 above to allow these models to yield estimation results (estimate values) converging to a single value. When the endpoint of the manipulator 4 comes in contact with an object, the parameter values for the two estimation models (61, 62) are adjusted in step S415 above to allow these models to have estimate values converging to a boundary value at the contact. Such adjustments can improve the accuracy in estimating the endpoint coordinates with each of these estimation models (61, 62). Through the processing in step S415, the accuracy in estimating the endpoint coordinates with each of the estimation models (61, 62) can be improved by adjusting the parameter values for these estimation models (61, 62) based on highly accurate information (boundary values) resulting from the physical constraints in the contact with the object. The structure according to the present embodiment improves the accuracy in controlling the endpoint coordinates of the manipulator 4.

In the present embodiment, the first estimate value of the current endpoint coordinates of the manipulator 4 may be calculated through the forward kinematics calculation in steps S307 and S316 above. When the end-effector T is not holding the workpiece W, the end-effector T is set to the endpoint, and the forward kinematics calculation is performed using the first transformation matrix group ($\varphi$) derived by the first homogeneous transformation matrix of each joint (each of the joints 41 to 46) as a transformation function. When the end-effector T is holding the workpiece W, the workpiece W is set to the endpoint, and the forward kinematics calculation is performed using an extended transformation function. More specifically, the forward kinematics calculation is performed using the second transformation matrix group ($\varphi(q) \cdot {}_t T^w$) as a transformation function. The second transformation matrix group ($\varphi(q) \cdot {}_t T^w$) is obtained by multiplying the first transformation matrix group ($\varphi$) by the second homogeneous transformation matrix (${}_t T^w$) for transforming the coordinates from the coordinate system for the end-effector T into the coordinate system for the workpiece W. In other words, when the end-effector T holds the workpiece W in the present embodiment, the reference point for the kinematics changes from the end-effector T to the workpiece W.

Thus, the forward kinematics calculation in steps S307 and S316 can be performed substantially in the same manner as the inverse kinematics calculation in step S311 for when the end-effector T is not holding the workpiece W and for when the end-effector T is holding the workpiece W. In other words, the first task of holding the workpiece W with the end-effector T and the second task of joining the workpiece W held by the end-effector T to the other workpiece G can be processed as the same task of moving the endpoint of the manipulator 4 relative to the destination object. The structure according to the present embodiment can perform unified control in versatile situations for when the end-effector T is not holding the workpiece W and for when the end-effector T is holding the workpiece W. The structure according to the present embodiment can simplify the control over the manipulator 4 and thus reduce the cost for creating or teaching the operation of the manipulator 4. The structure according to the above embodiment can reduce the cost of creating or teaching a series of operations for holding the workpiece W with the end-effector T and joining the workpiece W being held to the other workpiece G.

In the present embodiment, the state of each task to be performed by the manipulator 4 is expressed using a relative positional relationship between objects, such as the end-effector T (end-effector), the workpiece W, and the other workpiece G. The control command is not directly associated with each task, but with the amount of change in the relative positional relationship between the objects. In other words, time-series control commands for the manipulator 4 can be generated or taught in response to a change in the relative positional relationship between the objects without being associated with the respective tasks. In the above example, in steps S306 and S315, the positional relationship (task state) between the end-effector T and the workpiece W is determined to reflect a change in the coordinates of the workpiece W. The manipulator 4 can thus appropriately hold the workpiece W with the end-effector T based on the training results. The structure according to the present embodiment can train the manipulator 4 to perform tasks in versatile situations, thus reducing the cost for teaching the manipulator 4 to perform tasks.

In the present embodiment, the positional relationship between objects is expressed using their relative coordinates. This allows appropriate and definitive expression of the positional relationship between two objects, thus allowing easy determination of the positional relationship (or the task state in control) between the two objects.

The first model generation apparatus 1 according to the present embodiment generates, through machine learning, the determination model 50 for determining whether two objects come in contact with each other in a target positional relationship through the processing in steps S101 and S102. The trained determination model 50 generated through machine learning can determine, in response to a target positional relationship provided as a set of continuous values, whether two objects come in contact with each other in the positional relationship without largely increasing the data volume for the determination model 50. The structure according to the present embodiment largely reduces the data volume for information indicating the boundary at which two objects come in contact with each other.

Figure 24:
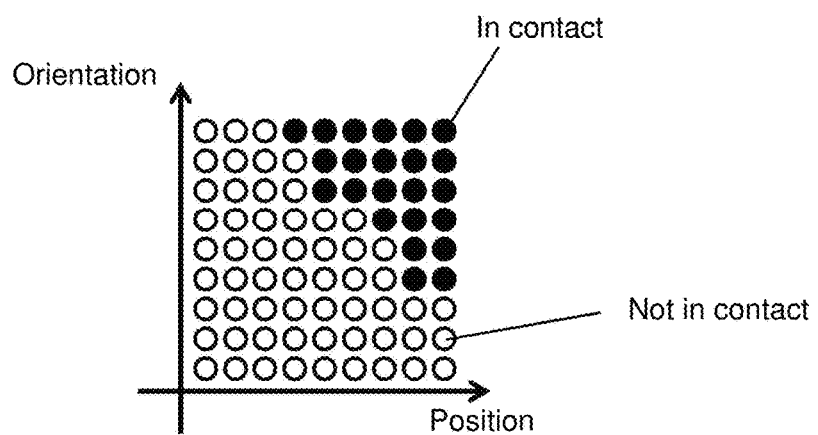
FIG. 24 is a schematic diagram illustrating example coordinate points each having a value indicating whether two objects come in contact with each other.

The effects will now be described further with reference to FIG. 24 in a specific example. FIG. 24 is a schematic diagram of example coordinate points each having a value indicating whether two objects come in contact with each other. The white circles indicate two objects not in contact with each other in the positional relationship corresponding to the coordinates. The black circles indicate two objects in contact with each other in the positional relationship corresponding to the coordinates. Although the coordinate points are represented in two dimensions in FIG. 24, the coordinate points are represented in 6D in a space of 6D relative coordinates described above. Increasing the resolution (resolving power) of the space increases the volume of data used on the order of the sixth power. For coordinate points set at a resolution available for operation in a real space, the data volume for such information can easily be on the order of gigabytes.

In the present embodiment, the trained determination model 50 stores information indicating whether two objects come in contact with each other in a target positional relationship. The trained determination model 50 can process a set of continuous values without increasing the number of computational parameters that may depend on the number of dimensions of the relative coordinates. For a determination model 50 including a three-layered neural network (described later), for example, the trained determination model 50 can reduce the volume of data to be used to about several megabytes. The structure according to the present embodiment largely reduces the data volume for information indicating the boundary at which two objects come in contact with each other.

In the present embodiment, the endpoint of the manipulator 4 and the destination object are the two objects for which contact between them is determined by the trained determination model 50. This structure largely reduces the data volume for information indicating the boundary at which two objects come in contact with each other for defining the operation of the manipulator 4. This allows the second model generation apparatus 2 including the RAM, the ROM, and the storage 22 each with a relatively small storage capacity to use the trained determination model 50 to generate the inference model 55 for determining the goal task state to avoid unintended contact of the endpoint with the destination object.

The second model generation apparatus 2 according to the present embodiment generates the inference model 55 for determining the goal task state to avoid contact of the first object with the second object using the trained determination model 50 through the processing in steps S201 to S210. The control apparatus 3 in the present embodiment determines, in step S308, the goal task state using the generated inference model 55. The control apparatus 3 according to the present embodiment can determine the goal task state to avoid contact of the first object with the second object, or in other words, to avoid unintended contact of the endpoint of the manipulator 4 with the destination object without a computational operation of the trained determination model 50. The computation for the operation control over the manipulator 4 can thus be less costly.

4. Modifications

The embodiment of the present invention described in detail above is a mere example of the present invention in all respects. The embodiment may be variously modified or altered without departing from the scope of the present invention. For example, the embodiment may be modified in the forms described below. The same components as those in the above embodiment are hereafter given the same reference numerals, and the operations that are the same as those in the above embodiment will not be described. The modifications described below may be combined as appropriate.

4.1

In the above embodiment, the end-effector T, the workpiece W, and the other workpiece G are examples of objects. The other workpiece G is an example of an object to which the workpiece W is to be joined. When the end-effector T is not holding the workpiece W, the workpiece W is an example of an object with which the endpoint of the manipulator 4 comes in contact. When the end-effector T is holding the workpiece W, the other workpiece G is an example of an object with which the endpoint of the manipulator 4 comes in contact. However, the objects are not limited to the above examples. Each object may be of any type that can be processed in a real space or in a virtual space. The objects may be items associated with the operation of the manipulator, such as an obstacle, in addition to the end-effector T, the workpiece W, or the other workpiece G described above.

One object may include one item or may include multiple items. For three or more items, the determination model 50 may process the items as one object and determine whether contact occurs between these items and another item. In some embodiments, the determination model 50 may process the items as individual objects and determine whether contact occurs between the items.

In the above embodiment, at least one of two objects is to be moved by the operation of the manipulator. An object to be moved by the operation of the manipulator may be a component of the manipulator such as an end-effector, may be the manipulator, or may be an item other than a component of the manipulator such as a workpiece held by an end-effector. However, the objects may be of any other types. The two objects may be any items other than objects to be moved by the operation of the manipulator.

In the above embodiment, the manipulator 4 is a vertically articulated robot. For estimating the endpoint coordinates of the manipulator 4 based on the current value of the angle of each joint obtained with the encoder S2, the manipulator 4 may be of any type that has one or more joints and may be selected as appropriate in each embodiment. In some embodiments, the manipulator 4 may include components other than joints. The manipulator 4 may be, for example, a SCARA robot, a parallel link robot, a Cartesian coordinate robot, or a cooperative robot, in addition to the above vertically articulated robot. In the above embodiment, the control command includes a command value for the angle of each joint. However, the control command may have any other structure determined as appropriate for the type of the manipulator 4.

In the above embodiment, the work of holding the workpiece W with the end-effector T and the work of joining the workpiece W being held to the other workpiece G are examples of the task to be performed by the manipulator. The task may be any task that involves movement of the endpoint of the manipulator as part of its process and may be selected as appropriate in each embodiment. The task may include fitting components to each other or turning screws, in addition to holding and transporting the workpiece W as described above. The task may include simple work such as holding a workpiece or releasing a workpiece. The task may include changing the coordinates of a target workpiece by, for example, holding the workpiece and placing the workpiece at specified coordinates (position and orientation). The task may include spraying paint onto a workpiece from specified relative coordinates using an atomizer as the end-effector. The task may include placing a camera attached to the end-effector at specified coordinates. The task may be predetermined or may be specified by an operator.

In the above embodiment, the first sensor system includes the encoders S2 and the touch sensor S3. The second sensor system includes the camera S1. However, each sensor system may be any sensor system that includes one or more sensors and monitors the endpoint of the manipulator 4 and may include any types of sensors selected as appropriate in each embodiment. The first sensor system and the second sensor system may include at least one or more sensors in common. The sensors may include a proximity sensor, a force sensor, a torque sensor, or a pressure sensor, in addition to a camera, an encoder, or a touch sensor. The proximity sensor may be located in an area from which the end-effector T and its surroundings can be observed to detect an item approaching the end-effector T. The force sensor, the torque sensor, or the pressure sensor may be located, in the same manner as the touch sensor S3, in an area from which the force acting on the end-effector T can be measured to observe the force acting on the end-effector T. At least any of the proximity sensor, the force sensor, the torque sensor, or the pressure sensor may be used as a sensor for observing the state of the workpiece W relative to the end-effector T. The camera S1 may be movable in any manner using the manipulator 4 or another robot device. In this case, the coordinates of the camera S1 may be calibrated as appropriate. This allows control over the area to be observed with the camera S1 as appropriate.

In the above embodiment, the touch sensor S3 may be eliminated from the first sensor system. Without the touch sensor S3, the second homogeneous transformation matrix ($_tT^w$) may be estimated with a sensor other than the touch sensor S3 (e.g., the camera S1). The first sensor system may include another sensor that observes the state of the workpiece W relative to the end-effector T. In some embodiments, the second homogeneous transformation matrix ($_tT^w$) may be defined as a constant. In the above embodiment, the endpoint of the manipulator 4 may not be set based on whether the manipulator 4 is holding the workpiece W but may be set in any other appropriate manner. For example, the end-effector T may be set to the endpoint of the manipulator 4 independently of whether the manipulator 4 is holding the workpiece W.

4.2

In the above embodiment, the second model generation apparatus 2 uses the trained determination model 50 for generating the inference model 55. However, the trained determination model 50 may be used in any other manner. The control apparatus 3 according to the present embodiment may use the trained determination model 50 for controlling the operation of the manipulator 4. In this case, the training-result data 125 may be provided to the control apparatus 3 at any selected time in the same manner as described above. The control apparatus 3 includes the contact determiner as a software module.

Figure 25:
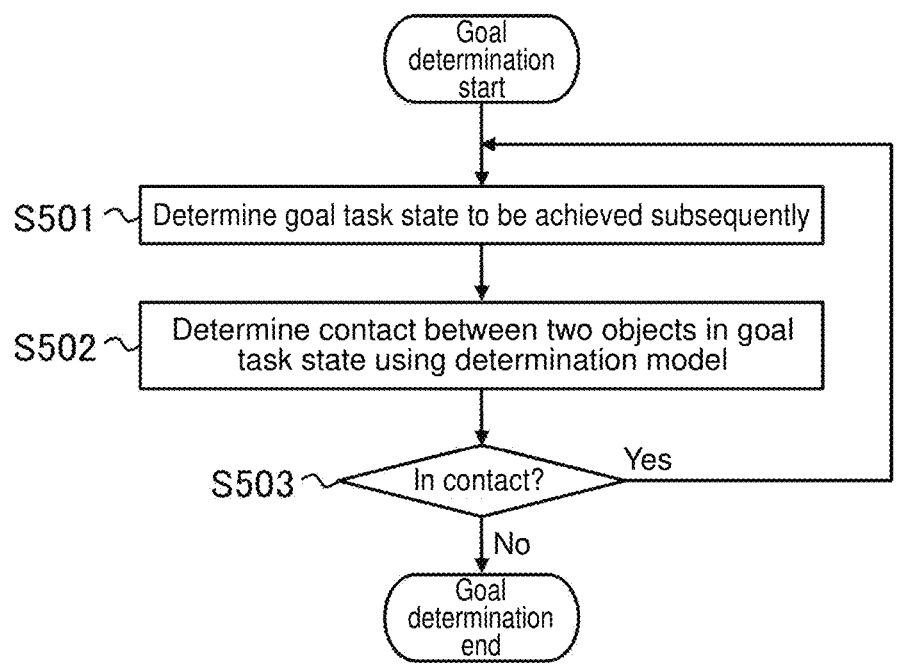
FIG. 25 is a flowchart illustrating a subroutine for goal determination performed by a control apparatus according to a modification.

FIG. 25 is a flowchart of a subroutine for determining the goal task state according to the present modification. The processing for determining the goal task state in step S308 above may be replaced by the subroutine processing illustrated in FIG. 25.

In step S501, the controller 31 operates as the action determiner 316 and determines the goal task state to be achieved subsequently to the obtained current task state to be closer to the task state as the final goal. The processing in step S501 may be performed in the same manner as in step S308 above.

In step S502, the controller 31 operates as the contact determiner and determines whether two objects come in contact with each other in the determined goal task state using the trained determination model 50. The processing in step S502 may be performed in the same manner as in steps S203 and S206 above.

In step S503, the controller 31 determines a branch destination of the processing based on the determination result in step S502. When determining that two objects come in contact with each other in the goal task state in step S502, the controller 31 returns the processing to step S501 and resets the goal task state. When determining that two objects do not come in contact with each other in the goal task state, the controller 31 performs the processing in subsequent step S309. The control apparatus 3 can thus determine the operation of the manipulator 4 to avoid unintended contact of the endpoint of the manipulator 4 with the destination object using the trained determination model 50 for controlling the operation of the manipulator 4.

4.3

In the above embodiment, the control apparatus 3 determines the goal task state using the inference model 55 in step S308 above. However, the goal task state may be determined in any other manner. The goal task state may be determined without using the inference model 55. In step S308 above, for example, the goal task state may be determined in the same manner as in step S205 above. In one example, the controller 31 may determine the goal task state with a known method such as path planning. The sequence of goal task states may be, for example, predetermined. In this case, in step S308 above, the controller 31 may determine the goal task state to be achieved subsequently by referring to data representing the sequence of goal task states. The same applies to step S501 above.

In the above embodiment, generating the inference model 55 (steps S201 to S211) may be eliminated. In the above embodiment, the control apparatus 3 may include the components of the second model generation apparatus 2. The control apparatus 3 may further perform the series of processing steps (steps S201 to S211) for generating the inference model 55. In these cases, the second model generation apparatus 2 may be eliminated from the control system 100.

In the above embodiment, the learning data 223 is collected using the determination result obtained by the trained determination model 50. However, the learning data 223 may be collected in any other manner. For example, the learning data 223 may be collected without using the trained determination model 50 but using, for example, the actual objects. The inference model 55 may thus be generated without using the trained determination model 50.

In the above embodiment, the processing for collecting the learning data 223 through steps S201 to S209 may be performed by another computer. In this case, the second model generation apparatus 2 according to the above embodiment may obtain the learning data 223 generated by the other computer and perform steps S210 and S211 using the obtained learning data 223.

4.4

In the above embodiment, the positional relationship between two objects is expressed using their relative coordinates. The positional relationship may be expressed differently. For example, the positional relationship between two objects may be expressed using their absolute coordinates. In this case, the absolute coordinates for each object may be transformed into relative coordinates, which may then be used to perform the above information processing.

4.5

In the above embodiment, the control apparatus 3 calculates a goal value of the endpoint coordinates based on the goal task state in step S309. The goal value of the endpoint coordinates may be obtained differently. The goal value of the endpoint coordinates may be determined as appropriate to be closer to a task state as a final goal.

For example, the goal value of the endpoint coordinates may be determined directly based on the current value of the endpoint coordinates and the value of the endpoint coordinates in the task state as the final goal. In one example, the goal value of the endpoint coordinates may be determined using reference data such as a data table. In this case, the controller 31 can obtain the goal value of the endpoint coordinates from reference data by comparing the current value of the endpoint coordinates and the value of the endpoint coordinates in the task state as the final goal with the reference data. In another example, for example, the controller 31 may determine the goal value of the endpoint coordinates to achieve the value of the endpoint coordinates in the task state as the final goal from the current value of the endpoint coordinates with the shortest distance using the nearest neighbor algorithm. In still another example, the goal value of the endpoint coordinates may be determined based on the current value of the endpoint coordinates and the task state as the final goal using a trained machine learning model capable of determining such a goal value of the endpoint coordinates through machine learning, similarly to the determination model 50, the inference model 551, or other models. In this case, the controller 31 inputs the current value of the endpoint coordinates and the value of the endpoint coordinates in the task state as the final goal into the trained machine learning model and performs a computational operation of the trained machine learning model. In this manner, the controller 31 obtains, from the trained machine learning model, an output value corresponding to the determined goal value of the endpoint coordinates.

In this case, steps S306, S308, S309, and S315 may be eliminated from the procedure performed by the control apparatus 3. The state obtainer 315 and the action determiner 316 may be eliminated from the software configuration of the control apparatus 3.

In the above embodiment, the task state as the final goal may be set differently, or for example, may be preset. In this case, the processing in steps S301 and S302 may be eliminated from the procedure performed by the control apparatus 3. In this case, the goal setter 310 may be eliminated from the software configuration of the control apparatus 3.

In the above embodiment, the first model generation apparatus 1 may be eliminated from the control system 100. In this case, information indicating whether two objects come in contact with each other may be stored with a method other than being stored by the trained determination model 50. For example, a value indicating whether two objects come in contact with each other may be stored for each coordinate point.

4.6

In the above embodiment, the determination model 50 includes a fully coupled neural network. However, the determination model 50 may include any other type of neural network. The determination model 50 may be, for example, a convolutional neural network or a recurrent neural network, in addition to a fully coupled neural network. The determination model 50 may include a combination of two or more types of neural networks.

The machine learning model for the determination model 50 is not limited to a neural network but may be of any type selected as appropriate in each embodiment. The determination model 50 may be a machine learning model, such as a support vector machine, a regression model, or a decision tree model, in addition to a neural network. The determination as to whether two objects come in contact with each other may be performed using a real space or a virtual space.

In the above embodiment, the inference model 55 may be prepared for each task to be performed by the manipulator 4. In other words, multiple trained inference models 55 may be prepared to infer the goal task states for different tasks. In this case, the controller 31 in the control apparatus 3 may select an inference model 55 to be used for inference from the prepared inference models 55 in accordance with the operation mode set in step S305 above. The controller 31 may switch between the inference models 55 in accordance with the operation mode. In some embodiments, the inference model 55 may further receive an input of information indicating a condition for a task, such as an object type, an object identifier, a task identifier, or a task type, and may infer the goal task state of the task satisfying the input condition. In this case, the controller 31 may further input information indicating the operation mode set in step S305 above into the inference model 55 for determining the goal task state to be achieved subsequently, and may perform a computational operation in step S308 above.

In the above embodiment, the input and the output of each of the determination model 50 and the inference model 55 may be in any format determined as appropriate in each embodiment. For example, the determination model 50 may further receive an input of information other than the task state. Similarly, the inference model 55 may further receive an input of information other than the current task state and the task state as the final goal. For the task state as the final goal being fixed, the inference model 55 may not receive an input of information indicating the task state as the final goal. The determination model 50 and the inference model 55 may use either discrimination or regression for their outputs.

In the above embodiment, the transformation function (a first transformation matrix group or a second transformation matrix group) used for the above forward kinematics calculation is an example of the first estimation model 61. The transformation function ($\Psi$) or each set of coordinates ($T_r$, $T_w$) for transforming values in the task space into values in the observation space is an example of the second estimation model 62. However, each estimation model (61, 62) may have any other configuration. Each estimation model (61, 62) may be built as appropriate to calculate the endpoint coordinates of the manipulator 4 based on each set of sensing data (323, 324).

Each estimation model (61, 62) includes parameters for calculating the endpoint coordinates based on the corresponding set of sensing data (323, 324). Each estimation model (61, 62) may be of any type selected as appropriate in each embodiment. Each estimation model (61, 62) may include a functional expression, a data table, or any other configuration. Each estimation model (61, 62) being a functional expression may include a machine learning model such as a neural network, a support vector machine, a regression model, or a decision tree.

4.7

In the above embodiment, the control apparatus 3 can perform information processing for adjusting the parameters shown in both FIGS. 20 and 21. However, the control apparatus 3 may have any other structure. In the above embodiment, the control apparatus 3 may perform the processing shown in either FIG. 20 or FIG. 21. For example, the control apparatus 3 may not perform the information processing for the parameter adjustment shown in FIG. 20, and may instead perform the information processing for the parameter adjustment shown in FIG. 21 in response to any contact of the endpoint of the manipulator 4 with an object.

REFERENCE SIGNS LIST 1 first model generation apparatus
11 controller
12 storage
13 communication interface
14 external interface
15 input device
16 output device
17 drive
91 storage medium
81 model generation program
111 data obtainer
112 machine learning unit
113 storing unit
120 CAD data 121 learning dataset
122 training data
123 true data
125 training-result data
2 second model generation apparatus
21 controller
22 storage
23 communication interface
24 external interface
25 input device
26 output device
27 drive
92 storage medium
82 model generation program
211 contact determiner
212 data collector
213 model generator
214 storing unit
220 CAD data
223 learning data
225 inference model data
3 control apparatus
31 controller
32 storage
33 communication interface
34 external interface
35 input device
36 output device
37 drive
93 storage medium
83 control program
310 goal setter
311 first data obtainer
312 second data obtainer
313 first estimator
314 second estimator
315 state obtainer
316 action determiner
317 command determiner
318 driver
319 adjuster
320 CAD data
321 robot data
323 first sensing data
324 second sensing data
4 manipulator
40 base
41 to 46 joint
491 to 494 link
T end-effector
T0 target point
CT local coordinate system
W workpiece
W0 target point
CW local coordinate system
G other workpiece
CG local coordinate system
RC1, RC2 relative coordinates
S1 camera
S2 encoder
S3 touch sensor
50 determination model
501 input layer
502 intermediate (hidden) layer
503 output layer
55 inference model
61 first estimation model
62 second estimation model

The invention claimed is:

1. A control apparatus for controlling an operation of a manipulator, the control apparatus comprising:
a processor configured with a program to perform operations comprising:
operation as a first data obtainer configured to obtain first sensing data from a first sensor system configured to observe an endpoint of the manipulator at a current time;
operation as a first estimator configured to calculate a first estimate value of current coordinates of the endpoint at the current time in an observation space based on the obtained first sensing data using a first estimation model;
operation as a second data obtainer configured to obtain second sensing data from a second sensor system configured to observe the endpoint of the manipulator at the current time;
operation as a second estimator configured to calculate a second estimate value of current coordinates of the endpoint at the current time in the observation space based on the obtained second sensing data using a second estimation model;
operation as an adjuster configured to calculate a gradient of an error between the first estimate value and the second estimate value, and to adjust a parameter value for at least one of the first estimation model or the second estimation model to reduce the error based on the calculated gradient;
operation as a command determiner configured to determine a control command to drive the manipulator to cause actual coordinates of the endpoint to be closer to a goal value based on at least one of the first estimate value or the second estimate value in accordance with the gradient of the error; and
operation as a driver configured to provide the determined control command to the manipulator to drive the manipulator based on the determined control command.

2. The control apparatus according to claim 1, wherein the processor is configured with the program such that operation as the adjuster further comprises:
obtaining, in response to a contact of the endpoint of the manipulator with an object, a boundary value of the coordinates of the endpoint on a boundary surface of the contact with the object:
calculating a gradient of a first error between the first estimate value estimated at the contact and the obtained boundary value, adjusts the parameter value for the first estimation model to reduce the first error based on the calculated gradient of the first error;
calculating a gradient of a second error between the second estimate value estimated at the contact and the obtained boundary value; and
adjusting the parameter value for the second estimation model to reduce the second error based on the calculated gradient of the second error.

3. The control apparatus according to claim 2, wherein the manipulator comprises one or more joints,
the first sensor system comprises an encoder configured to measure an angle of each of the one or more joints, and
the second sensor system comprises a camera.

4. The control apparatus according to claim 3, wherein
the manipulator further comprises an end-effector configured to hold a workpiece,
a target point of the endpoint of the manipulator is set to the end-effector when the end-effector is not holding the workpiece,
the target point of the endpoint of the manipulator is set to the workpiece when the end-effector is holding the workpiece, and
the first sensor system further comprises a touch sensor configured to estimate a positional relationship of the workpiece held with the end-effector.

5. The control apparatus according to claim 3, wherein the control command comprises a command for at least one of the one or more joints.

6. The control apparatus according to claim 1, wherein
the manipulator comprises one or more joints,
the first sensor system comprises an encoder configured to measure an angle of each of the one or more joints, and
the second sensor system comprises a camera.

7. The control apparatus according to claim 6, wherein
the manipulator further comprises an end-effector configured to hold a workpiece,
a target point of the endpoint of the manipulator is set to the end-effector when the end-effector is not holding the workpiece,
the target point of the endpoint of the manipulator is set to the workpiece when the end-effector is holding the workpiece, and
the first sensor system further comprises a touch sensor configured to estimate a positional relationship of the workpiece held with the end-effector.

8. The control apparatus according to claim 1, wherein
the manipulator comprises one or more joints,
the first sensor system comprises an encoder configured to measure an angle of each of the one or more joints, and
the second sensor system comprises a camera.

9. The control apparatus according to claim 8, wherein the control command comprises a command for at least one of the one or more joints.

10. The control apparatus according to claim 1, wherein at least one of the first estimation model and the second estimation model comprises a machine learning model.

11. The control apparatus according to claim 1, wherein at least one of the first sensing data and the second sensing data is obtained over a predetermined amount of time and averaged to reduce noise.

12. The control apparatus according to claim 1, wherein absent noise in the first sensing data and the second sensing data, the first estimate value is the same as the second estimate value.

13. A control method for controlling an operation of a manipulator, the method being implementable by a computer, the method comprising:
obtaining a first sensing data from a first sensor system configured to observe an endpoint of the manipulator at a current time;
calculating a first estimate value of a coordinates of the endpoint at the current time in an observation space based on the obtained first sensing data using a first estimation model;
obtaining a second sensing data from a second sensor system configured to observe the endpoint of the manipulator at the current time;
calculating a second estimate value of the coordinates of the endpoint at the current time in the observation space based on the obtained second sensing data using a second estimation model;
calculating a gradient of an error between the first estimate value and the second estimate value;
adjusting a parameter value for at least one of the first estimation model or the second estimation model to reduce the error based on the calculated gradient;
determining a control command for to drive the manipulator to cause the coordinates of the endpoint to be closer to a goal value based on at least one of the first estimate value or the second estimate value in accordance with the gradient of the error; and
providing the determined control command to the manipulator to drive the manipulator.

14. The method according to claim 13, wherein at least one of the first estimation model and the second estimation model comprises a machine learning model.

15. The method according to claim 13, wherein at least one of the first sensing data and the second sensing data is obtained over a predetermined amount of time and averaged to reduce noise.

16. A non-transitory computer-readable storage medium storing a control program for controlling an operation of a manipulator, the program, which when read and executed, causes a computer to perform operations comprising:
obtaining a first sensing data from a first sensor system configured to observe an endpoint of the manipulator at a current time;
calculating a first estimate value of a coordinates of the endpoint at the current time in an observation space based on the obtained first sensing data using a first estimation model;
obtaining a second sensing data from a second sensor system configured to observe the endpoint of the manipulator at the current time;
calculating a second estimate value of the coordinates of the endpoint at the current time in the observation space based on the obtained second sensing data using a second estimation model;
calculating a gradient of an error between the first estimate value and the second estimate value;
adjusting a parameter value for at least one of the first estimation model or the second estimation model to reduce the error based on the calculated gradient;
determining a control command for to drive the manipulator to cause the coordinates of the endpoint to be closer to a goal value based on at least one of the first estimate value or the second estimate value in accordance with the gradient of the error; and
providing the determined control command to the manipulator to drive the manipulator.

17. The non-transitory computer-readable storage medium according to claim 16, wherein at least one of the first estimation model and the second estimation model comprises a machine learning model.

18. The non-transitory computer-readable storage medium according to claim 16, wherein at least one of the first sensing data and the second sensing data is obtained over a predetermined amount of time and averaged to reduce noise.

* * * * *